(12) United States Patent
Robinson et al.

(10) Patent No.: US 11,283,265 B2
(45) Date of Patent: Mar. 22, 2022

(54) POWER MANAGERS AND METHODS FOR OPERATING POWER MANAGERS

(71) Applicant: Galvion Soldier Power, LLC, Southborough, MA (US)

(72) Inventors: Philip T. Robinson, Harvard, MA (US); Seth M. Dziengeleski, Southbridge, MA (US); James D. Kazmierczak, Marlborough, MA (US); David J. Holigan, Atkinson, NH (US)

(73) Assignee: GALVION SOLDIER POWER, LLC, Southborough, MA (US)

( * ) Notice: Subject to any disclaimer, the term of this patent is extended or adjusted under 35 U.S.C. 154(b) by 194 days.

(21) Appl. No.: 16/406,750

(22) Filed: May 8, 2019

(65) Prior Publication Data
US 2021/0066927 A1 Mar. 4, 2021

Related U.S. Application Data

(63) Continuation of application No. 15/463,525, filed on Mar. 20, 2017, now Pat. No. 10,333,315, which is a
(Continued)

(51) Int. Cl.
*H02J 4/00* (2006.01)
*H02J 5/00* (2016.01)
(Continued)

(52) U.S. Cl.
CPC .............. *H02J 4/00* (2013.01); *G06F 1/263* (2013.01); *G06F 1/266* (2013.01); *G06F 1/3287* (2013.01);
(Continued)

(58) Field of Classification Search
CPC .. H02J 4/00; H02J 7/00036; H02J 1/00; H02J 5/00; H02J 7/0021; H02J 7/0027;
(Continued)

(56) References Cited

U.S. PATENT DOCUMENTS

| 4,044,268 A | 8/1977 | Hammel et al. |
| 4,589,075 A | 5/1986 | Buennagel |

(Continued)

FOREIGN PATENT DOCUMENTS

| EP | 2230743 | 11/2013 |
| WO | 2006/126023 | 11/2006 |

(Continued)

OTHER PUBLICATIONS

Alibaba.com, 5KW charger controller for wind power supply and solar cell, 2009, 3 pages.
(Continued)

*Primary Examiner* — Carlos Amaya
(74) *Attorney, Agent, or Firm* — Day Pitney LLP; George N. Chaclas

(57) ABSTRACT

Various aspects of invention provide portable power manager operating methods. One aspect of the invention provides a method for operating a power manager having a plurality of device ports for connecting with external power devices and a power bus for connecting with each device port. The method includes: disconnecting each device port from the power bus when no external power device is connected to the device port; accessing information from newly connected external power devices; determining if the newly connected external power devices can be connected to the power bus without power conversion; if not, determining if the newly connected external power devices can be connected to the power bus over an available power converter; and if so, configuring the available power converter for suitable power conversion.

20 Claims, 16 Drawing Sheets

Related U.S. Application Data continuation of application No. 14/109,156, filed on Dec. 17, 2013, now Pat. No. 9,634,491, which is a continuation of application No. 13/620,086, filed on Sep. 14, 2012, now Pat. No. 8,633,619, which is a continuation of application No. 12/816,080, filed on Jun. 15, 2010, now Pat. No. 8,638,011.

(60) Provisional application No. 61/283,536, filed on Dec. 4, 2009, provisional application No. 61/270,602, filed on Jul. 10, 2009.

(51) Int. Cl.

| | | |
|---|---|---|
| *H02J 7/00* | (2006.01) | |
| *G06F 1/26* | (2006.01) | |
| *G06F 1/3287* | (2019.01) | |
| *H02J 1/00* | (2006.01) | |
| *H02M 3/04* | (2006.01) | |
| *H02M 5/04* | (2006.01) | |
| *H02M 7/04* | (2006.01) | |
| *G06F 13/40* | (2006.01) | |

(52) U.S. Cl.
CPC .................. *H02J 1/00* (2013.01); *H02J 5/00* (2013.01); *H02J 7/0021* (2013.01); *H02J 7/0027* (2013.01); *H02J 7/00036* (2020.01); *H02J 7/0068* (2013.01); *H02M 3/04* (2013.01); *H02M 5/04* (2013.01); *H02M 7/04* (2013.01); *G06F 13/4022* (2013.01); *H02J 7/00045* (2020.01); *Y02D 10/00* (2018.01)

(58) Field of Classification Search
CPC ..... H02J 7/0068; H02J 7/00045; G06F 1/263; G06F 1/266; G06F 1/3287; G06F 13/4022; H02M 3/04; H02M 5/04; H02M 7/04; Y02D 10/00
See application file for complete search history.

(56) References Cited

U.S. PATENT DOCUMENTS

| | | | |
|---|---|---|---|
| 4,910,100 | A | 3/1990 | Nakanishi et al. |
| 4,931,947 | A | 6/1990 | Werth et al. |
| 5,153,496 | A | 10/1992 | Laforge |
| 5,258,244 | A | 11/1993 | Hall et al. |
| 5,321,349 | A | 6/1994 | Chang |
| 5,570,002 | A | 10/1996 | Castleman |
| 5,650,240 | A | 7/1997 | Rogers |
| 5,675,754 | A | 10/1997 | King et al. |
| 5,754,445 | A | 5/1998 | Jouper et al. |
| 5,831,198 | A | 11/1998 | Turley et al. |
| 5,898,291 | A | 4/1999 | Hall |
| 5,903,764 | A | 5/1999 | Shyr et al. |
| 5,914,585 | A | 6/1999 | Grabon |
| 5,945,806 | A | 8/1999 | Faulk |
| 5,977,656 | A | 11/1999 | John |
| 5,986,437 | A | 11/1999 | Lee |
| 6,014,013 | A | 1/2000 | Suppanz et al. |
| 6,025,696 | A | 2/2000 | Lenhart et al. |
| 6,046,514 | A | 4/2000 | Rouillard et al. |
| 6,087,035 | A | 7/2000 | Rogers et al. |
| 6,137,280 | A | 10/2000 | Ackermann et al. |
| 6,198,642 | B1 | 3/2001 | Kociecki |
| 6,221,522 | B1 | 4/2001 | Zafred et al. |
| 6,246,215 | B1 | 6/2001 | Popescu-Stanesti |
| 6,265,846 | B1 | 7/2001 | Flechsig et al. |
| 6,271,646 | B1 | 8/2001 | Evers et al. |
| 6,366,061 | B1 | 4/2002 | Carley et al. |
| 6,366,333 | B1 | 4/2002 | Yamamoto et al. |
| 6,370,050 | B1 | 4/2002 | Peng et al. |
| 6,376,938 | B1 | 4/2002 | Williams |
| 6,396,391 | B1 | 5/2002 | Binder |
| 6,459,175 | B1 | 10/2002 | Potega |
| 6,476,581 | B2 | 11/2002 | Lew |
| 6,485,852 | B1 | 11/2002 | Miller et al. |
| 6,492,050 | B1 | 12/2002 | Sammes |
| 6,530,026 | B1 | 3/2003 | Bard |
| 6,541,879 | B1 | 4/2003 | Wright |
| 6,608,463 | B1 | 8/2003 | Kelly et al. |
| 6,627,339 | B2 | 9/2003 | Haltiner, Jr. |
| 6,628,011 | B2 | 9/2003 | Droppo et al. |
| 6,633,823 | B2 | 10/2003 | Bartone et al. |
| 6,690,585 | B2 | 2/2004 | Betts-LaCroix |
| 6,694,270 | B2 | 2/2004 | Hart |
| 6,703,722 | B2 | 3/2004 | Christensen |
| 6,707,284 | B2 | 3/2004 | Lanni |
| 6,828,695 | B1 | 12/2004 | Hansen |
| 6,831,848 | B2 | 12/2004 | Lanni |
| 6,925,361 | B1 | 8/2005 | Sinnock |
| 6,985,799 | B2 | 1/2006 | Zalesski et al. |
| 7,001,682 | B2 | 2/2006 | Haltiner, Jr. |
| 7,002,265 | B2 | 2/2006 | Potega |
| 7,036,028 | B2 | 4/2006 | Zalesski |
| 7,071,660 | B2 | 7/2006 | Xu et al. |
| 7,076,592 | B1 | 7/2006 | Ykema |
| 7,105,946 | B2 | 9/2006 | Akiyama et al. |
| 7,166,937 | B2 | 1/2007 | Wilson et al. |
| 7,188,003 | B2 | 3/2007 | Ransom et al. |
| 7,203,849 | B2 | 4/2007 | Dove |
| 7,212,407 | B2 | 5/2007 | Beihoff et al. |
| 7,226,681 | B2 | 6/2007 | Florence et al. |
| 7,235,321 | B2 | 6/2007 | Sarkar et al. |
| 7,243,243 | B2 | 7/2007 | Gedeon |
| 7,256,516 | B2 | 8/2007 | Buchanan et al. |
| 7,274,175 | B2 | 9/2007 | Manolescu |
| 7,385,373 | B2 | 6/2008 | Doruk et al. |
| 7,388,349 | B2 | 6/2008 | Elder et al. |
| 7,408,794 | B2 | 8/2008 | Su |
| 7,436,687 | B2 | 10/2008 | Patel |
| 7,444,445 | B2 | 10/2008 | Kubo et al. |
| 7,506,179 | B2 | 3/2009 | Templeton |
| 7,531,915 | B2 | 5/2009 | Wang et al. |
| 7,541,693 | B2 | 6/2009 | Huang et al. |
| 7,618,260 | B2 | 11/2009 | Daniel et al. |
| 7,646,107 | B2 | 1/2010 | Smith |
| 7,674,543 | B2 | 3/2010 | Chiang et al. |
| 7,675,758 | B2 | 3/2010 | Artusi et al. |
| 7,683,575 | B2 | 3/2010 | Berdichevsky et al. |
| 7,701,082 | B2 | 4/2010 | Lazarovich et al. |
| 7,778,940 | B2 | 8/2010 | Mazzarella |
| 7,808,122 | B2 | 10/2010 | Menas et al. |
| 7,814,348 | B2 | 10/2010 | Krajcovic et al. |
| 7,834,479 | B2 | 11/2010 | Capp et al. |
| 7,838,142 | B2 | 11/2010 | Scheucher |
| 7,844,370 | B2 | 11/2010 | Pollack et al. |
| 7,847,532 | B2 | 12/2010 | Potter et al. |
| 7,849,341 | B2 | 12/2010 | Sugiyama |
| 7,855,528 | B2 | 12/2010 | Lee |
| 7,928,720 | B2 | 4/2011 | Wang |
| D640,192 | S | 6/2011 | Robinson et al. |
| 8,073,554 | B2 | 12/2011 | Vezza et al. |
| 8,086,281 | B2 | 12/2011 | Rabu et al. |
| 8,103,892 | B2 | 1/2012 | Krajcovic |
| 8,106,537 | B2 | 1/2012 | Casey et al. |
| 8,138,631 | B2 | 3/2012 | Allen et al. |
| 8,140,194 | B2 | 3/2012 | Iino et al. |
| 8,164,217 | B1 | 4/2012 | Miller |
| 8,178,999 | B2 | 5/2012 | Burger et al. |
| 8,193,661 | B2 | 6/2012 | Jagota et al. |
| 8,255,090 | B2 | 8/2012 | Frader-Thompson et al. |
| 8,279,642 | B2 | 10/2012 | Chapman et al. |
| 8,294,307 | B2 | 10/2012 | Tsai |
| 8,304,122 | B2 | 11/2012 | Poshusta et al. |
| 8,312,299 | B2 | 11/2012 | Tremel et al. |
| 8,315,745 | B2 | 11/2012 | Creed |
| 8,333,619 | B2 | 12/2012 | Kondo et al. |
| 8,352,758 | B2 | 1/2013 | Atkins et al. |
| 8,375,229 | B2 | 2/2013 | Saeki |
| 8,401,709 | B2 | 3/2013 | Cherian et al. |
| 8,447,435 | B1 | 5/2013 | Miller et al. |
| 8,455,794 | B2 | 6/2013 | Vogel |

(56) References Cited

U.S. PATENT DOCUMENTS

| | | |
|---|---|---|
| 8,466,662 B2 | 6/2013 | Nania et al. |
| 8,476,581 B2 | 7/2013 | Babayoff et al. |
| 8,494,479 B2 | 7/2013 | Budampati et al. |
| 8,508,166 B2 | 8/2013 | Marcinkiewicz et al. |
| 8,548,607 B1 | 10/2013 | Belz et al. |
| 8,599,588 B2 | 12/2013 | Adest et al. |
| 8,611,107 B2 | 12/2013 | Chapman et al. |
| 8,614,023 B2 | 12/2013 | Poshusta et al. |
| 8,633,619 B2 | 1/2014 | Robinson et al. |
| 8,638,011 B2 | 1/2014 | Robinson et al. |
| 8,643,326 B2 | 2/2014 | Campanella et al. |
| 8,648,492 B2 | 2/2014 | Craig et al. |
| 8,649,914 B2 | 2/2014 | Miller et al. |
| 8,682,496 B2 | 3/2014 | Schweitzer, III et al. |
| D706,711 S | 6/2014 | Robinson et al. |
| 8,775,846 B2 | 7/2014 | Robinson et al. |
| 8,781,640 B1 | 7/2014 | Miller |
| 8,796,888 B2 | 8/2014 | Rice et al. |
| 8,829,713 B2 | 9/2014 | Ishigaki et al. |
| 8,849,471 B2 | 9/2014 | Daniel et al. |
| 8,853,891 B2 | 10/2014 | Soar |
| 8,854,389 B2 | 10/2014 | Wong et al. |
| 8,890,474 B2 | 11/2014 | Kim et al. |
| 8,901,774 B2 | 12/2014 | Yan et al. |
| 8,913,406 B2 | 12/2014 | Guthrie et al. |
| 8,970,176 B2 | 3/2015 | Ballatine et al. |
| 9,041,349 B2 | 5/2015 | Bemmel et al. |
| 9,043,617 B2 | 5/2015 | Miki |
| 9,093,862 B2 | 7/2015 | Dennis et al. |
| 9,142,957 B2 | 9/2015 | Malmberg et al. |
| 9,158,294 B2 | 10/2015 | Carralero et al. |
| 9,190,673 B2 | 11/2015 | Venkataraman et al. |
| 9,203,302 B2 | 12/2015 | Kelly |
| 9,207,735 B2 | 12/2015 | Khaitan et al. |
| 9,337,943 B2 | 5/2016 | Mosebrook et al. |
| 9,343,758 B2 | 5/2016 | Poshusta et al. |
| 9,450,274 B2 | 9/2016 | Vo et al. |
| 9,452,475 B2 | 9/2016 | Armstrong et al. |
| 9,502,894 B2 | 11/2016 | Holmberg et al. |
| 9,634,491 B2 | 4/2017 | Robinson et al. |
| 9,698,596 B2 | 7/2017 | Sauer et al. |
| 9,722,435 B2 | 8/2017 | Park |
| 2002/0135492 A1 | 9/2002 | Reagan et al. |
| 2003/0006905 A1 | 1/2003 | Shieh et al. |
| 2003/0054215 A1 | 3/2003 | Doshi et al. |
| 2003/0234729 A1 | 12/2003 | Shen |
| 2004/0061380 A1 | 4/2004 | Hann et al. |
| 2004/0125618 A1 | 7/2004 | De Rooij et al. |
| 2004/0239287 A1* | 12/2004 | Batts-Gowins ............ H02J 7/35 320/103 |
| 2005/0037241 A1 | 2/2005 | Schneider et al. |
| 2005/0275372 A1 | 12/2005 | Crowell |
| 2006/0127725 A9 | 6/2006 | Sarkar et al. |
| 2007/0078230 A1 | 4/2007 | Lai |
| 2007/0141424 A1 | 6/2007 | Armstrong et al. |
| 2007/0222301 A1 | 9/2007 | Fadell et al. |
| 2007/0257654 A1* | 11/2007 | Krajcovic ................. H02J 1/14 323/297 |
| 2008/0024007 A1 | 1/2008 | Budampati et al. |
| 2008/0269953 A1 | 10/2008 | Steels et al. |
| 2008/0305839 A1 | 12/2008 | Karaoguz et al. |
| 2009/0079263 A1 | 3/2009 | Crumm et al. |
| 2010/0001689 A1 | 1/2010 | Hultman et al. |
| 2010/0280676 A1 | 11/2010 | Pabon et al. |
| 2011/0184585 A1 | 7/2011 | Matsuda et al. |
| 2011/0234000 A1 | 9/2011 | Yan et al. |
| 2011/0278957 A1 | 11/2011 | Eckhoff et al. |
| 2012/0205976 A1 | 8/2012 | Shih et al. |
| 2014/0091623 A1 | 4/2014 | Shippy et al. |
| 2014/0292081 A1 | 10/2014 | Long et al. |

FOREIGN PATENT DOCUMENTS

| | | |
|---|---|---|
| WO | 2007/012785 | 2/2007 |
| WO | 2007/048837 | 5/2007 |
| WO | 2007/076440 | 7/2007 |
| WO | 2008/072014 | 6/2008 |
| WO | 2008/072015 | 6/2008 |
| WO | 2008/090378 | 7/2008 |
| WO | 2011/023678 | 3/2011 |
| WO | 2011/046645 | 4/2011 |
| WO | 2011113280 | 9/2011 |
| WO | 2012/122315 | 9/2012 |
| WO | 2013/083296 | 6/2013 |
| WO | 2014/165469 | 10/2014 |

OTHER PUBLICATIONS

Amazon.com: Morningstar TriStar-45 Solar Charge Controller for solar/wind generator/Wind Turbine-45 amps, 2009, 6 pages.

Bruce et al.,www.rfdesign.com, Defense Electronics, Military takes aim at high battery costs, Apr. 2005, pp. 20-25.

F.H. Khan et al., ww.ietdl.org, IET Power Electronics, Bi-directional power manager management and fault tolerant feature in a −5kW multivlevel dc-dc converter with modular architecture, 2009, pp. 595-604, vol. 2, No. 5, 10 pages.

Fran Hoffart, New charger topology maximizes battery charging speed, 1998, 2 pages.

Green Plug, www.greenplug.us, One plug one planet, 2009, 7 pages.

greentmcnet.com/topics/green/articles/57729-green-plug-partners-with-wipower-advanced-wireless-power.htm, Gren plug partners with wipower for advanced wireless power systems, 2009, 3 pages.

Greg Cipriano et al., Protonex, Joint Service Power Expo, 2009, 38 pages.

http://defense-update.com/products/b/ba5590.htm, BA 5590 Lithium Battery, Jul. 26, 2006, 1 page.

http://fuelcellsworks.com/news/2009/06/04/sfc-smart-fuel-cell-launches-joint-power-manager, SFC smart fuel cell launches joint power manager, Jun. 2009, 4 pages.

Ian C. Evans et al., IEEE electric ship technologies symposium, High power clean dc bus generation using ac-link ac to dc power voltage conversion, dc regulation, and galvanic isolation, 2009, 12 pages.

Inki Hong et al., IEEE Transactions on computer-aided design of integrated circuits and systems, Power Optimization of variable-voltage core-based systems, Dec. 1999, vol. 18, No. 12, 13 pages.

Jaber A. Abu et al., Twenty-Fourth Annual IEEE Applied Power Electronics Conference and Exposition, Control Scheme for high-efficiency high-performance two-stage power converters, 2009, 7 pages.

Jorge L. Duarte et al., IEEE Transactions on Power Electronics, Three-Port Bidirectional converter for hybrid fuel cell systems, 2007, vol. 22, No. 2, 8 pages.

Julio Garcia, 2009 Barcelona Forum on Ph.D. Reseach in Electronic Engineering, Efficiency improvements in autonomous electric vehicles using dynamic commutation of energy resouices, 2009, 2 pages.

Karlsson et al., IEEE Transactions on power electronics, DC bus voltage control for a distributed power system, Nov. 2003, pp. 1405-1412, v: 18, n:6, 8 pages.

Leonid Fursin et al., Development of compact variable-voltage, bi-directional 100kw dc-dc converter, 2007, 9 pages.

M. Becherif et al., Vehicle power and propulsion conference (VPPC), 2010 IEEE, IEEE Power and Propulsion Conference (VPPC), Advantages of variable DC bus voltage for hybrid electrical vehicle, 201, pp. 1-6.

M. Conti et al., SystemC modeling of a dynamic power management architecture, 6 pages.

Mat Dirjish, http://electronicdesign.com/Articles/Index.cfm?AD=1 &ArticlesID-19515; Enginner seeks cure for common wall warts, Aug. 2008, 3 pages.

Matthew Alan Merkle, Thesis submitted to the faculty of Virginia Polytechnic Institute and State UniversityVariable bus voltage modeling for series hybrid electric vehicle simulation, Dec. 1997, 33 pages.

(56) References Cited

OTHER PUBLICATIONS

Ocean Server Technology, Inc., Intelligent Battery and Power System, May 2008, 4 pages.
Ocean Server Technology, Inc., Smart Li-ion packs, integrated chargers, ultra high efficiency dc-dc converters, integrate battery power or backup, fully engineered (plug and run) and 95 to 25,000+ watt-hour clusters, 2007, 4 pages.
Peter Podesser, www.mil-embedded.com/articles/id/?3966, Portable power management for soldiers; Fuel cell hybrid system is lighter, safer, May 2009.
replay.waybackmachine.org/20090122152343/http://ww.sfc.com/en/about-sfc.html, About SFC Smart Fuel Cell, 1 page.
replay.waybackmachine.org/20090312005238/http://ww.sfc.com/en/man-portable-technology-power-manager.html, The SFC Power Manager—The Technology, 2009, 2 pages.
Reyneri et al., IAC-09.C3.2.8, A redundant power bus for distributed power management for a modular satellite, 2009, 8 pages.
Richter Wolfgang, Chip for saving power, Aug. 2007, 2 pages.
Robert M. Button, Nasa/TM-2002-211370, Intelligent Systems for Power Management and Distribution, Feb. 2002, 12 pages.
Singh et al., Conference Record of the Twenty-Eighth IEEE Photovoltaic Specialists Conference, Fuzzy Logic-based Solar Charge Controller for Microbatteries, 2000, pp. 1726-1729.
Wilson Rothman, gizmodo.com/295076/new-Honeywell-hdmi-cable-heals-self-but-at-what-cost, New Honeywell HDMI Cables Heals Self, But at What Cost?, Aug. 2007, 3 pages.
ww.sfc.com/index2.php option=com_pressreleasees&Itemid=467 &id=1050&lang=en&pop-1&page=0, SFC receives commercial order for portable fuel cells, 2008 1 page.
www.energyharvestingjournal.com/articles/soldier-worn-portable-power-management-system-00001375.asp?sessionid=1, Energy Harvesting Journal: Soldier-worn portable power management system, 2009, 2 pages.
www.mpoweruk.com/bms.htm,Battery Management Systems (BMS), 2009, 12 pages.
www.nkusa.com/prod-monitor-smart-cable.htm, Nihon Kohden: Products-Monitoring, Smart Cable Technology, 1 page.
www.paneltronics.com/ip.asp?op=Multiplex%20Distributions%20Systems, Paneltronics, What is Power Sign?, 2006, 2 pages.
www.reuters.com/article/pressRelease/idUS159777+17-Feb-2009+BW20090217, Reuters, Protonex to Launch Soldier-Worn Portable Power Management Systems, Feb. 2009, 3 pages.
www.sfc.com, About SFC Smart Fuel Cell, 2009, 1 page.

\* cited by examiner

POWER MANAGERS AND METHODS FOR OPERATING POWER MANAGERS

CROSS REFERENCE TO PRIOR APPLICATIONS

This application claims priority under 35 U.S.C. § 120 based upon U.S. patent application Ser. No. 12/816,080, entitled "PORTABLE POWER MANAGER OPERATING METHODS" and filed Jun. 15, 2010, which claims priority under 35 U.S.C. § 119(e) based upon U.S. Provisional Patent Application Ser. No. 61/270,602, entitled "POWER MANAGER" and filed Jul. 10, 2009, and further based upon U.S. Provisional Patent Application Ser. No. 61/283,536, entitled "POWER MANAGER" and filed Dec. 4, 2009. The entire contents of both applications are incorporated herein by reference.

U.S. patent application Ser. No. 12/816,080 is related to U.S. patent application Ser. No. 12/815,994, entitled "PORTABLE POWER MANAGER" and filed Jun. 15, 2010 and U.S. patent application Ser. No. 12/816,325, entitled "PORTABLE POWER MANAGER ENCLOSURE" and filed Jun. 15, 2010.

STATEMENT REGARDING FEDERALLY SPONSORED RESEARCH OR DEVELOPMENT

Inventions disclosed herein relate to work performed under U.S. Army Contract W911NF-08-C-0025 with the U.S. Army Research, Development and Engineering Command (RDECOM). The U.S. Government has certain rights in the inventions disclosed herein.

FIELD OF THE INVENTION

The present invention relates to a portable power manager configured with a plurality of device ports suitable for simultaneous electrical interconnection with two or more external power devices. The external power devices include power sources, energy storage devices, power loads and/or other power managers suitably configured to exchange power and communication signals there between. More specifically, the portable power manager can include elements configured to establish a network of power devices and to exchange power between the portable power manager and networked external power devices.

BACKGROUND OF THE INVENTION

Portable power managers for mobile off-grid applications are known. Examples include man-wearable and man-packable power managers e.g. the SPM 611/612, manufactured by Protonex Technology Corp of Southborough, Mass. and the SFC Power Manager 3G by SFC of Brunnthal-Nord, Germany. One example of a conventional power manager is disclosed in U.S. Patent Application Publication No. 2007/0257654. Conventional portable power managers connect with one or more rechargeable batteries or other portably power sources and with one or more power loads. The power manager receives input power from the connected power sources and delivers output power to the connected power loads. If needed, input and/or output power may be converted to another form, such and a different voltage, before being delivered to a power load.

Power distribution networks usable to deliver power from a single power source to multiple electronic devices such as for passenger use in vehicles or other areas where grid power is not readily available are known. An example of a conventional power supply connection system is disclosed in U.S. Pat. No. 5,570,002 by Castleman, entitled "Universal Power-Supply Connection System For Multiple Electronic Devices." As disclosed in Castleman, a single power supply is connected to one or more power loads over a power distribution system. The power distribution system includes an input port for connecting the power supply to the power distribution system and a plurality of output ports for connecting the one or more power loads to the power distribution system. The power distribution system includes a digital electronic microprocessor and a reprogrammable system memory. Each power load includes a load memory disposed in the power load itself or in a cable connecting the power load to the power distribution system. The load memory stores information specific to a corresponding power load such as a category of the device or the power specifications of the power load.

The power distribution system includes one or more voltage regulators and/or controllable regulators disposed between the power source and each of the output ports. Additionally, each port includes a data channel connectable between the microprocessor and the load memory for reading and perhaps reformatting the information stored thereon. In operation, the power distribution system obtains information from the load memory, determines if the power load can or should be connected to the power distribution system and if yes, configures the one or more voltage regulators and/or controllable regulators disposed between the power source and the connected power load to deliver power to the power load with appropriate power characteristics. In addition, Castleman teaches that a controllable regulator can be deactivated to disconnect a power load from an output port. One problem with Castleman is that only one power supply is available for use. Accordingly, a failure of the single power supply necessarily results in a loss of power in all of the connected power loads. Another problem with Castleman is that each output port requires a dedicated controllable power regulator increasing the weight and the cost of the power distribution system. Accordingly, there is a need in the art for a power distribution system than can readily connect with a plurality of power supplies and especially a plurality of portable power supplies. Moreover, there is a need in the art for a power distribution system that can readily connect with a plurality of power supplies while drawing power from one power supply at a time. Additionally, there is a need in the art for a power distribution system that will not experience a power interruption to connected power loads when a connected power supply is suddenly disconnected from the power bus, becomes discharged, or otherwise becomes unexpectedly unable to deliver power.

Conventional portable power managers are known that are capable of connecting to two or more external power sources simultaneously. In addition, conventional power managers connect to, read and possibly reformat information or data stored on connected power devices including reading information from power sources such as external batteries or power generators and from external power loads. Typically, the conventional power manager includes a power bus connected to each device port. The power bus operates at a substantially constant bus voltage such that external power devices that can operate at the bus voltage are directly connected to the power bus to exchange energy. In addition, some ports may include a power converter connected between the power bus and the device port to convert input power signals received from a connected external power source to the bus voltage and to convert output power signals delivered from the power bus to a voltage suitable for operating a connected external power load.

While U.S. Patent Application Publication No. 2007/0257654 by Krajcovic et al. entitled "Power Manager Apparatus," describes the need to disconnect and/or current limit connected power loads to conserve power for higher priority power loads they only provide two output ports that are coupled to the power bus over a buck converter. Accordingly, only two power loads can be disconnected or current limited by the buck converters and all other power loads remain connected to the power bus without possibility for disconnect. Moreover any power loads connected to device ports that do not include buck converters have to match the power value at the power bus in order to be powered by the power manager.

Generally, there is a need in the art for an improved power manager port connection and especially one that allows every port to dynamically connect or disconnect a power device to or from the power bus. Additionally there is a need in the art for an improved power manager port connection that allows every port to be selectively connected directly to the power bus or connected to the power bus over a controllable power converter based on information read from the power device. In another instance, there is a need to continue to power essential devices even when changing from one power source to another or when a power source becomes suddenly and unexpectedly unable to meet the power demands of connected power loads. Accordingly, there is a need to rapidly connect a backup power supply to the power bus in response to unmet power demands.

Conventional man-portable power managers are portable and carried by infantry soldiers; any reduction in size and weight is favorably viewed. As shown by Krajcivic et al. in FIGS. 2 and 3 of U.S. Patent Application Publication No. 2007/0257654, port connectors are disposed on opposing longitudinal sides of the power manager such that a transverse width of the disclosed power manager is more than two times a longitudinal length of a port connector. Moreover, the ports are crowded together and may be difficult to connect to due to the crowding. There is a need in the art to reduce port crowding without increasing the size or weight of the device.

In man-portable, off grid applications, such as battlefields, non-rechargeable batteries such as the BA-5590 are used as a power source connected to conventional power managers. To avoid discarding BA-5590 with 30% to 50% of the rated charge still remaining on the batteries, some non-rechargeable batteries provide indicators that indicate the amount of charge remaining in the battery. These indicators are often physical, such as a strip on the side of a battery or an LED charge level indicator built into the battery to show how much energy is in reserve. One problem with the BA-5590-style charge level indicators is that they have low resolution. In particular, on a BA-5590, there are 5 LED lights showing 100% capacity when all 5 lights are on, 80% capacity when 4 lights are on, 60% capacity when 3 lights are on, 40% capacity when two lights are on, 20% capacity when one light is on and empty or no charge remaining when no lights are on. In most situations, a user will discard the battery when one or two lights are on in order to avoid a loss of power when the battery becomes completely discharged. As a result, many batteries are discarded with between 20 and 40% of the charge capacity unused. Accordingly, there is a need in the art to more fully utilize the charge remaining on non-rechargeable batteries connected to a power manager.

The charge remaining on many rechargeable batteries, e.g. lithium sulfur dioxide ($LiSO_2$) and lithium magnesium dioxide ($LiMnO_2$) is not easily detected using conventional terminal voltage measurements, so more sophisticated and more expensive coulomb counting devices are integrated into these rechargeable batteries and are used to predict the charge level remaining on the rechargeable battery. One advantage of coulomb counters is that they have a higher resolution than LED charge level indicators. For example, a coulomb counter may be able to discern 20 levels of charge capacity with only the last 5% remaining uncertain. However, a coulomb counter does not provide a visible indicator of remaining charge level and a user cannot check the charge level of a rechargeable battery that uses a coulomb counter without connecting the battery to a device capable of reading data from the battery. As a result, these batteries are often discarded after one use simply because the user is uncertain about how much charge is remaining on the battery. Accordingly, there is a need in the art to more fully utilize the charge remaining on rechargeable batteries connected to a power manager without an unexpected power interruption even when the charge level on the rechargeable batteries is uncertain. In addition, it is desirable to eliminate a coulomb counter from rechargeable batteries used with portable power manager to reduce the cost and complexity of the batteries.

SUMMARY OF THE INVENTION

Various aspects of invention provide portable power manager operating methods.

One aspect of the invention provides a method for operating a power manager having a plurality of device ports for connecting with external power devices and a power bus for connecting with each device port. The method includes: disconnecting each device port from the power bus when no external power device is connected to the device port; accessing information from newly connected external power devices; determining if the newly connected external power devices can be connected to the power bus without power conversion; if not, determining if the newly connected external power devices can be connected to the power bus over an available power converter; and if so, configuring the available power converter for suitable power conversion.

This aspect can have a variety of embodiments. The method can include the step of generating an error signal for each newly connected external power device that is not compatible for connection to the power bus.

The power manager can include two power channels disposed between each device port and the power bus. One of the two power channels can include a power converter disposed between the device port and the power bus. The method can include the steps of: connecting the newly connected external power devices that can be connected to the power bus without power conversion over a first power channel; and connecting the newly connected external power devices that can be connected to the power bus over an available power converter over a second power channel that includes the power converter.

The newly connected external power devices can include a rechargeable energy source and the method can include the steps of: determining if a power source suitable for recharging the rechargeable energy source is operably connected to the power manager; and one of: connecting the rechargeable energy source to the power bus for recharging; connecting the rechargeable energy source to the power bus for discharging; and not connecting the rechargeable energy source to the power bus.

The step of connecting the rechargeable energy source to the power bus for recharging can include the steps of: determining if a plurality of rechargeable energy storage devices are operably connected to the power manager; and if so: selecting one of the plurality of rechargeable energy storage devices for recharging; connecting the selected rechargeable energy storage device to the power bus; and disconnecting the non-selected rechargeable energy storage devices from the power bus.

The step of connecting the rechargeable energy source to the power bus for recharging can include the steps of: determining if a plurality of rechargeable energy storage devices are operably connected to the power manager; and if so: determining a remaining charge value for each of the plurality of rechargeable energy storage devices connected to the power manager; selecting one of the plurality of rechargeable energy storage devices for recharging according the determined remaining charge values; connecting the selected rechargeable energy source to the power bus; and disconnecting the non-selected rechargeable energy storage devices from the power bus. The selecting step can select the rechargeable energy source with the highest remaining charge value.

The step of connecting the rechargeable energy storage device to the power bus for discharging can include the steps of: determining if a plurality of rechargeable energy storage devices are operably connected to the power manager; and if so: selecting one of the plurality of rechargeable energy storage devices for recharging; connecting the selected rechargeable energy storage devices to the power bus; and disconnecting the non-selected rechargeable energy storage devices from the power bus.

The step of connecting the rechargeable energy source to the power bus for discharging further can include: determining if a plurality of rechargeable energy storage devices are operably connected to the power manager; and if so: determining a remaining charge value for each of the plurality of rechargeable energy storage devices connected to the power manager; selecting one of the plurality of rechargeable energy storage devices for discharging according the determined remaining charge values; connecting the selected rechargeable energy source to the power bus; and disconnecting the non-selected rechargeable energy storage devices from the power bus. The selecting step can select the rechargeable energy source with the lowest remaining charge value.

The newly connected external power devices can include a power or energy source and the method can further comprise the steps of: determining if a plurality of power and energy sources are operably connected to the power manager; and if not, connecting the power or energy source to the power bus for powering power loads.

The newly connected external power devices can include a power or energy source and the method can include the steps of: determining if a plurality of power and energy sources are operably connected to the power manager; and if so: determining a source priority for each of the plurality of power and energy sources; connecting the power or energy source with the highest source priority to the power bus for powering power loads; and disconnecting the power and energy sources having lower source priorities from the power bus. The method can include: sensing a power characteristic of the power bus; generating a low power signal in response to the power bus power characteristic falling below a threshold value; and connecting one or more of the disconnected rechargeable energy storage devices to the power bus in response to the low power signal.

The newly connected external power devices can include a power load and the method can include the steps of; connecting the power load to the power bus for powering; and not connecting the power load to the power bus.

The newly connected external devices can include a non-rechargeable energy source and the method can include the steps of: connecting the non-rechargeable energy source to the power bus for discharging; and not connecting the non-rechargeable energy source to the power bus.

Another aspect of the invention provides a method for operating a power manger having a plurality of device ports for connecting with external power devices and a power bus for connecting with each device port. The method includes: accessing information from each external power device connected to one of the plurality of device ports; characterizing each external power device as one of, a power load, a power or energy source and a rechargeable energy source and if no rechargeable energy sources are connected; associating external devices characterized as power loads with a power allocation interface; associating external devices characterized as power or energy sources with a source allocation interface; calculating a total power available from the source allocation interface; allocating the total power available to the power allocation interface; and connecting as many power loads to the power bus as can be powered by the total power available.

This aspect can have a variety of embodiments. In one embodiment, one or more rechargeable energy sources are connected and the method includes: determining if a power source suitable for recharging the connected rechargeable energy sources is operably connected to the power manager; if a suitable power source is operably connected, characterizing the rechargeable energy sources as power loads for association with the power allocation interface; and if suitable power source is not operably connected, characterizing the rechargeable energy sources as energy sources for association with the source allocation interface.

Each power load can have a load priority and the step of allocating the total power available to the power allocation interface can be performed in priority order from a highest priority power load to a lowest priority power load. The method can include one of: connecting power loads that are allocated power to the power bus; leaving power loads that are already connected to the power bus and that are allocated power connected to the power bus; disconnecting power loads that are not allocated power from the power bus; and leaving power loads that are already disconnected from the power bus and that are not allocated power disconnected from the power bus.

The step of calculating the total power available can include calculating a total average power available and a total peak power available and the step of allocating the total power available to the power allocation interface includes allocating the total average power and the total peak power.

Each power source and each energy source can have a source priority and the method can include: selecting the power source or the energy source with the highest source priority for connection to the power bus; connecting the power source or the energy source with the highest source priority to the power bus; disconnecting any remaining power sources or energy sources from the power bus; and powering all of the power loads connected to the power bus with the power source or the energy source having the highest source priority.

The method can include: sensing voltage on the power bus; generating a low voltage signal in response to the power bus voltage falling below a threshold value; and connecting one or more of the disconnected power sources or energy sources to the power bus in response to the low voltage signal.

The step of connecting one or more of the disconnecting power or energy sources to the power bus in response to the low voltage signal can occur in less than 10 msec. The step of connecting one or more of the disconnecting power or energy sources to the power bus in response to the low voltage signal can occur in less than 1 msec.

The low voltage signal can be conducted to semiconductor switches disposed on a conductive path between each of the disconnected power or energy sources and the power bus. Each of the semiconductor switches can change state in response to the low voltage signal. The change in state can cause each of the disconnected power or energy sources to be connected to the power bus over the conductive path between each of the disconnected power or energy sources and the power bus.

The steps discussed herein can be repeated at a refresh rate ranging from once every 10 minutes to 10,000 times every second. The steps discussed herein can be repeated at a refresh rate ranging from once every hour to 10,000 times every second.

The steps discussed herein can be repeated in response to an external power device being connected or disconnected from one of the plurality of device ports. The steps discussed herein can be repeated in response to an external power device being connected or disconnected from one of the plurality of device ports.

A second power manager can be connected to one of the plurality of device ports and the method can include the step of exchanging information and power with the second power manager.

Another aspect of the invention provides a method for operating a power network including the steps of: connecting a plurality of substantially identical power managers together with one wire cable extending between device ports of each pair of connected power managers; connecting at least one power load to a first of the plurality of substantially identical power managers; connecting at least one power or energy source to a second of the plurality of substantially identical power managers; and powering the power load by exchanging power between two or more of the connected power managers.

BRIEF DESCRIPTION OF THE DRAWINGS

The features of the present invention will best be understood from a detailed description of the invention and a preferred embodiment thereof selected for the purposes of illustration and shown in the accompanying drawings in which.

CALLOUTS

Figure 1:
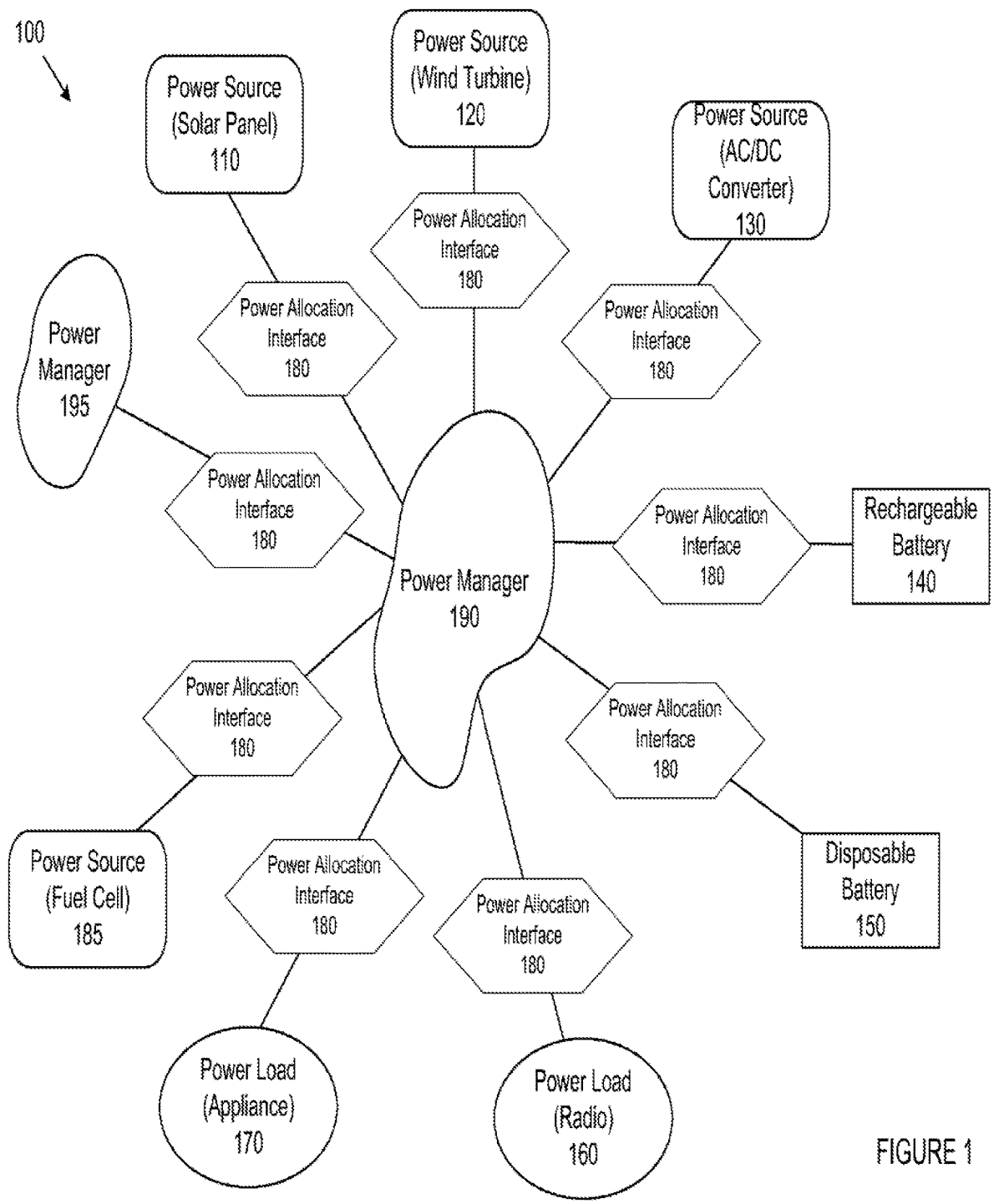
FIG. 1 illustrates a block diagram representing a power network that includes a power manager according to the present invention.

| | |
|---|---|
| 100 | Power Network |
| 110 | Power Source (Solar Panel) |
| 120 | Power Source (Wind Turbine) |
| 130 | Power Source (AC/DC Converter) |
| 140 | Stored Energy Source (rechargeable battery) aka rechargeable energy source |
| 150 | Stored Energy Source (disposable battery) |
| 160 | Power Load |
| 170 | Power Load |
| 180 | Power Allocation Interface |
| 185 | Power Source (Fuel Cell) |
| 190 | Power Manager |
| 195 | Power Manager |
| 200 | Power Network |
| 210 | Power Manager |
| 220 | Power Cables |
| 230 | Power Device or Portable Power Load Or Radio |
| 240 | Power Device or Portable Power Load Or radio |
| 250 | Power Device or Portable Power Load Or Geo-locating receiver |
| 260 | Power Device or Portable Power Load or Night Vision Goggles |
| 270 | Rechargeable Battery or Portable Power Storage Device or Power Generating Device Or Power Source |

-continued

| | |
|---|---|
| 280 | Local Power Source (Fuel Cell) |
| | or Power Storage Device |
| | Or Power Generating Device |
| | Or Power Source |
| 300 | Power Network |
| 310 | Cables |
| 320 | Power Storage Device |
| 330 | Power Load |
| 340 | Power Load |
| 345 | Power Converter or Rectifier |
| 350 | Power Source |
| 355 | AC Grid Connector |
| 360 | Power Storage Device |
| 370 | Power Storage Device |
| 380 | Power Storage Device |
| 390 | Power Cable |
| 400 | Power distribution system |
| 410 | Conductor (bus, power bus) |
| 420 | Data Processing Device |
| 425 | USB communications interface device |
| 430 | Memory Device |
| 440 | Power Converter |
| | (Voltage Control) |
| | (Voltage Converter) |
| 442 | Power Converter |
| 444 | Internal Power Network Interface |
| 450 | Field Effect Transistor (aka controllable switch) |
| 455 | Field Effect Transistor (aka controllable switch) |
| 460 | Field Effect Transistor (aka controllable switch) |
| 465 | Field Effect Transistor (aka controllable switch) |
| 470 | Field Effect Transistor (aka controllable switch) |
| 475 | Field Effect Transistor (aka controllable switch) |
| 480 | Field Effect Transistor (aka controllable switch) |
| 485 | Field Effect Transistor (aka controllable switch) |
| 490 | Field Effect Transistor (aka controllable switch) |
| 495 | Field Effect Transistor (aka controllable switch) |
| 500 | Power Network |
| 503 | Field Effect Transistor (aka controllable switch) |
| 505 | Field Effect Transistor (aka controllable switch) |
| 510 | (Scavenger) Power Converter |
| 515 | LED array |
| 520 | User Interface Device (Computer) |
| 525 | First Power channel |
| 530 | Second power channel |
| 535 | First power channel |
| 540 | Photovoltaic (solar) cell |
| 600 | Port Interface (Port Connection) |
| 605 | Connecting Cable |
| 620 | Power Device |
| 630 | Power Channel |
| 640 | Power Element |
| 650 | Network Interface |
| 655 | Data communication channel |
| 660 | Network Interface |
| 665 | Data communication channel |
| 670 | Cable Memory Device |
| 675 | Network Interface Device |
| 680 | Network Interface Device |
| 685 | Data Processing Device |
| 690 | Memory Device |
| 700 | Block Diagram |
| 705 | Load Power Allocation Interface |
| 710 | Power Discover Message |
| 715 | Power Offer Message |
| 720 | Power Request |
| 725 | Confirmation Message |
| 730 | Source Power Allocation Interface |
| 800 | |
| 810 | Radio |
| 820 | Power Manager Shim |
| 830 | Battery |
| 840 | Battery |
| 850 | Additional Ports |
| 905 | Output Port |
| 910 | Power Shim |
| 915 | AC/DC Converter |
| 920 | Output Power Converter |
| 925 | AC Input Port |
| 930 | Bus |
| 935 | Scavenger Port |
| 940 | Scavenger Converter |
| 945 | Conductive Pad Port |
| 955 | Port |
| 960 | Smart Converter |
| 965 | Port |
| 970 | Port |
| 975 | Conductive Pad Port |
| 1100 | Power Manager Enclosure |
| 1110 | Top Face |
| 1120 | Display Device |
| 1130 | Front Side Face |
| 1140 | User Interface Keypad |
| 1150 | Input Port |
| 1160 | Input Port |
| 1170 | Input Port |
| 1180 | Input Port |
| 1190 | Input Port |
| 1200 | Input Port |
| 1210 | End Face |
| 1220 | Back Face |
| 1230 | Indicator Lights |
| 1240 | Indicator Lights (Status lights) |
| 1250 | Orienting Feature |
| 1300 | Hot-change-over Circuit |
| 1305 | First power channel |
| 1310 | Third power channel |
| 1312 | Logic element - AND gate |
| 1314 | Logic element - OR gate |
| 1315 | Low Voltage Sensor |
| 1316 | Low voltage signal |
| 1317 | Output signal |
| 1318 | Input signal |
| 1320 | Second power channel |
| 1322 | Input signal |
| 1340 | Conductive path/conductive element |
| 1350 | Ground terminal |
| 1400 | Set of curves |
| 1500 | Hot-change-over Circuit |
| 1510 | Power channel |

DESCRIPTION OF THE PREFERRED EMBODIMENTS

Referring to FIG. 1, a power network (100) comprises at least one power manager (190) suitable for operably connecting with a plurality of external power devices. The power manager (190) is configured to exchange power with each of the plurality of external power devices connected therewith, including with another power manager (195). In the example embodiments described below, the power managers (190, 195) each include a plurality of device ports and each device port is for operably connecting with an external power device, which may include another power manager. In the preferred embodiment of the present invention, a wire cable extends between each external power device and a device port of a power manager. In other embodiments, other connecting schemes are usable including mating conductive pads or wireless inductive energy transfer without physical contact.

The power managers (190, 195) are configured to read information stored on a connected power device or wire cable. If the external power device or wire cable is appropriately configured, the power managers (190, 195) are configured to update or write information onto a connected external power device or wire cable. If the power device or wire cable is appropriately configured, the power managers (190, 195) are configured to exchange power management signals with the external power device or wire cable.

If an external power device is not configured for information storage or to exchange information and/or power management signals with the power manager (190), a "smart cable" is used to connect the external power device with the power manager (190). The smart cable stores information that corresponds with power characteristics of the corresponding external power device. Preferably, the power manager and connected external power devices exchange information using the SMBus network communication protocol used by many existing power devices. However, any communication protocol is usable without deviating from the present invention.

If an external power device is not configured for information storage or to exchange information and/or power management signals with the power manager (190) and a connecting scheme other than a wire cable is used, elements of the connection scheme store information that corresponds with power characteristics of the corresponding external power device. In this case, the connecting scheme also exchanges the information and, if needed, any power management signals with the power manager using the SMBus or other network communication protocol. The connecting schemes each include a power channel and a communication channel; however the power and communication channels may share the same wires, terminals and/or other pathways.

Generally, the power manager (190) operates to draw power from external power sources or external energy storage devices operably connected to device ports thereof. Additionally, the power manager (190) operates to distribute the power to external power loads operably connected to device ports thereof. The power is drawn and distributed according to an energy management schema operating one the power manager (190). In the case where the network (100) comprises a plurality of power managers (190, 195), each power manager (190) operates to draw power from external power sources or external energy storage devices operably connected to device ports thereof, to distribute the power to external power loads operably connected with device ports thereof and to exchange power between the operably connected power managers (190, 195).

In example embodiments described below, the power manager (190) is configured with a direct current (DC) power bus and exchanges DC power signals with connected power devices. However, a power manager (190) may be configured with an alternating current (AC) power bus for exchanging AC power signals with connected power devices without deviating from the present invention. A power manager (190) may include one or more power converters disposed between device ports and the power bus. The power converters may include DC to DC up, (boost) and down, (buck) voltage converters, voltage stabilizers, or linear voltage regulators, AC to AC up and down voltage converters, voltage regulators, voltage transformers etc. DC to AC up and down voltage converters or inverters, AC to DC up and down voltage converters or rectifiers, AC up and down frequency converters or variable AC frequency transformers and any of various other power converting elements as may be required or suitable to establish and operate a power network. Power converters are operably connected between a port and the power bus to convert power being delivered to the power bus by a connected power source or energy storage device or to convert power being drawn from the bus to a connected power load. Operating functions of the power converters are preferably controllable by the power manager (190, 195). A data processing device, described below is included in each power manager and is in communication with each power converter to vary the power converting characteristics of the power converter such as to vary the voltage or the current or power amplitude of the power signal passing over the power converter.

In one example embodiment, DC to DC power converters comprising a Split-Pi power converter circuit may be used. The Split-Pi power converter includes both boost (step-up) and buck (step-down) voltage converting circuits, e.g. using two switching MOSFET bridges. These devices operate bidirectionally to convert the voltage of an incoming power signal to the power bus voltage or to convert the voltage of an outgoing power signal from the power bus voltage to the voltage of a connected power load. Feedback loops may be used on either side of a power converter to monitor its output voltage or current and to vary control parameters of the power converter, e.g. a switching duty cycle of a MOSFET bridge, to maintain a desired output voltage or current amplitude. The feedback loops may be incorporated within the power converter or may comprise elements of the power manager (190). In other embodiments there may be reasons to use one way DC to DC power converters wherein the power converter channel is only used as a unidirectional conductor and current flow is prevented in the opposite direction.

Referring to FIG. 1, power sources, (110, 120, 130, 185) comprise sources of generated power. For example, the power source (130) delivers AC power from an electrical power grid or a portable electrical power generator. In this example, the power source (130) optionally includes a power converter to convert the generated AC power to DC power compatible with the portable power manager (190). Alternately, the portable power manager (195) may include a power converter that converts AC input power to DC power compatible with the portable power manager. Alternately, the power manager may communicate with the power source (130), obtain source configuration information and command the power source (130) to reconfigure itself or operate in a mode that converts its AC input power to DC power compatible with the power manager.

Other power sources such as a solar panel (110) or a wind turbine (120) comprise electrical power generators that convert renewable energy resources to DC electrical power and in the examples of the present invention; power generators that deliver a DC power signal are preferred. A fuel cell (185) or other chemical power generator is also connectable to the power manager (190) as a power source and is configured to generate DC electrical power from a chemical reaction or other chemical process. Other example power sources operably connectable to the power manager (190) include hydroelectric or wave power generators or a mechanical or electrical power generator such as a vehicle alternator. Generally, a power source suitable for use by the network (100) comprises any power generator that generates power that is compatible with the power manager, with or without power conversion, and that provides information that characterizes the power signal in a form that is readable by the power manager (190). The power sources (110, 120, 130, and 185) may provide a substantially continuous supply of generated power for as long as the power manager (190) is connected with the power source, e.g. a power grid, or the power source may have a finite operating time, such for as long as there is a fuel supply. The power sources (110, 120, 130, and 185) may be immovable, e.g. a power grid outlet, portable such as movable by a vehicle, man packable such as a small fuel cell.

Stored energy sources (140, 150) comprise electrical energy storage devices such as batteries and capacitors. Stored energy sources may comprise a one-time use device such a disposable battery (150) or a rechargeable device such as a rechargeable battery or capacitor (140). Energy storage devices store a finite quantity of electrical charge and the amount of charge stored on a particular energy storage device is typically characterized by a "charge capacity." Charge capacity ratings, usually expressed in ampere-hours, quantify the total charge that a fully charged energy storage device is able to deliver on discharge.

Energy storage devices may include elements that track, measure and report a "remaining charge capacity," such as a percentage of the total charge capacity. The remaining charge capacity may be reported to the power manager electrically or otherwise indicating to user by a visible or audible signal. For example, the energy storage device may report or indicate that a remaining charge capacity is 20% of the total charge capacity or that the energy storage device has used up 80% of the total charge capacity.

A rechargeable energy storage device (140) operably connected with the power manager (190) may comprise an energy source while being discharged or a power load while being recharged. Moreover, the power manager (190) is configured to change its operating mode in order to treat a connected energy storage device as an energy source or a power load. Rechargeable energy source (140) may also store information relating to both its discharging and recharging characteristics and the power manager (190) may read or otherwise determine the discharging and recharging characteristics of the rechargeable energy source (140) in order to optimally discharge and recharge the device.

Energy storage devices may include conventional rechargeable batteries such as lithium ion, lead acid, nickel cadmium, nickel metal halide or any other type of rechargeable battery of various operating voltages. These may include conventional commercial and military batteries that range in voltage from about 1.5 to 50 volts such as commercially used AA, AAA, C-cell, D-cell and 9-volt batteries or 15-volt and 30-volt military batteries such as the BB-2590 and, LI-145 lithium ion batteries, which may be carried by infantry soldiers in mission situations and used as power sources for the power network configuration shown in FIGS. 1 and 2. Moreover, a plurality of batteries may be installed in a holder or terminal and connected in parallel or in series such that a plurality of batteries may be connected to a single network port of a power manager (190) by a single cable. Additionally, 6, 12, 24, 40-volt vehicle and other batteries may be connected to a power manager using appropriately configured cables in order to harvest or scavenge power from available battery sources. In addition, non-rechargeable alkaline or lithium batteries may also comprise a power storage device in AA, AAA, C-cell, D-cell and other battery configurations and these batteries may be held in a battery holder and connected in series or in parallel to deliver energy at selected voltages. In any event, each an energy storage device connected with the power manager (190) by an operable connection includes information relating to power characteristics of the energy storage device stored on the energy storage device or on elements of the operable connection and the power manager at least reads the information to determine the power characteristics. Alternately, the power manager may update the information and exchange power management signals with connected energy storage devices. A disposable or non-rechargeable energy source operably connected with the power manager (190) is generally used until its stored charge is depleted and then disconnected from the power manager and discarded.

Power loads (160, 170) comprise operably connected power devices that draw power from the power manager (190). Moreover, the power manager (190) itself may comprise a power load that draws power from connected power and energy sources to operate; or the power manager (190) may include a separate internal energy source such as a battery. In the present example embodiment, the power loads preferably draw DC power and generally comprise portable devices that are normally powered by DC power such as DC batteries or the like. However, AC power loads that include or are operably connected to the power manager over a DC to AC inverter can be powered by the power manager (190).

Power devices may comprise "smart devices" or "dumb devices." A smart device at least includes a non-volatile data storage element that is readable by the power manager (190). A smart device may further comprise processing elements effective to measure or control aspects of the power device. A smart device at least includes power characteristics of the device stored on the storage element. Additional information stored on a smart device may include any aspect of the energy management schema operating on the power manager (190). A smart device may monitor modify store and/or report aspects of the energy management schema to the power manager (190). A dumb device does not include a non-volatile data storage element or any other data infrastructure that is readable by the power manager (190). A dumb device may also include a power device that is capable of data exchanges with other devices but that does not communicate using a communication protocol that is supported by the power manager (190). Most disposable batteries are dumb devices. Generally, dumb devices can be operably connected with the power manager (190) using a "smart cable". To do so, a smart cable is configured to correspond with the dumb device and a data set describing power characteristics of the dumb power device are stored on the smart cable in a manner that the data can be read by or otherwise communicated to the power manager (190). In some embodiments, a smart cable is self-configuring based upon one or more physical aspects of the dumb power device (such as a connector configuration). In other embodiments, a smart cable is "programmed" with information about the dumb power device. Alternately, a smart cable stores a device identifier which is read by the power manager and the power manager uses a device lookup table to obtain power characteristics associated with the device identifier. In the case of disposable batteries, one or more disposable batteries may be installed into a battery holder with the battery terminals conductively connected to the power manager (190) over a smart cable and with power characteristics of the disposable batteries stored on the smart cable for communication to the power manager. Alternately, the battery holder may store the power characteristics of the disposable batteries and communicate the power characteristics of the disposable batteries to the power manager by a wireless signal.

Smart devices operably connected with the power manager (190) may also include a variety of components that may be responsive to power management signals initiated by the power manager (190). For example, smart devices generally respond to power management signals initiated by a connected power manage by exchanging information or power with the power manager. However, other response options are possible when the power manager issues a power management signal to the operably connected power devices. For example, the power manager (190) may communicate with a connected power device, determine various operating modes or parameters of the power device and select and/or configure operating parameters of the power device according to instantaneous power conditions on the power network (100) or according to preferred operating modes of the power manager. For example, a power manager (190) may send a power management signal to an operably connected power device instructing the connected power device to use a desired operating voltage, a desired communication protocol, desired current amplitude, or other desired power parameters. Other power management signals may include sending a pending disconnect warning to a power device, sending an estimate of how long the available power on the network might last based on current power network conditions and other power related data as may be available or determinable by the power manager (190) or the power manager in cooperation with connected smart power devices.

A power device operably connected to a single device port of the power manager (190) may comprise a plurality of power devices. For example, an energy storage device may include two or more rechargeable or disposable batteries that are connected in series, connected in parallel or capable of being individually connected to the power bus of the power manager over the same device port. In a further example, a power device operably connected to a single device port of the power manager (190) over a single cable or other operable connection may comprise two or more power loads or a combination of power loads and energy storage devices. In such cases, the power devices may be reconfigured to operably connect one or more of the plurality of power devices to the power manager power bus and the power devices many be connected individually or jointly.

The power manager (190) further comprises an energy management schema operating thereon. The energy management schema comprises various programs, firmware algorithms or the like operating the power manager and may include analog devices and processes. The energy management schema operates as a power allocation interface (180) to collect power characteristics from each connected power device, to track available power and to distribute the available power to connected power loads according to various energy management schema objectives, which may include delivering power to power loads according to a power priority assigned to each power load. An energy management schema can be stored within a single power manager, distributed between a plurality of power managers, or stored in a distributed fashion between power managers, power cables, and power devices.

Generally the power manager (190) operates to maximize the amount of usable power in the power network (100) by summing the power capabilities or power contribution attributable to all of the connected power or energy sources, and then by allocating this total available power to connected power loads in a prioritized fashion. To do this, the power manager first reads the power characteristic data for each connected power source and obtains average and peak power capacities of each power or energy source. The energy schema then calculates a total available average power, and a total available peak power.

The power manager then reads or otherwise ascertains the power characteristic data for each connected power load and obtains average and peak power requirements as well as a device priority of each power load, including the power loads associated with recharging energy storage devices. The energy management schema then compiles a list of connected power loads, in priority order with the highest priority load device at the head of the list. Once this list is complete, the power manager starts at the head of the list, assigning average and peak power to each load device on the list, and subtracting that average and peak load from the total available power. The power manager continues down the list, assigning power to each load device on the list, until the total available average or total available peak power reaches zero (or a negative number). At this point, devices of a lower priority that have not yet been assigned power are disconnected from the power bus. The energy manager schema is periodically repeated, e.g. once per second, or each time a power device is physically connected to or disconnected from a device port. As such, if power requirements change, the power manager will recognize these changes and will adjust which power loads and power or energy sources are connected to the power bus and which power loads and power or energy sources are disconnected from the power bus according to the amount of average and peak power available.

Power characteristic information stored on smart cables, smart device and on the power manager and usable by the energy management schema comprises some or all of the following elements:

Power device type (disposable or rechargeable energy storage device, generated power source, power load, DC device, AC device, etc);

Power device ID (e.g. a MAC address, port number or the like);

Power device network address;

List of communication protocols and functions supported;

A device power priority;

Power management logging data specifications: (specifications for information to collect and how to store it in the power manager);

Power management data and control encoding instructions (logging, log data to collect (e.g. hours of use, number of connector insertions, etc.) log delivery, formats for reading power devices, power device control instruction specifications); and Power characteristics (including operating power type (AC or DC), operating voltage range, average and peak current amplitude or average and peak power amplitude, operating temperature ranges, present rated charge capacity, fuel level, etc.).

For rechargeable energy storage devices, power characteristics may include operating voltage, charging voltage, operating current amplitude range, charging current amplitude, charging cycle type, etc.

For non-reachable energy storage devices, power characteristics may include: charge-rated capacity, thresholds (in volts, amps, % of maximum for volts or amps, length of time in service), and the like.

For more complex power device, power characteristics may include a list of power devices and associated power characteristics, a list of operating modes and instruction regarding how to change operating modes, etc.

A single power manager (190) manages a local power network in accordance with the energy management schema operating thereon. During the management of the local power network, the power manager (190) operates independently to monitor the states of locally connected power devices and connect or disconnected the locally connected power devices to the local power bus and distribute power in accordance with the local energy management schema. In addition, locally connected devices may be controlled and reconfigured in response to power management commands initiated by the power manager (190).

If the power network (100) comprises a plurality of interconnected power managers (190) and (195) the connected power managers may exchange energy and power management signals. This permits the connected power managers to operate in an integrated fashion while still operating the local power network according to the local energy management schema. In local mode, each power manager still operates independently to monitor the states of locally-connected power devices and to connect or disconnected the locally-connected power devices to the local power bus as required by the local energy management schema. Integrated operation includes exchanging information and power between connected power managers. The energy management schema operating on each power manager (190, 195) may then sum the total average and peak power available on the local network, e.g. power devices connected to the power manager (190), and operate to distribute power provided by locally connect sources to locally connected loads. Thereafter the power manager (190) may offer excess power to or request additional power from the connected power manager (195). The power manager schema is periodically repeated, e.g. once per second, or each time a power device is physically connected to or disconnected from the network (100). As such, if power requirements change, the integrated power managers will recognize these changes and will adjust which power loads and power sources are connected to the power bus and which ones are disconnected from the power bus according to the amount of average and peak power available on the power network.

The networked power managers are advantageous over existing solutions such as the power distribution system disclosed in U.S. Pat. No. 5,570,002 by Castleman because Castleman has one power supply distributing power to many power loads and a failure or disconnect of the one power source immediately causes a power interruption to all the power loads. Conversely, the energy management schema operating on a single or local power manager network of the present invention or on an integrated power management network (100) of the present invention utilizes a plurality of power sources and adjusts power distribution substantially in real time to deliver power to high priority devices even when one power source fails or is disconnected from the network. In addition, the power managers (190) and (195) as well as some of the connected power devices are man-portable such that the network (100) may comprise a completely man-portable network as a local network or may comprise an integrated power network when power managers are connected together such as at a base camp.

Figure 2:
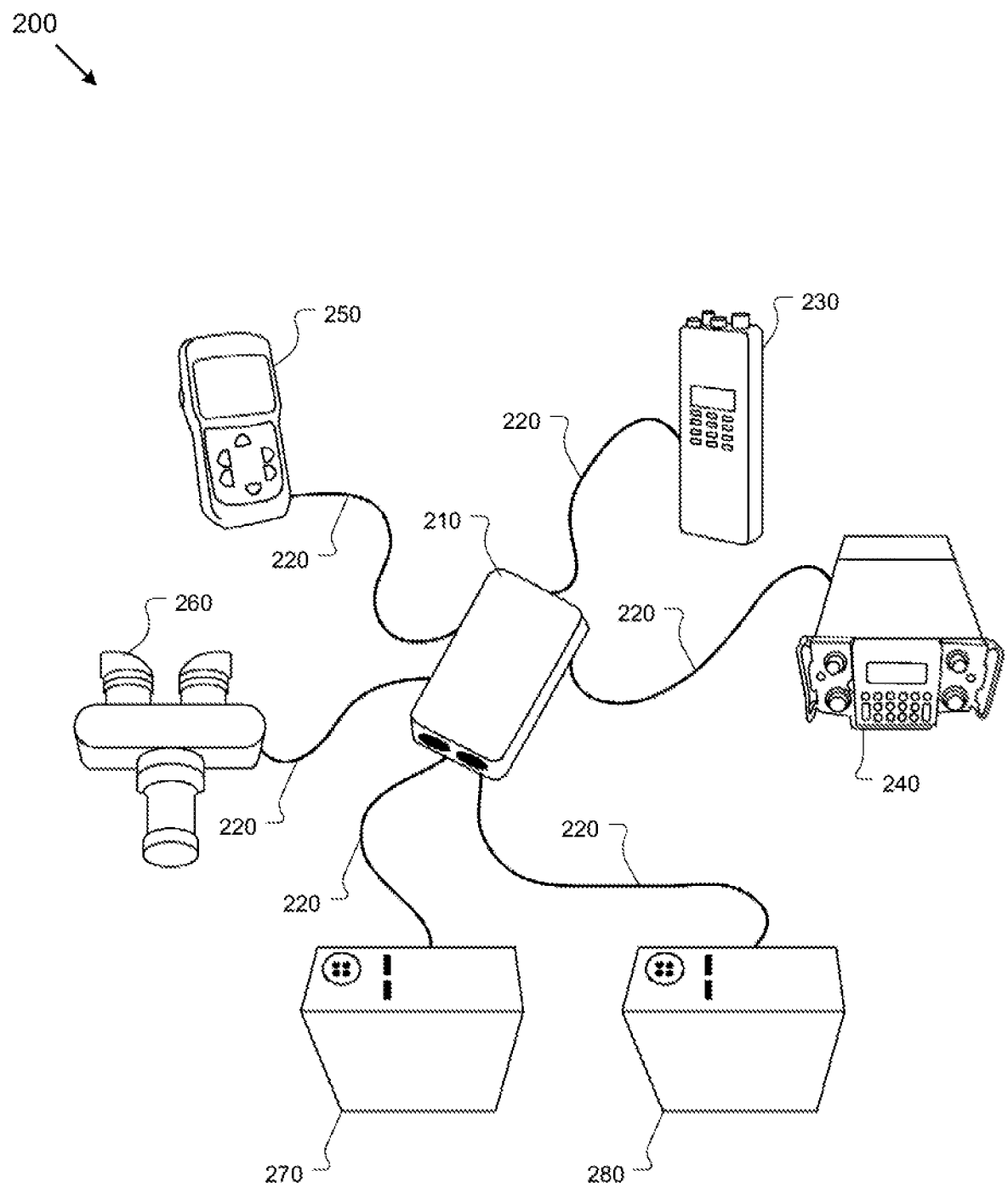
FIG. 2 illustrates a schematic representation of a single power manager power network configuration according to the present invention.

Referring now to FIG. 2, an example single or isolated power network (200) according to the present invention comprises a single power manager (210) and a plurality of power devices electrically connected with the power manager (210) by a wire cable (220) associated with each power device. Preferably, the power cables are detachable from the power manager (210) and from each power device. This permits ease of portability, allows connected power devices to be disconnected from device ports of the power manager and replaced by other power devices, allows field replacement of defective or damaged cables, and to allows "smart" power cables to be reprogrammed or reconfigured as required. Preferably, each wire cable (220) includes a first end connector matching a connector configuration of the corresponding power device and a second end connector matching a connector configuration of the power manager device ports. Each power cable (220) includes one or more power channels and at least one data communication channel and the data commutation channel may be over a power channel or over a wireless channel. If the cable (220) is a smart cable it includes a memory device or other information storage device with power characteristics of the corresponding power device stored on the smart cable in a form that is readable by the power manager (210) using the SMBus communication protocol or another communication protocol supported by the power manager, e.g. USB. If the power device is a smart device, the cable (220) includes a data channel that extends from the power manager to the power device and the power characteristics of the corresponding power device are stored on the smart device. However, a smart device can be connected to the power manager by a smart cable and some or all of the power characteristics of the corresponding power device may be stored on the smart device, on the smart cable or on both.

In various embodiments, a power device connected to the power manager (210) by a single cable (220) may comprise a plurality of power devices. The plurality of power devices may be ganged together and functioning as a single power device. In this case, the power manager (210) treats the plurality power devices as a single device and may not even be aware that the single device comprises a plurality of power devices. One example embodiment of a plurality of power devices being treated as a single power device is when the plurality identical batteries are connected to the device port in series or in parallel. Alternately, the plurality of power devices may be individually addressable and capable of functioning independently. In this case, the power manager (210) may independently read power characteristics of each of the plurality of power devices connected to the power manager over the same device port and treat each power device separately in the energy management schema. One example embodiment of a plurality of power devices being individually addressable is when the plurality of power devices comprises a power load and an integrated rechargeable battery in one power device. In this case, the power manager may recognize that two devices are connected or connectable and utilize the rechargeable battery as a power source, and include the power load and the rechargeable battery in the list of power loads to be powered according to device priority. Accordingly, the power manager (210) is configured to manage the port connection and communication with power devices connected to the each device port to determine if the connected power devices comprise a plurality of independent power devices and if so to treat each device separately in the energy management schema. In cases where a power device connected to a single device port comprises a plurality of individually addressable power devices, the connecting cable (220) may include separate power and data channels for each of the plurality of individually addressable power devices, or a single power and data channel may be shared by the plurality of individually addressable power devices. Moreover, each of the plurality of individually addressable power devices may have a different device address reachable by the power manager or the power device may have a single device address and operate to manage communication and power distribution within the power device to address each individually addressable power device incorporated therein.

In various embodiments, a power device connected to the power manager (210) by a single cable (220) may comprise a reconfigurable power device. One example embodiment of a reconfigurable power device comprises a rechargeable battery (270) that comprises two batteries connected together in parallel wherein either the connecting cable (220) or the rechargeable battery (270) can be reconfigured, either manually or automatically, to connect the two batteries together in series, e.g. to change an operating voltage of the rechargeable battery. In this case, the power information stored on the power device or the smart cable associated with the power device alerts the power manager that the device can be reconfigured and the power manager may reconfigure the power device by issuing a power management signal to automatically reconfigure the cable (220) or the rechargeable battery (270) or the power manager may notify a user to reconfigure the rechargeable battery manually. If a power device connected to a single device port comprises a reconfigurable power device, the connecting cable (220) or the reconfigurable power device may include information stored thereon about the power characteristics of the reconfigurable power device in each possible device configuration as well as instructions about how to reconfigure the device.

In operation, when a power device is connected to the power manager (210) the power manager reads power and data characteristics of the power device from the power device or the cable (220) associated with the power device, or both. The power and data characteristics can be used to select an appropriate communication protocol, to determine the device type, e.g. load, source, rechargeable battery, or combination, and various power characteristics of the connected power device or cable. The power characteristics may include an operating voltage range, average and peak power or current values, rated charge capacity of an energy storage device, charge remaining on an energy storage device, a power priority of the power device and/or other power characteristic data as may be available. Alternately, the power characteristic may comprise a device code or identifying class of the power device and the power manager may look up the power characteristics associated with the device code or identifying class in a lookup table stored on the power manager. Based on information read from the device, cable, or look up table, the power manager (210) may determine that the particular power device is not compatible with the power manager (210) in its current configuration and generate an error indication and/or suggest a solution. Otherwise, the connected power device is integrated into the power network for power exchanges with the power manager as governed by the energy management schema.

The power manager (210) operates in various modes to allocate and distribute energy provided by power sources over the power network (200) according to power priority settings and/or other aspects of the energy management schema. In addition, the power manager (210) may change its configuration using switching elements to open or close device port connections as required, to map power converters inline with a device port, to redistribute power according to power device priorities and/or to prevent the power manager or a connected device from being damaged. In addition, the power manager (210) may change the configuration of and/or power characteristics of a connected power device by issuing a command to the connected power device.

Man-Portable Power Network

Figure 4:
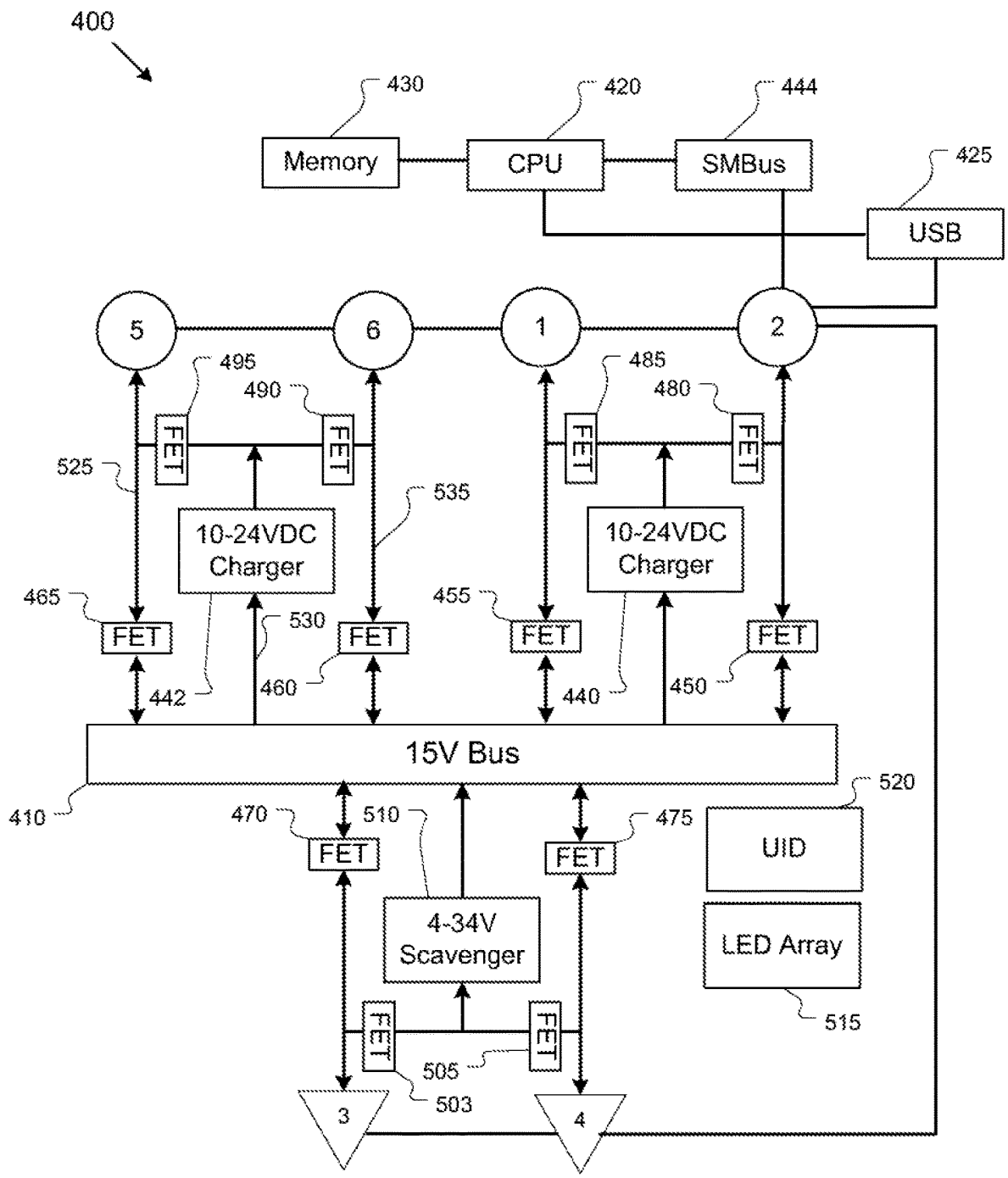
FIG. 4 illustrates a block diagram representing elements of a first example embodiment of a power manager according to the present invention.

In a specific example embodiment, the power network (200) comprises a plurality power devices that are expressly designed to be man-portable. For example, man-portable devices include devices carried by a backpacker or an infantry soldier. It is key to some embodiments of the power network (200) described herein that the power manager (210), power cables (220), and at least some of the power devices connected thereto be man-worn or man-portable. As shown in FIGS. 2 and 4, the exemplary power network (200) comprises a portable power manager (210) configured with six device ports with up to six connected cables (220) used to exchange energy and power management signals with up to six power devices such as portable power loads (230, 240, 250, 260), a portable energy storage device (270), such as a disposable, (one time use), or rechargeable battery, and a portable power source (280), such as a man-worn or man-packable fuel cell. In the specific example embodiment of the power network (200), the power loads may include man-worn or man-packable radios (230, 240), a global geo-location positioning receiver (250) and night vision goggles (260). In addition other electric power loads such as man-worn cooling equipment, a portable computer, a portable camera, additional telecommunication systems and other portable electronic devices may be connected to ports of the power manager (210) by disconnecting one or more of the power loads (230, 240, 250, 260) and connecting an alternate power load into the available device port as may be required.

The power manager (210) is specifically configured for man-portable applications and is especially configured to have a weight of less than 500 grams and to have a sealed, e.g. water tight, enclosure that is small enough to be inserted into a pocket formed on a back pack or article of clothing while still providing access to all of the device ports to connect and disconnect cables. In addition the power manager (210) includes a user interface module, indicator lights associated with each device port, and may include a visual display device, all of which are configured for ergonomic use and reliable performance.

The power manager (210) is specifically configured for man-portable applications and especially configured to avoid power interruptions to mission-critical power devices connected to the power manager. As such, the power manager (210) is preferably operated with two power or energy sources (270), (280) connected to two different device ports at all times and with at least one power or energy source having an operating voltage that matches a bus voltage of the power manager. In the example embodiment (200), the two sources are the rechargeable battery (270) and the man-portable fuel cell (280). In this case, the rechargeable battery (270) and the power manager power bus each operate at 15 volts DC such that the rechargeable battery (270) can be directly connected to the power manager power bus without a power conversion. Alternately, two rechargeable batteries (270) or two man-portable fuel cells are usable, provided that at least one of the fuel cells operates at the same voltage as the power bus and meets other requirements for direct connection to the power bus without power conversion. As will be further described below, in one mode of operation, the power manager (210) only connects one of the two sources to the power bus at a time holding the second source in reserve and automatically connecting the second source to the power bus as soon as it becomes apparent that the power demands of high priority or mission critical power loads can no longer be met by the single source.

More generally, the power network (200) comprises a single power manager (210), operably connected with one or more power loads (230, 240, 250, 260) and one or more power sources (270, 280) by connecting power cables (220) connected with individual device ports of the power manager (210). The power manager (210) and each of the power devices, or connecting power cables (220), are configured to exchange energy and power characteristics of the connected devices and possibly power management signals as described above. Each power device may also be assigned a device-specific power priority setting and the device priority setting is used to carry out the energy management schema operating on the power manager (210). The power manager (210) is configured to receive power from power and energy sources (270, 280) and to allocate available power to the power loads with high priority power loads being fully powered as required and low priority power loads being switched off if the available power on the power network is less than the instantaneous power demand.

In some exemplary uses, a power network that includes mission critical devices such as a radio or a geo-location position receiver is configured by assigning a relatively higher power priority to the mission critical devices and assigning a relatively lower power priority to less critical power devices such as man-worn cooling equipment. Generally, default power device priority settings are included in the power characteristic information stored on smart power devices and smart cables. The power priorities may vary from mission to mission according to the mission duration, the mission objectives and the power devices to be carried on the mission. Accordingly, power device priorities are routinely updated on the power devices and cables by connecting the power device and/or cable to a computer or to a power manager connected with computer. Alternately, a plurality of default power device priority settings are downloaded onto to the power manager (210) as part of the energy management schema and may be used when no other default value is available or when the power manager default value is set to override power device default settings. Default device power priority settings (or any other energy management schema settings) stored on the power manager can be changed by downloading new settings to the power manager (210) from a computer or the like connected to a device port.

The power and energy sources (270, 280) for a man-portable mission may include rechargeable and non-rechargeable batteries and a generated power source such as a man-portable fuel cell. If the energy source is a rechargeable energy storage device (270), the power manager (210) may be configured to determine a charge-rated capacity and the amount of charge remaining on the energy storage device by reading power information associated with the device (270) or by exchanging power information with the device (270) or its associated power cable. Typically, the amount of charge remaining on the energy storage device is reported over a range of approximately 5% to 100% with 100% being a fully charged battery and 5% being a 95% discharged battery. The remaining charge value of each rechargeable battery may reported to a user e.g. by lighting indicator lights provided on the power manager proximate to the corresponding device port or by displaying a value on a visual display device. When operating with a rechargeable battery-type power device, the power manager (210) may operate in a mode that either draws power from the rechargeable battery (270) to operate other power devices connected to the power network (200), or delivers power or charge to the rechargeable battery-type power device (270) to recharge the battery to a higher charge level. However, the operating modes are managed by the energy management schema, which may choose to charge a rechargeable battery under certain circumstances but generally will not recharge a battery on a man-portable mission.

The power network (200) includes power loads (230, 240, 250, 260) for which the load characteristics vary over time because not all of the power loads are used at the same time and because individual power loads may have peak and non-peak power requirements as well as standby modes that reduce power consumption when a power device is not in use. The power sources (270) and (280) may also vary their power characteristics over time e.g. depending on temperature and remaining charge value. Moreover, the power sources may have a peak current amplitude that can not be exceeded and that occasionally may not meet the current demands of connected power loads. Accordingly, even using the energy management schema, the actual available power may vary from predicted available power determined by the energy management schema and some power demands may go unmet. However, the energy management schema addresses high priority power demand first.

Networked Power Manager Examples

Figure 3:
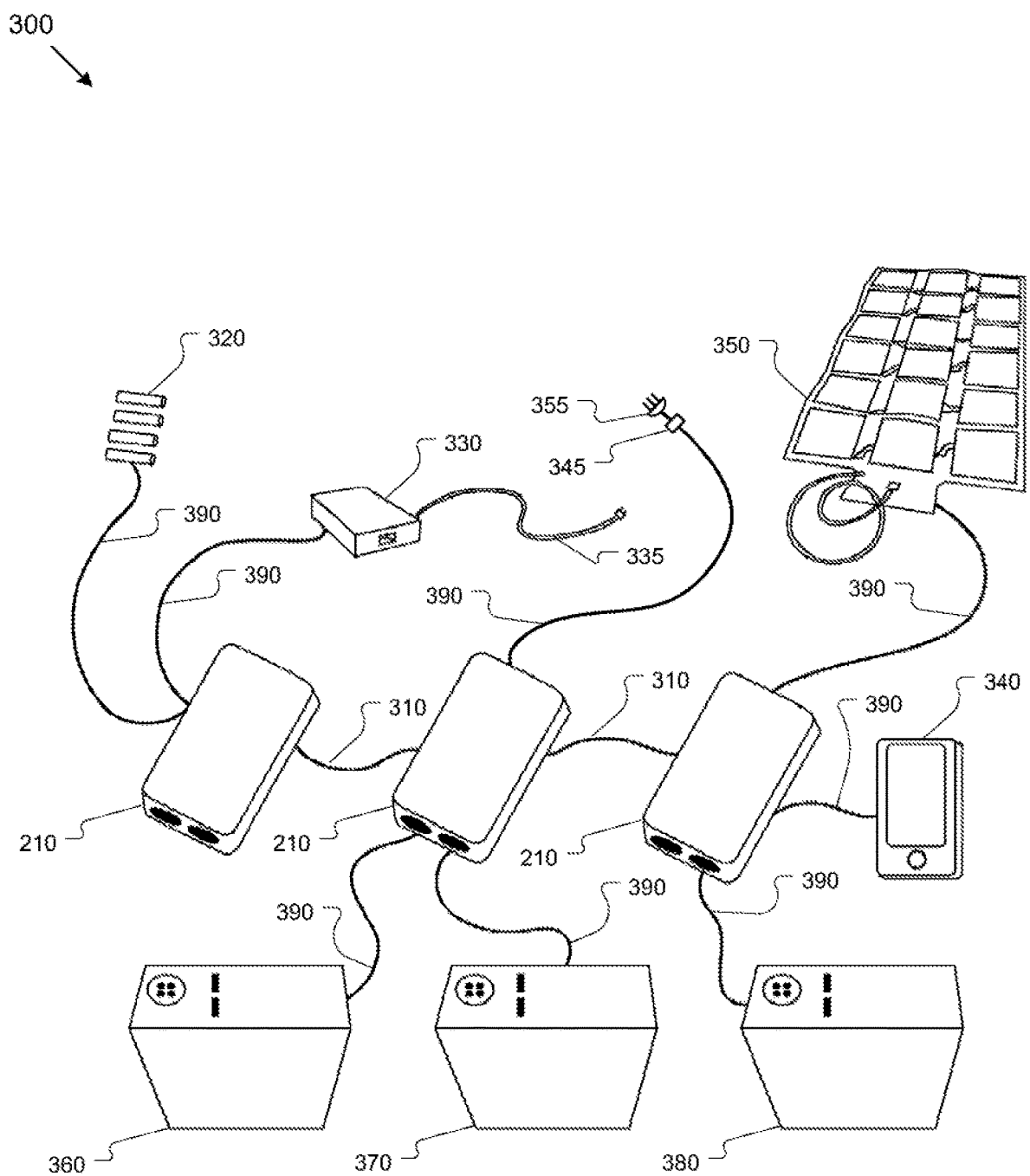
FIG. 3 illustrates a schematic representation of a multiple power manager power network configuration according to the present invention.
Figure 5:
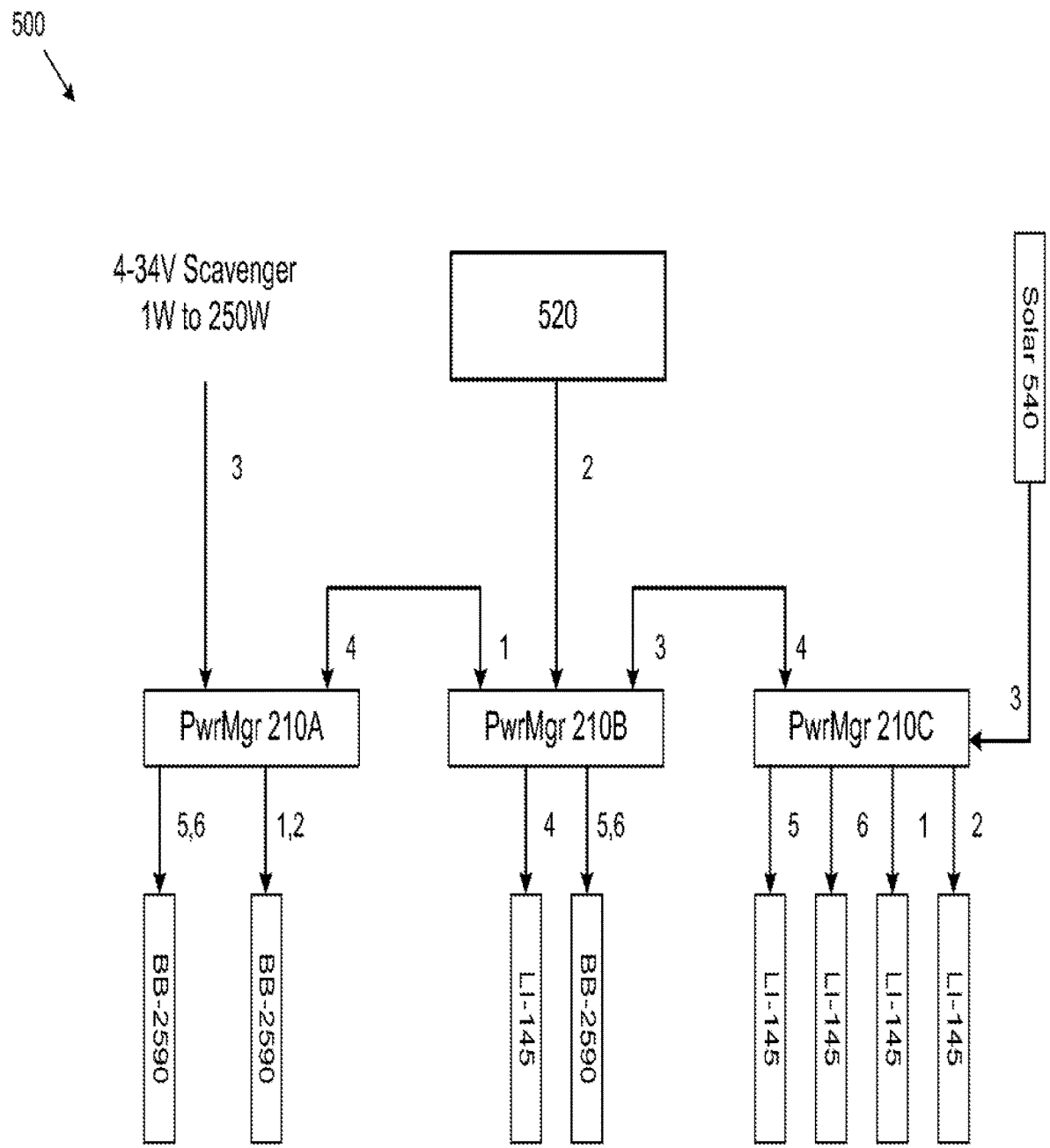
FIG. 5 illustrates a block diagram representing elements of a second multiple power manager power network configuration according to the present invention.

Referring now to FIGS. 3 and 5, a second example embodiment of a power network of the present invention comprises power networks (300) and (500), which each include a plurality of man-portable power managers (210) connected together by cables (310) for exchanging power and power management signals bi-directionally between connected power managers (210). Referring to FIG. 3, each of the plurality of power managers (210) may include one or more power loads (330, 340), one or more power generating sources (350) and one or more energy storage devices (320, 360, 370, 380) each connected to different device ports of the power manager (210) by corresponding cables (390). For example, the networks (300) and (500) comprise ad hoc power networks established at a base camp or at any location where the power devices are not being transported. The ad hoc networks (300) and (500) may be configured when a suitable power source is available and when rechargeable energy storage devices need recharging. In one example, the ad hoc networks (300) and (500) may be established between trips or in a stationary configuration and the ad hoc networks (300) and (500) may be used to power other devices in a base camp, or the like, such as lighting, heating, or cooking elements and non-man-portable electronic devices. More importantly, the ad hoc networks (300) and (500) are established to recharge batteries. To establish an ad hoc power network, a squad of infantry soldiers, e.g. up to 10, may combine each soldiers' power manager (210) and various power devices carried by the soldiers in a manner suitable for meeting the immediate power needs of the squad. Moreover, power devices and power managers may be added as needed to connect additional power devices and take advantage of power sources as they become available.

In the ad hoc power networks (300) and (500), non-man-portable power and energy sources may be used when available. These may include a vehicle battery or alternator, a gasoline powered generator, a non-man-portable fuel cell, a wind turbine, a solar panel, or an AC power grid. The AC power grid may be accessed over a cable (390) using an AC grid connector (355) and a power converter or rectifier (345) to convert the AC grid power to input power usable by a power manager (210), e.g. 15 volts DC. Otherwise, whatever man-portable power and energy sources that are available, e.g. rechargeable batteries (360, 370, 380) and/or non-rechargeable batteries (320), man-portable fuel cells and man-portable solar blankets (350) can be used as power sources suitable for establishing an ad hoc power network (300) or (500) and potentially recharging batteries.

As described above, each power device connected to the networks (300) and (500) includes power characteristic information relating to the particular power device stored on the power device or on a corresponding cable (390) in a form that is readable by a connected power manager (210). Additionally, each connected power device may comprise a plurality of power devices connected over a single device port, a reconfigurable power device, or a smart power device capable of two way data and command exchange with a connected power manager (210). Each power manager (210) is configured to identify another power manager (210) connected to it and to exchange power and power management signals with a connected power manager. Each power manager (210) is configured to identify locally connected power devices, read power characteristic information from each locally connected power device and distribute power to locally connected power devices according to the energy management schema operating on each of the connected power managers (210). In an embodiment of the power manager (210) each power manager can connect to one or two other power managers, however up to ten power managers can be connected together in series in a single power network (300). Of course, other ad hoc configurations are possible including interconnecting an unlimited number of power managers without deviating from the present invention.

In cases where a power manager (210) is connected to another power manager, each power manager forms a local power network that only includes the power devices connected to that power manager. Each power manager (210) identifies the locally connected power devices and operates according to the energy management schema operating on that power manager. Accordingly, each power manager operates to maximize the amount of usable power in the local network by summing the power capabilities or power contribution attributable to all of the locally connected power sources, and then by allocating this total locally available power to locally connected power loads in a prioritized fashion. To do this, each power manager (210) first reads the power characteristic data for each locally connected power source and obtains average and peak power capacities of each locally connected power source, including locally connected energy storage devices such as rechargeable batteries. The energy schema operating on the power manager then calculates a total of the locally available average power, and a total of the locally available peak power.

Each power manager then reads or otherwise ascertains the power characteristic data for each locally connected power load and obtains local average and peak power requirements as well as a device priority for each locally connected power load, including locally connected energy storage devices such as rechargeable batteries. The energy management schema then compiles a list of locally connected power loads, in priority order with the highest priority load device at the head of the list. Once this list is complete, each power manager starts at the head of the list, assigning locally average and peak power to each locally connected load device on the list, and subtracting that average and peak load from the total locally available power. The power manager continues down the list, assigning power to each locally connected load device on the list, until the total locally available average or total locally available peak power reaches zero (or a negative number). At this point, if the local power demands are unmet, each power manager (210) may communicate with a connected power manager to request power from the connected power manager. Alternately, if the local power demands are exceeded, each power manager (210) may communicate with a connected power manager to offer power to the connected power manager. If sufficient power is still not available, each power manager may disconnect locally connected lower priority power devices from the corresponding local power bus.

Energy management schema events are periodically repeated at a default refresh rate, e.g. once per second to continuously monitor a configuration of each local power network and distribute power accordingly. In addition, the energy management schema events are initiated each time a power device is physically connected to or disconnected from a device port. The default refresh rate is a variable parameter of the energy management schema and can be automatically increased or decreased according to instantaneous or historic network conditions.

In some embodiments, the energy management schema refresh rate can be selected using the power manager user interface. In other embodiments, an energy management schema refresh rate is preset and not changeable through the user interface. In still further embodiments, the energy management schema refresh rate may be varied by the energy management schema, e.g. in response to parameters of the local network. As such, if local power requirements change, the next refresh of the energy management schema events detects the local changes, reacquires the total locally available average and peak power, rebuilds the list of locally connected power loads sorted by power priority and take actions to redistribute local power accordingly, and if needed, to offer power to or request power from a connected power manager.

The actions taken by a power manager to redistribute power according to the energy management schema may include connecting a power device to or disconnecting a power device from the local power bus, reconfiguring a power converter to adjust a voltage, current or power amplitude, reconfiguring a connected power device and/or exchanging power with another power manager (210).

Source Priority

According to a further aspect of the present invention, each power source or energy storage device may be characterized with a source priority rating that relates to the economics and/or efficiency of operating the power source or that relates to other characterizing features of the power or energy source. The source priority rating may comprise an element of the power characteristic information stored on the source itself or on a smart cable connecting the source to the power manager. Alternately, default source priority ratings may be included in the energy management schema and the source priority rating of the energy management schema may supersede the source priority rating reported by each source. In some embodiments, the source priority ratings are a variable parameter of the energy management schema and may be changed through the user interface or preset, e.g. prior to a mission and not able to be changed through the user interface.

According to one example, renewable energy sources such as solar or wind power sources may be given the highest source priority rating because the power is relatively inexpensive and may be readily available. In this case, the energy management schema operating a power manager connected with a renewable energy source will attempt to meet all the power demands of the local power network using the renewable energy source because the renewable energy source has the highest source priority rating. Grid power may be assigned a second highest source priority rating and the energy management schema operating a power manager connected with grid power but not connected with a renewable energy source will attempt to meet all of the power demands of the local power network using the grid power because the grid power has the highest source priority rating of any available power source.

In further examples, other power generating sources such as fuel cells, gasoline power generators, vehicle alternators or the like may be given a third highest source priority rating followed by rechargeable energy storage devices with a fourth highest source priority rating and the non-rechargeable energy storage devices with a fifth highest source priority rating. Accordingly, the energy management schema takes each source priority rating into account when determining the total locally available average and peak power available and may compile a list of power sources in priority order and allocate power starting at the head of the list and working down until the local power requirements are met. Moreover, in some embodiments, the energy management schema may only offer power to other power managers if power is locally available from power sources with high source priority ratings such as a renewable energy source or grid power. Of course, other source priority rankings and selection criteria are usable without deviating form the present invention. Power Variation Referring now to FIGS. 2, 3 and 5, the power characteristics of the power networks (200, 300, 500) vary over time. Power devices may be connected or disconnected from the networks (100, 200, and 300) with a resulting change in power characteristics of the entire network. Accordingly, each connect or disconnect event initiates a sequence of energy management schema events by the corresponding local power manager (210) to reevaluate conditions and redistribute power. For a newly connected power device, the energy management schema determines if the device is compatible with the power network and the device port that it is connected to and, if not, issues a warning signal to alert a user that the newly connected power device is not compatible with the selected device port. If the newly connected device is compatible, the energy management schema then determines the newly connected device type, e.g. power manager, power source, power load, or rechargeable energy storage device.

Thereafter the energy management schema reads the newly connected device operating voltage range, power priority, peak and average power characteristics from connected power device, and if appropriate, the charge-rated capacity, remaining charge and other parameters that may be available, and if appropriate, the newly connected power device may be connected to the power bus. For disconnect events, the sequence of energy management schema events disconnects the empty device port from the power bus and reevaluates network conditions.

Other factors that cause the power characteristics of the power networks (200, 300, 500) to vary over time include changes to connected power devices. Such changes include a power device or cable failure, a fully-discharged energy storage device, higher than expected peak power demands by one or more connected power devices, and lower than expected power demands by one or more connected power devices. Since these variations affect the instantaneous power characteristics of the entire power network, a sequence of energy management schema events is automatically initiated and repeated at a refresh rate in order to periodically reevaluate network conditions and redistribute power according the current parameters of the energy management schema.

In general, the instantaneous power P(t) being drawn or delivered by a power device is approximately equal to the product of instantaneous voltage v(t) and instantaneous current i(t). Power devices usable with the power networks described herein are likely to operate at different average voltages ranging from about 1.0-50.0VDC or 55-220VAC. Average and peak currents for each power device or deliverable to each device port are likely to range from about a few milliamps to about 10 Amps with an AC frequency of 50 or 60 Hz. In one example embodiment, the power manager (210) includes six device ports with a power bus operating at 14.4 volts DC. In this example, the device port and power bus circuitry are designed to operate at 14.4 volts DC with current carrying capacity in the range of 1 milliamp to 10 Amps and the power bus is designed for an average power of 150 watts. However, the power bus can handle peak power surges up to about 1.0 kilowatt. In another example embodiment, the power bus operates at 30.0 volts DC.

Preferred Power Manager Embodiment

Referring now to FIG. 4, a preferred example embodiment of a power manager (400) according to the present invention is shown schematically. The power manager comprises a power distribution and control system, shown schematically in FIG. 4. The actual hardware making up the power distribution and control system is housed inside a substantially sealed electrical enclosure, shown in FIG. 12. The power distribution system includes six device ports (1-6). Each device port comprises an electrical connector, show in FIG. 12. The connectors are supported by and pass through the electrical enclosure for accessibility from outside the electrical enclosure. Preferably, all the connectors are multi-pin connectors of the same type however; the number of pins and the functionality of each multi-pin connector may vary from port to port. Any number of ports greater than one is usable without deviating from the present invention. Additionally, different connector configurations may be provided in alternate embodiments. In other alternate embodiments, device ports may have a variety of different configurations such as conductive contact pads, wireless inductive energy transfer terminals printed circuit runs, wireless communication interfaces and other connecting elements, without deviating from the present invention. Each device port connects to a common conductor such as a power bus (410) or another conductor topology such as star, chain or mesh that connects each of the six device ports with a power bus.

The power manager (400) preferably includes a data processing device (420) and associated memory device (430). The data processing device (420) and memory (430) are preferably housed inside the sealed electrical enclosure and in some embodiments the memory may be incorporated within the data processing device or removable from the electronic enclosure by a user. Example data processing devices include a central processing unit, (CPU), an integrated microprocessor, a microcontroller, or a field-programmable gate array (FPGA). Other control systems may be used without deviating from the invention.

The data processing device (420) is electrically connected with elements of the power distribution system and connects with each of the device ports (1-6) through a network interface device (444) or another communications interface. Each device port includes a communication channel that interconnects the network interface device (444) with smart cables or smart power devices that are operably connected to a device port. Accordingly, the data processing device (420) reads power characteristic information stored on operably connected power devices or smart cables associated with power devices over the network interface device (444) and if an operably connected power device or smart cable is appropriately configured, the data processing device (420) and network interface device (444) cooperate to exchange the power characteristic information and/or power management signals with the operably connected device.

As an example, the data processing device (420) may read and update information stored on the operably connected power device or smart cable. As a further example, the data processing device (420) may send power management signals to the operably connected power device or smart cable such as to request a status, to update or overwrite power characteristic information or to change a configuration or operating mode of the operably connected power device or smart cable. In a further example, if the operably connected power device or smart cable includes two or more power devices connected to the same device port over one cable or operable connection, the data processing device (420) may command the power device to operably connect or disconnect one of the two or more power devices. In further examples, the operably connected power device or smart cable may send power management signals or other information to the data processing device (420). These exchanges may include a request for status of the power manager, e.g. how much total power is available, a request to change a configuration or operating mode of the power manager, e.g. to change a power characteristic, e.g. output current, or to operably disconnect the power device from the bus. In addition, the power manager and operably connected power devices and cables may exchange power availability or remaining operating time estimates based on current network conditions.

Preferably, the data processing device (420) communicates with operably connected power devices and smart cables using network packeted data. In a preferred embodiment, the network interface device (444) is a SMBus network interface and power characteristic information is stored on operably connected devices in a form that is readable using the SMBus communication protocol. However, the network interface device (444) may support other communication protocols on a common bus controller or the power manager (400) may include additional network interface devices to communicate with operably connected devices using other communication protocols such as the Inter-Integrated Network (IIC) communication protocol or the Universal Serial Bus (USB) communication protocol. In some embodiments, the network manager (400) may include wireless network interface devices and transceivers for wireless communication with comparably equipped operably connected power devices or smart cables using a wireless network communication protocol such as Wi-Fi, WiMax, Bluetooth or others.

In the example embodiment of the power manager (400), a USB communication interface device (425) is disposed between the data processing device (420) and the device port (2) and the device port (2) includes a first SMBus configured data channel and a second data communication channel suitably configured to communicate with USB configured devices operably connected with device port (2). Alternately, every device port can be connected with the USB network interface device (425) and with the network interface device (444) and other network interface devices so that every device port can operably connect with power devices over a plurality of network communication protocols.

In an example embodiment of the power manager (400), the port (2) is used to operably connect with a computer, (not shown) or computer-like device, e.g. a cell phone, personal digital assistant or the like, and the computer is used to communicate with the data processing device (420). The computer may be used to upload or download energy management schema data to or from the data processing device (420). In various applications, an external computer connected to the power manager via port (2) or any other USB-configured device port may be used to collect historic power network data, to install or update operating programs, to run diagnostic programs, to evaluate performance, to change elements of the energy management schema such as power priorities for each mission, to modify or select operating modes, to change security settings and adjust other parameters as may be required.

In a preferred example, the data processing device (420) establishes a network connection with each power device that is operably connected to power manager (400) and assigns a device address, network address, device port ID or any other unique identifier to each operably connected power device or smart cable or to both. If one of the operably connected power devices is a second power manager, e.g. as shown in the power network (300) in FIG. 3, the two power managers may exchange power characteristic information relating to connected power devices, power management signals and other information. The information exchanged between connected power managers may include the network address, type and power characteristics of the operably connected local power devices and/or smart cables. Additional information may further include broader network data such as the type and power characteristics of every power device that is operably connected to the network (300) or that is reachable by each power manager over a network communication channel. The power management signals may be associated with exchanging power between connected power managers.

The memory device (430) is used to store and periodically refresh state information, energy management schema information, network configuration data, operating programs such as firmware and/or software, and other digital data that is used by the data processing device (420) to operate the power distribution system (400) according to predefined operating modes. In some embodiments, historical network configurations and power usage may be stored on the memory device (430) for uploaded to a computer between missions or for communication to an operably connected power manager. The power manager and/or power distribution system (400) may also include additional analog devices or digital processing elements programmed or otherwise configured to carryout predefined operating sequences, measurements, algorithms or the like, using digital and/or analog components in communication with the data processing device (420). For example, the power converters (440, 442, and 510), the communications interface device (444), the Field Effect Transistors (FET), user interface devices (520) such as a key pad or individual buttons for input and LED arrays (515) for user interpretable output or other elements may operate according to predefined operating sequences independent of the data processing device with the data processing device merely initiating or interrupting the predefined operating sequences.

Connecting Devices to the Power Bus

Referring now to FIG. 4, each port (1-6) may be operably disconnected from the power bus (410) or operably connected to the power bus (410) over either of two power channels. Using device port (5) as an example, a first power channel (525) includes a first conductor that extends from the port (5) to the power bus (410) and a first controllable switch (465) disposed along the first conductor to controllably complete or interrupt the first power channel (525). The first controllable switch (465) is closed to connect the device port (5) to the power bus (410) over the first power channel (525) or the first controllable switch (465) is opened to interrupt the first power channel (525) and disconnect the device port (5) from the power bus.

A second power channel (530) includes a second conductor that extends from port (5) to the power bus (410) and a second controllable switch (495) and a power converter or changer (442) are each disposed along the second conductor between the device port (5) and the power bus (410). The second controllable switch (495) is closed to connect the device port (5) to the power bus (410), over the second power channel (530), or the second controllable switch (495) is opened to interrupt the second power channel (530) and disconnect the device port (5) from the power bus over the second power channel (530).

The power converter (442) can be operated as a bidirectional boost converter to increase the voltage of a DC power signal or as a bidirectional buck converter to decrease the voltage of a DC power signal. The power converter (442) can also be operated to attenuate DC current amplitude passing through the power converter. The power converter may also operate as a controllable switching element to connect or disconnect the second power channel (530) device port (5) to and from the power bus (410) by attenuating DC current amplitude essentially to zero.

Each controllable switch (465) and (495) is in communication with the data processing unit (420) and is opened or closed in response to power management signals received from the data processing device (420). The power converter (442) is in communication with the data processing unit (420) and is configured to change or convert a DC voltage or to attenuate DC current amplitude passing through the power converter in response to power management signals received from the data processing device (420). In addition, the power converter (442) may protect the power bus (410) and/or a power device or cable connected to the device port (5) from being damaged by power or current surges that exceed operating limits of the power manager or a connected power device.

Preferably the first power channel (525) and the second power channel (530) are bidirectional power channels with each power channel being capable of receiving power from a power or energy source connected to device port (5) or delivering power or energy to a power load connected to device port (5). Preferably, each of the controllable switches (465) and (495) and the power converter (442) are bidirectional substantially without degradation in performance. Optionally, a power, voltage or current feedback loop may be incorporated into either of the first and second power channels to monitor bidirectional power signals and actively adjust the power signals to maintain a desired output. Optionally other elements may be fixedly included in or switchably connected in series or in parallel with each of the first and second power channels. Such elements may include a resettable fuse to prevent damage from power surges, a diode to prevent current flow in one direction, an inverter to convert DC to AC, a rectifier to convert AC to DC a voltage regulator and other power stabilizing or altering elements as may be required by the application.

The device port (6) has a first power channel (535) comprising a conductor that extends from port (6) to the power bus (410) and includes a first controllable switch (460). The device port (6) has a second power channel, which is substantially the same second power channel (530) that is used by the device port (5) and includes a conductor that extends from port (6) to the power bus (410) with the second controllable switch (495) and the power converter or changer (442) disposed along the second conductor between the device port (6) and the power bus (410). In the example embodiment, each of the device ports (5) and (6) can be connected to the power bus simultaneously but only one of the device ports (5) and (6) can be connected to the power bus (410) over the second power channel (535) at one time. Accordingly, only one of the power devices connected to the port (5) and (6) can be power converted by the power converter (442) at once.

To connect the port (5) to the power bus (410) over the first power channel (525), the second controllable switch (495) is opened to prevent current from passing over the second power channel (530) and the first controllable switch (465) is closed to allow current flow over the first conductive path (525). In an initial state with no power devices connected to the ports (5) or (6) all of the controllable switches (465), (495), (490) and (460) are open to prevent a power device initially being plugged into one of the device ports (5) or (6) from being connected to the power bus (410). However, a power device that is initially plugged into one of the device ports (5) or (6) is operably connected to a data communication channel and the data processing unit (420) reads power information from the newly connected power device to determine its operating voltage and other power parameters. If the operating voltage and other power parameters are compatible with direct connection to the power bus, the power device connected to deice port (5) is connected to the power bus (410) over the first power channel (525). If the operating voltage and other power parameters are not compatible with direct connection to the power bus, the power device connected to device port (5) may be denied connection to the power bus or may be connected to the power bus (410) over the second power channel (530) when the power converter (442) is configured to make an appropriate power conversion.

To determine if the power device connected to deice port (5) can be connected to the power bus (410) over the second power channel (530), the data processor (420) first determines if the second power channel (530) is available, i.e. not being used by the device port (6). If the second power channel (530) is available, the data processor (420) determines if the power converter or changer (442) can be operated in a mode that will suitably convert power between the power bus and the connected power device. More specifically the data processor (420) determines if a suitable voltage conversion is possible and then determines if other power parameters are compatible for connecting the power device connected to the device port (5) to the power bus (410) over the second power channel (535) and if so sets the power converter accordingly and then closes the controllable switch (495) to connect the device connected to device port (5) to the power bus over the second power channel (535).

Each of the device ports (1-6) can be directly connected to the bus (410) over a first power channel, without power conversion, or over a second power channel with power conversion. However, the example embodiment (400) only includes three power converters (442), (440) and (510) so only three power devices can be connected to the power bus over a power converter at a time. In other embodiments, a power converter can associated with each device port but this is not practical for a portable device since it adds weight and increases volume.

In the embodiment (400), each device port has a first controllable switch (450, 455, 460, 465, 470, 475) disposed in the first power channel between the device port and the power bus (410). Each device port also has a second controllable switch (480, 485, 490, 495, 503, 505) disposed in the second power channel between the device port and the power bus (410). The preferred controllable switch comprises a Field Effect Transistor (FET) or other semiconductor switch, which is preferred because of its light weight, compact size, low volume, fast switching speed, reliability, low power consumption, low cost and ease of assembly. However, a relay switch, micro-switch or any other controllable switching element that can open and close to prevent current flow over the corresponding power channel is usable without deviating from the present invention.

The power bus (410) can be operated at 14.9 volts DC because the power manager (400) is designed for use with large number of power devices having an operating voltage of 14.9 volts DC. This specifically includes the BB-2590 and LI-145 rechargeable military batteries, which are the preferred energy sources carried by infantry soldiers. Moreover, most man-portable power devices carried by infantry soldiers have an operating voltage range that includes 14.9 volts DC. Accordingly each of the rechargeable batteries BB-2590 and LI-145 and many of the other man-portable devices used by infantry soldiers can be directly connected to the power bus (410) over the first power channel associated with each device port without power conversion. In a preferred man-portable operating mode two 14.9 volt rechargeable military batteries are connected to two different device ports, preferably ports (1, 2, 5 or 6), and at least one of the 14.9 volt rechargeable military batteries is operably connected to power bus (410). Otherwise, power loads that have an operating voltage range that includes 14.9 volts DC are connected directly to the power bus (410) over the first power channel associated with the four remaining device ports without power conversion. In this mode, two energy sources are always connected to a device port and at least one of the power sources is always operably connected to the power bus (410). Alternately, one of the 14.9 volt rechargeable military batteries can be replaced by a man-portable fuel cell having an operating voltage that is compatible with direct connection to the power bus (410).

Generally, any connected power device that can operate using the bus voltage of the power manager is preferably directly connected to the power bus (410) over the first power channel (525) by closing a corresponding FET (450, 455, 460, 465, 470, 475). In addition, the corresponding FET (450, 455, 460, 465, 470, 475) may provide surge protection to protect the power manager or a connected power device by limiting current flow over the FET. If a connected power device needs a voltage conversation or would operate more desirably with current or power amplitude control, the power device is connected to the power bus over one of the second power channels by setting the corresponding power converter to an appropriate operating mode and by closing a corresponding FET (480, 485, 490, 495, 503, 505).

More generally, a network controller according to the present invention can be configured to operate at other DC or AC bus voltages. Ideally, the bus voltage is selected to match the most commonly used power devices or may be selected to match the voltage of the most readily available power or energy sources. In either case, the designer should attempt to minimize voltage conversions, which cause power loss and heat generation. Accordingly, if the power manager (400) will be used with more 24 VDC devices than 15 VDC devices a bus voltage of 24 VDC may be more favorable. Similarly, if the network controller is primarily powered by and used to deliver power to 110 VAC power devices, a bus voltage of 110 VAC may be more favorable. In a second embodiment of the power manager (400) a bus voltage of 30 VDC is used.

The preferred power manager (400) includes a pair of bidirectional 10-24 volt DC power converters or power changers (440, 442) disposed with one power converter between device ports (1) and (2) and the other power converter between device ports (5) and (6). Alternative embodiments may have fewer, more and different power converters in place of, or addition to the listed power converters. Each power converter (440, 442) is in communication with the data processing device (420) and controlled thereby to select a conversion voltage between 10 and 24 VDC and if the power converter is so equipped to select a current or power amplitude. The selection corresponds with information read form the connected power device by the data processing device (420). Accordingly, the ports (1, 2) can be controlled using the FETs (450, 455, 480, 485) to connect power devices with an average operating voltage in the range of 10-24 VDC to the 14.9-volt bus (410). Similarly, the ports (5, 6) can be controlled using the FETs (460, 465, 490, and 495) to connect power devices with an average operating voltage in the range of 10-24 VDC to the 14.9-volt bus (410).

The voltage converters (440, 442) are configured to convert 14.9-volt DC outgoing power to other voltages in the range of 10-24 volts DC or to convert 10-24 volt DC incoming power to the 14.9-volt DC bus voltage. To determine which voltage to use, the data processing device (420) determines the preferred average voltage of power devices connected to ports (1, 2, 5 and 6) when the device is first connected and configures the ports accordingly using the FETs (450, 455, 460, 465, 480, 485, 490, and 495) and the voltage converters (440, 442).

Preferably, ports (1, 2, 5 and 6) are used to connect power loads or power or energy sources that operate at 14.9-volts DC directly to the bus (410). However, at least two devices connected to ports (1, 2, 5 and 6) can be power converted using the power converters (440, 442).

If a device connected to one of the ports (1, 2, 5 and 6) is a power or energy source or a power load that can not operate with 14.9-volts DC but can operate at some other voltage in the range of 10-24-volts DC, the device is selected for connection to the bus (410) over one of the power converters (440) or (442). Once a power converter is selected, the power converter is configured for the desired operating voltage, and a corresponding FET (480, 485, 490, and 495) is opened to connect the device to the bus (410) through a power converter (440, 442). If a device that requires a voltage conversion is connected to one of the ports (1, 2, 5 and 6) and the power converters (440, 442) are already being used by another devices, the newly connected device is not connected to the bus (410) and an error signal is generated, e.g. a red light associated with the corresponding port is illuminated.

The power manager (400) includes a 4-34V scavenger power converter (510) disposed between the 14.9-volt bus (410) and each of the device ports (3, 4). The scavenger converter (510) is in communication with the data processing device (420) and controlled thereby to select a conversion voltage between 4 and 34VDC depending on an operating voltage of a device connected to a port (3) or (4). If a device connected to ports (3) or (4) can be operated at 14.9-volt DC, it can be directly connected to the bus (410) over on of the first power channels that includes the FETs (470, 475). Otherwise, the device is connected to the bus (410) over one of the second power channels that includes the scavenger converter (510) and one of the FETs (503, 505). Accordingly, the ports (3, 4) can be controlled using the FETs (470, 475, 503, 505) and the voltage converter (510) to convert 14.9-volt DC outgoing power to other voltages in the range of 4-34 volts DC or to convert 4-34 volt DC incoming power to the 14.9-volt DC bus voltage. As described above, if a device that requires a voltage conversion is connected to one of the ports (3 and 4) and the power converter (510) is already being used by another device, the newly connected device is not connected to the bus (410) and an error signal is generated, e.g. a red light associated with the corresponding port is illuminated.

More generally, the power manager (400) includes a 14.9-volt DC power bus (410) and any power device, source, load or rechargeable battery that can operate at 14.9-volts DC can be directly connected to the power bus (410) over any one of the six ports when the data processing device (420) opens a corresponding connection to the bus (410). Otherwise up to 6 devices operating at 14.9-volts DC can be connected to the power bus (410) or at least one power device having an operating voltage in the range of 4-34 volts and at least two power devices having an operating voltage in the range of 10-24 volts plus three devices operating at 15-volts DC can be connected to the bus (410) simultaneously.

In the present example portable power manager (400), the number of power converters provided is less than the number of available device ports in order to reduce the weight, volume and cost of the power manager device. In order to enable multiple devices ports to share a power converter, a plurality of controllable switches are disposed to route power signals over selected power channels to either directly connect a power device to the power bus or to connected power device to the power bus over a power converter. In other embodiments, additional power converters, such as one associated with each device port, may be added without deviating from the invention. Each power converter provided is electronically isolatable and switchable to enable the power manager to logically map the converter inline between the port and bus, using the sharing circuit described herein or a similar isolation circuit (which comprises part of the disclosed sharing circuit). Adding additional converters and changing their association with ports is a matter of changing the cost and weight of the power manager device. What is important is that a plurality of converters are available, each individually logically mapable under the control of the power manager between the power manager's ports and its bus to effect the conversion of power of power provided to or provided by a power manager.

Figure 12:
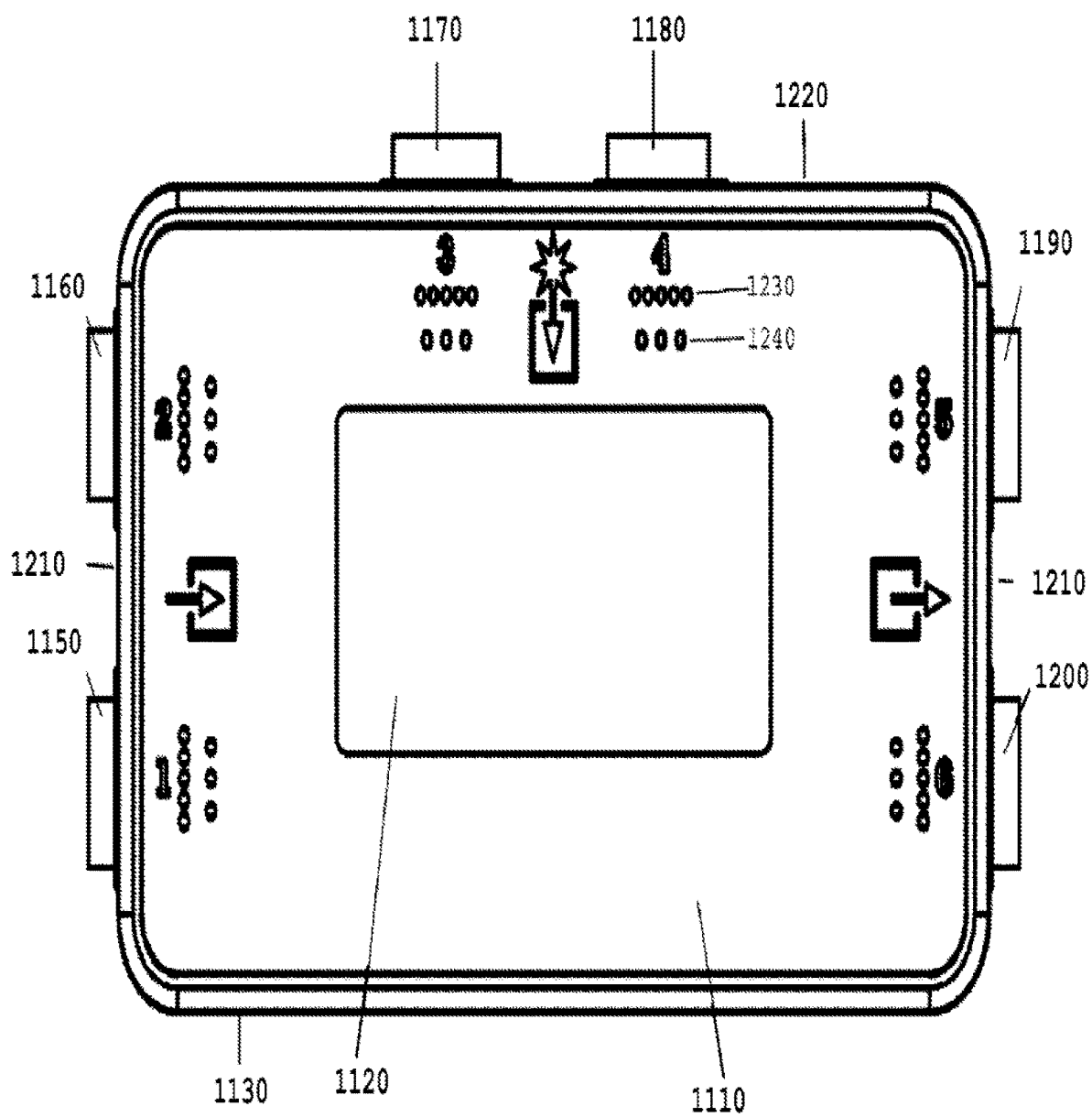
FIG. 12 illustrates a top external view of an example power manager enclosure according to the present invention.

As shown in FIGS. 4 and 12, the power manager (400) may include an LCD display (1120) usable to display text and/or graphic symbols. In addition, the power manager (400) may include LED's (1230) and (1240) associated with each device port for displaying various port status conditions such as connected, disconnected or error as well as a remaining charge value associated with a connected energy source. In addition, the power manager (400) includes a user interface device (520) that includes keypad elements (1140) that allow an operator to control the power manager. Each of the LCD displays (1120), LEDs (1230, 1240) and user interface device (520, 1120) are in communication with the data processor (420) and controlled thereby according an operating system and/or portions of the energy schema operating on the power manager (400). Accordingly, a user may check status, display a menu, or the like, navigate through and select items on the displayed menu and/or toggle keypad keys to select or determine an operating mode or other aspect of the power manager.

In other embodiments of the power manager (400), the bus voltage and current type (AC or DC) may be configured to meet the demands of the application. Similarly, the voltage converters (440, 442, and 510) may be configured to provide a range of voltage or power outputs that best meet the demands of the application. In some example embodiments, at least one voltage converter (440, 442, and 510) may be configured to convert 110 or 220VAC to a desired DC bus voltage.

Power Network Configuration

Referring now to FIG. 5, a third, example power network (500) is shown to illustrate another possible power network configuration. The power network (500) includes three substantially identical portable power managers (210-A, 210-B, 210-C) connected together to form the power network (500). In this example each power manager (210-A, 210-B, 210-C) is has a 14.9-volt bus and is substantially configured like the power manager (400) detailed above and has 6 device ports labeled 1-6. The power manager (210-A) is connected to two BB-2590 batteries using ports (1, 2, 5, 6). In this case, each BB-2590 battery pack include two independent rechargeable batteries and each independent battery is connected to a different device port by a different cable even though only one connection arrow is shown in FIG. 5.

A scavenged power source is connected to the power manager (210-*a*) via device port (3). The scavenged power source may comprise a wind turbine, vehicle battery or the like, a fuel cell generator, a gasoline powered generator or 110 or 220 VAC power grid port. If needed, the scavenger power source is converted to 14.9 volts DC by the 4-34 volt scavenger power converter (510) shown in FIG. 4. Additionally, the 4-34 volt scavenger power converter (510) may be used to limit current or power amplitude passing there through to protect the power manager (210-A) or otherwise regulate power input.

The power manager (210-A) is connected to the power manager (210-B) via port (4). The power manager (210-B) is connected to the power manager (210-A) via port (1) and a computer (520) in connected to the power manager (210-B) via port (2), which is a USB configured device port. The power manager (210-B) may deliver power to the computer (520) or recharge a battery associated with the computer (520) by connecting the device port (2) to the power bus. Additionally, a user may exchange data between the computer (520) and the power manager (210-B) using the USB communication protocol to upload or download data, install updated parameters or code, set up a mission plan, perform diagnostic testing and/or otherwise control or update elements of the power manager (210-B) or the network (500).

A BB-2590 battery is connected to the power manager (210-B) via each of ports (5, 6) and port (3) is used to connect the power manager (210-B) with a third power manager (210-C). A LI-145 14.9-volt battery is attached to the power manager (210-B) via the device port (4). In this example network (500), the power manager (210-B) may connect the two 14.9 volt batteries associated with the battery device BB-2590 to the two device ports (5, 6) and a single 14.9 volt battery device LI-145 to device port (4) and connect each of device ports (4, 5, 6) directly to the power bus. The computer (520) connected to device port (2) is connected to the power bus over the 10-24VDC power converter (440) in order to convert voltage or control current as required to power the computer or recharge the computer battery.

The power manager (210-C) uses port (4) to connect with the power manager (210-B). A 14.9 volt LI-145 battery is attached to each of ports (1, 2, 5, and 6) of the power manager (210-C) and each of the ports (1, 2, 5 and 6) is directly connected to the power bus of the power manager (210-C). In addition, a photovoltaic (PV) solar power source (540) is connected with the power manager (210-C) through port (3) and the solar power source is connected to the power bus over the 4-34 volt scavenger converter (510) of the power manager (210-C).

Port Interface

Figure 6:
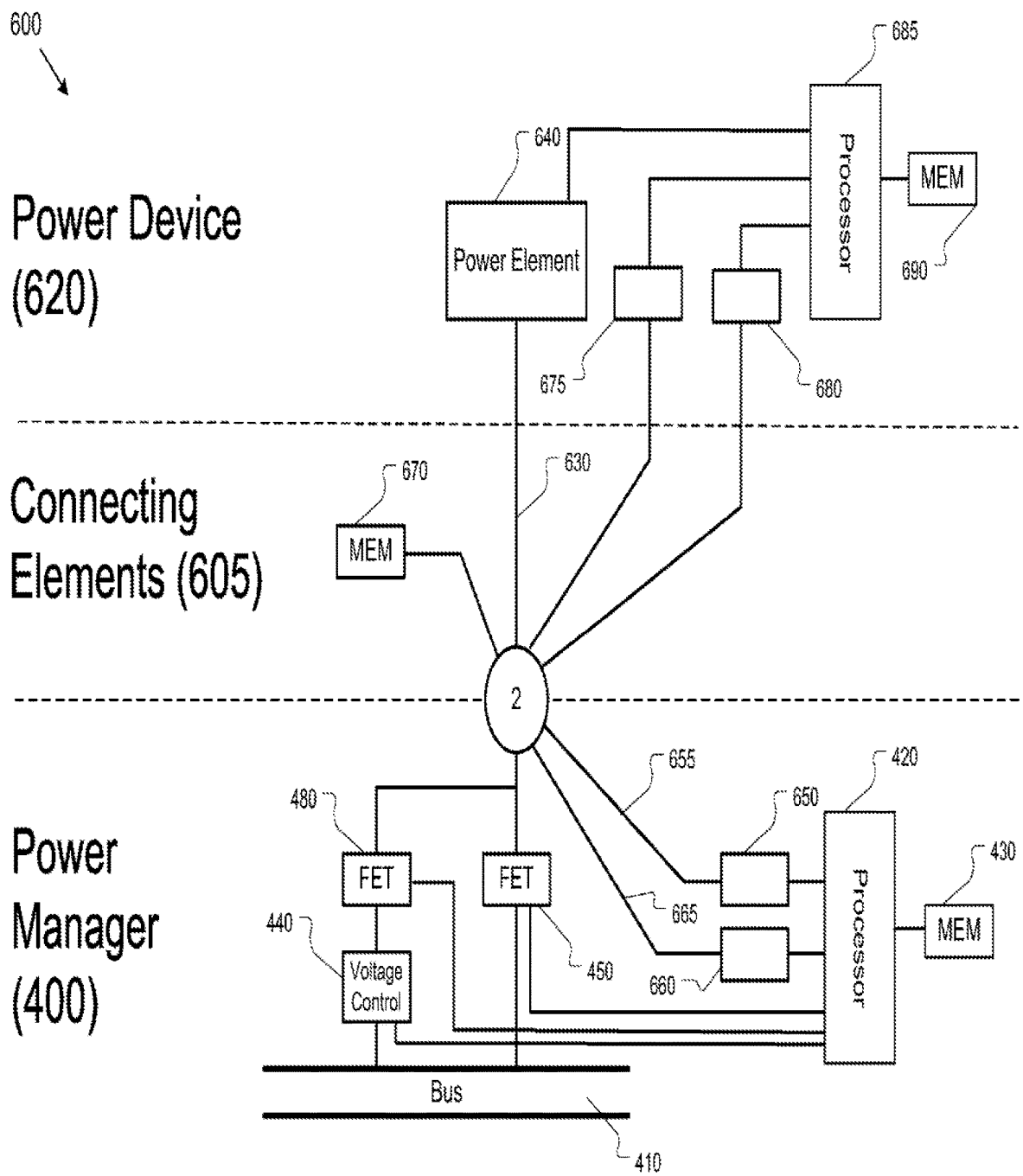
FIG. 6 illustrates a block diagram representing an example embodiment of a power device connected by a cable to a port of the power manager according to the present invention.

Referring now to FIG. 6, a schematic representation of a device port interface (600) includes a power device (620) a cable (605) and elements of the power manager (400) shown in FIG. 4. In the example of FIG. 6, device port (2) is shown because it includes a USB network interface device. Otherwise, the schematic representation of FIG. 6 is typical of all the device ports (1-6).

A first end of the cable (605) may be preferably detachable from the power device (620) but may be permanently attached thereto. A second end of the cable (605) is preferably detachable from the device port (2) but may be permanently attached. Each end of the cable (605) includes a multi-pin connector that mates with corresponding power manager and power device connectors.

Each multi-pin connector includes connector pins or sockets for power transmission. A first power channel extends from the power manager bus (410) through the FET (450) to the port (2) over a cable power channel (630) to a power element (640) included in the power device (620). A second power channel extends from the power manager bus (410) through the power converter (440) and FET (480) to the port (2) over the cable power channel (630) to a power element (640) included in the power device (620).

The power element (640) may comprise a power load, a power or energy source or rechargeable battery that includes an energy source and a power load. Initially, the FETs (450) and (480) are closed until the device type, voltage and other parameters are read from the device or cable by the power manager processor (420). Once the voltage is known and determined to be compatible with the device port (2), the power manager device processor (420) selects to connect the power device (620) to the power bus (410) over the first or the second power channel but may not immediately connect the device to the bus. Thereafter, the energy management schema operating on the network manager (400) determines if the device priority and other conditions of the network are favorable for connecting the power element (640) to the bus (410) and if so, connects the device (620) to the power bus by logically closing the appropriate FET (480) or (450).

The multi-pin connector includes connecting pins or sockets for data communications. One or more data communication pathways (655, 665) extend from the network manager data processing device (420) through a selected network interface (650) and/or (660) to the port (2).

From the port (2), the data commutations pathway may go to a cable memory device (670) or to one of two network interface devices (675) and/or (680) associated with the power device (620) and then to a data processing device (685) and/or a memory device (690) associated with the power device (620).

In various configurations of the port interface (600) neither the power device (620) nor the cable (605) include a data processing device (685). In other instances, the power device (620) does not include a data processing device (685) or a memory (690) and if this is the case, the cable (605) is configured with an incorporated memory device (670) with power characteristics (e.g. elements of the energy management schema) of the corresponding power device (620) stored on the memory (670). In one example, the power device (620) may comprise a non-rechargeable battery such as a 9-volt C-cell or D-cell battery. In this case, the cable power channel (630) is connected with both terminals of the battery and the cable (605) includes a memory (670). Data stored on the memory (670) as elements of the energy management schema provides the device type (e.g. non-rechargeable energy source), a device ID, power characteristics of the device (e.g. average value and range of power, current and/or voltage), and a source or other power priority. This information is read from the memory (670) by the power manager data processing device (420) and stored in the power manager memory (430) as part of an integrated energy management schema.

When the power device (620) includes either a data processing device (685) or a memory (690) that store data, the device type and other power data are stored in the power device (620) and read therefrom by the power manager data processing device (420). In this case, the cable (605) may not include the memory (670). The network interfaces (650) and (680) are connected by a wire or a wireless communication channel and may comprise a SMBus network link, which is included in every port of the power manager (400). The network interfaces (660) and (675) are connected by a wire or a wireless communication channel and preferably comprise a USB networking link, which in the present example is included in only one of the ports of the power manager (400) but which may be included in any of the power manager device ports. All of the network interfaces (650, 660, 675, and 680) may be incorporated within corresponding data processing devices (420, 685).

While many power devices (620) communicate power data over an SMBus link using the SMBus communication protocol, other power devices such as other power managers (400) may communicate over other communication links and protocols such as IEEE 802.3 ("Ethernet"), IEEE 802.11 ("Wi-Fi"), cellular radio network data communications, RS-232 or RS485 serial communications, SMBus, or other data communication protocols that permit bi-directional (full-duplex or half-duplex) data transfer. Preferably, each device port of the power manager (400) includes one or more protective elements such as the FETs, (450, 480), the power converters (440, 442, 510), and/or diodes, fuses, relay or micro-switches, or the like (not shown) and/or conductive shielding. (not shown), for protecting the power manager (400) from damage by over-voltage, over-current, reverse polarity, short circuit, electromagnetic interference (EMI), power surges or the like.

The memories (670, 690) and/or the data processing device (685) are used to store power related data of the energy management schema specifically associated with the corresponding power device (620). The power related data may include a device ID, desired average max and min voltage and current levels, operating temperature ranges, a device priority setting, a desired network protocol and instructions for reading the power related data. If the device is an energy storage device the data may include its remaining charge value, rated capacity, charging cycle preferences etc. The memories (670, 690) and/or the data processing device (685) may be updated to store new power data either by the power device data processing device (685), by the power manager data processing device (420) or by the computer (520), shown in FIG. 5. Updates may include changes in the power data such as a new power priority setting as well as use data such as hours of use, number of connector insertions, updated rated capacity or the like.

Connection Sequence

In a typical sequence, a power device (620) is connected to a power manager (400) by a cable (605). The network controller data processing device (420) establishes a communication link with the power device or with the cable using the SMBus protocol, determines the device ID, the device type (e.g. power source, power load or power storage device), and assigns the device a network address. In addition, the network controller data processing device (420)

determines the usable device voltage and current ranges, configures a power channel to operate at a voltage and current that is within the desired ranges using the FETs (450, 480) and voltage converter (440). Thereafter, the network controller uses the SMBus protocol to manage power exchanges between the power device and the power manager by opening and closing the appropriate FETs or other switching elements that may be used to connect and disconnect the device from the power bus (410). In addition, a low voltage sensor, described below, is disposed to measure a voltage on the power bus (410). The voltage sensor is in communication with the power manager data processing device (420) and periodically communicates bus voltage to the data processing device.

More generally, each power device is connected to a power manager (400) via the port interface (600) shown in FIG. 6 and described above. The port interfaces (600) may all be identical, or depending on the power devices, may have different configurations, which can be tailored to the particular power device or cable to which it is connected and to the particular power network topology to which it is attached. Ideally, each port (1-6) has the same electrical connector interface and each cable uses the same connector interface at the port connection, however as shown in FIG. 6, some port interfaces (600) may have additional communication channels, may use wireless communication channels and may have expanded functionality depending upon the configuration of the power device and the power manager. Referring to FIGS. 2 and 6, the power manager data processing device (420) establishes a separate commutation link or network connection with each power device connected to a port (1-6) and stores data related to each power device in the memory (430). In cases where the connected power device is capable of bi-directional network communication, e.g. when the connected power device is another power manager, computer, smart power device, the data processing device (420) may include network routing functionality for reading and altering network data packets as required to route the network data packets to intended network addresses or the like.

Routing decisions may be based on a priori (configured) knowledge or may be based on routing tables and protocols, such as those defined by the IETF Routing Information Protocol (RIP) or Open Shortest Path First (OSPF). Alternatively, routing may be bridged or switched using IEEE 802.1d bridge protocols.

Allocation Interfaces

Figure 7:
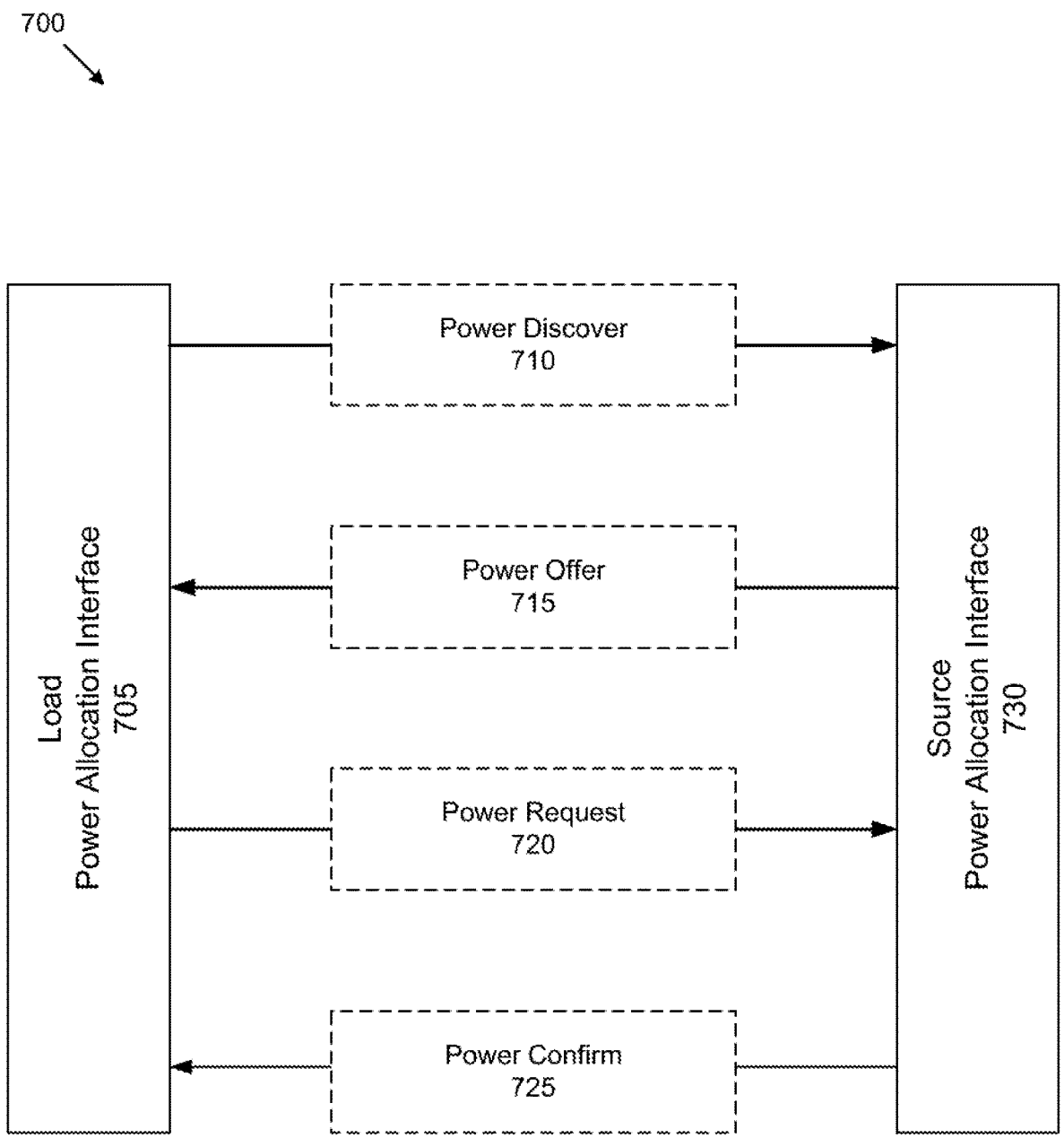
FIG. 7 illustrates a block diagram representing example communication exchanges between load and source power allocation interfaces according to the present invention.

Referring now to FIG. 7, a block diagram shows one example of how power devices attached to a power manager (400) are classified by the energy management schema. Power loads are associated with a load power allocation interface (705) and power and energy sources are associated with a source power allocation interface (730) depending upon whether the connected device is a power load or a power or energy source. An energy storage device such as a rechargeable battery may be associated with either interface depending one the power needs of the network or of the rechargeable battery.

As described above, the energy management schema determines the power available by summing the average and peak power available from each device associated with the source power interface (730) and stores total average and total peak power values. Thereafter the energy management schema determines the power load by summing the average and peak power load of each device associated with the load power interface (705) and stores total average and total peak load values. Thereafter, the devices associated with the source power interface (730) and the load power interface (705) are sorted by device or source priority and the highest priority source or sources are connected to the power bus and power is distributed to the highest priority loads.

In particular, when the power allocation interface (730) has sufficient power available to meet all of the needs of the network, a rechargeable battery may be associated with the load power allocation interface (705) and may be recharged whenever the source power interface (730) has met the power demands of any higher power priority load devices. Alternately, when the power allocation interface (730) has less than sufficient power available to meet all of the needs of the network, a rechargeable battery may be associated with the source power allocation interface (730) and used to deliver power to the bus (410) when other higher priority power sources are not available.

The energy management schema may periodically broadcast power discover messages (710) to connected power managers to discover power sources connected to an extended power network e.g. (500) shown in FIG. 5. Similarly, the energy management schema may periodically broadcast power request messages (720) to connected power managers to request power sources connected an extended power network. In response to the power request messages, other power managers may reply with power confirm message (725). In response to the power discover messages (710), other power managers may reply with power offer messages (715). Based on the requests and offers, the energy management schema may deliver power to or receive power from a connected power manager.

In a preferred mode of operation of an isolated power manager, e.g. the network (200) shown in FIG. 2, a single primary power or energy source is connected to the power bus (410) and exclusively used to meet all the power demands of the network (200) until the primary source is no longer available or cannot meet the demand. If more power is needed, one or more secondary power sources may be connected to bus (410) to meet power demands. Non-selected power sources are not connected to the bus but remain connected to the network and included in the power allocation interface and the total power available calculations done by the energy management schema. When power demands cannot be met, by all available power sources, the energy management schema disconnects low priority power loads from the bus (410) until more power is available to meet the demands. However, any devices that are disconnected from the bus are still connected to the network, polled by the data processing device (420) and included by the load allocation interface (705) and the total power available calculations done by the energy management schema. In some cases the energy management schema may calculate a remaining operating time of high priority devices given the total power available and reserve power to operate the higher priority devices for a desired operating time by denying power to lower priority devices.

Power Shim

Figure 8:
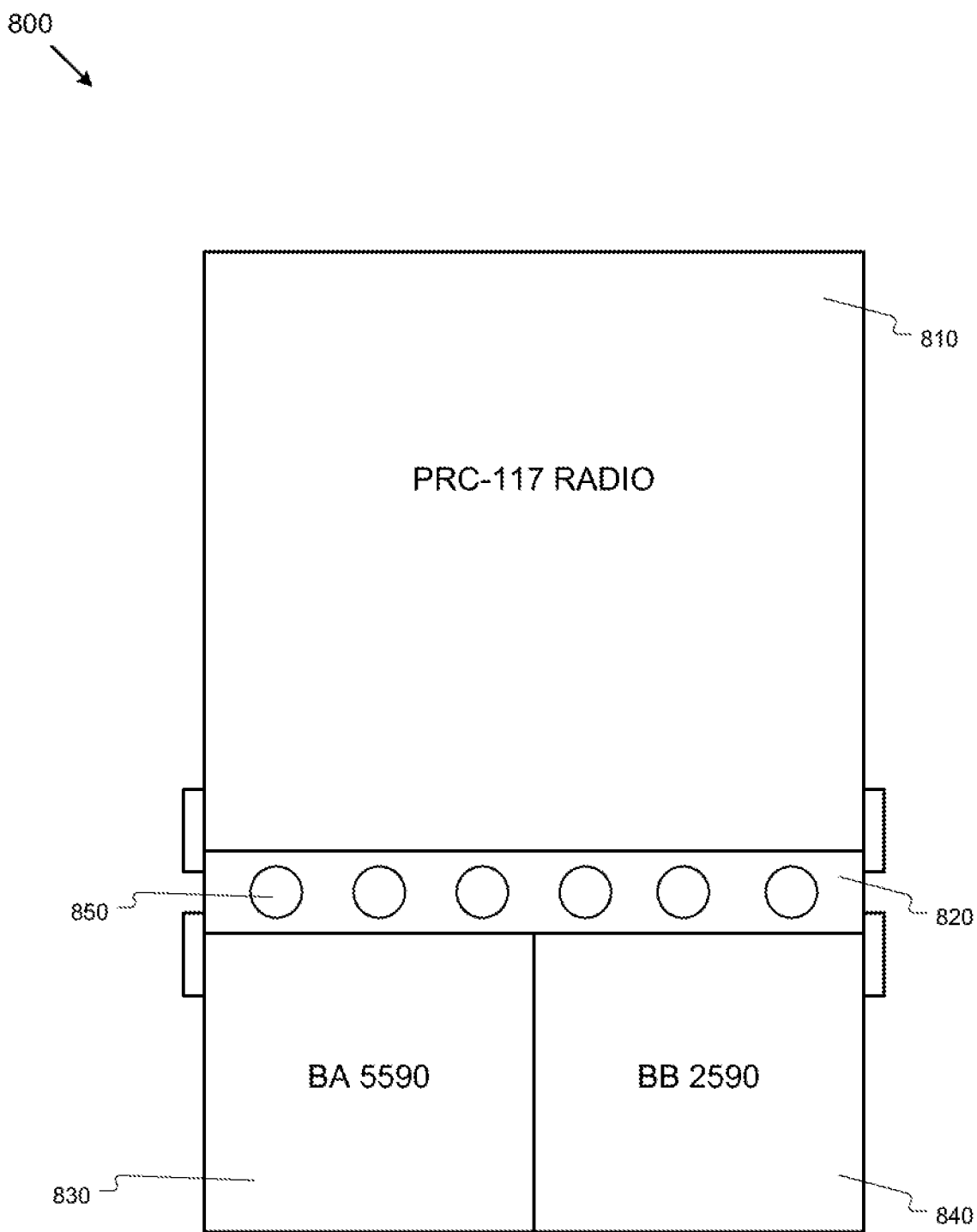
FIG. 8 illustrates a block diagram representing a power manager incorporated with a power device and battery power sources according to the present invention.
Figure 9:
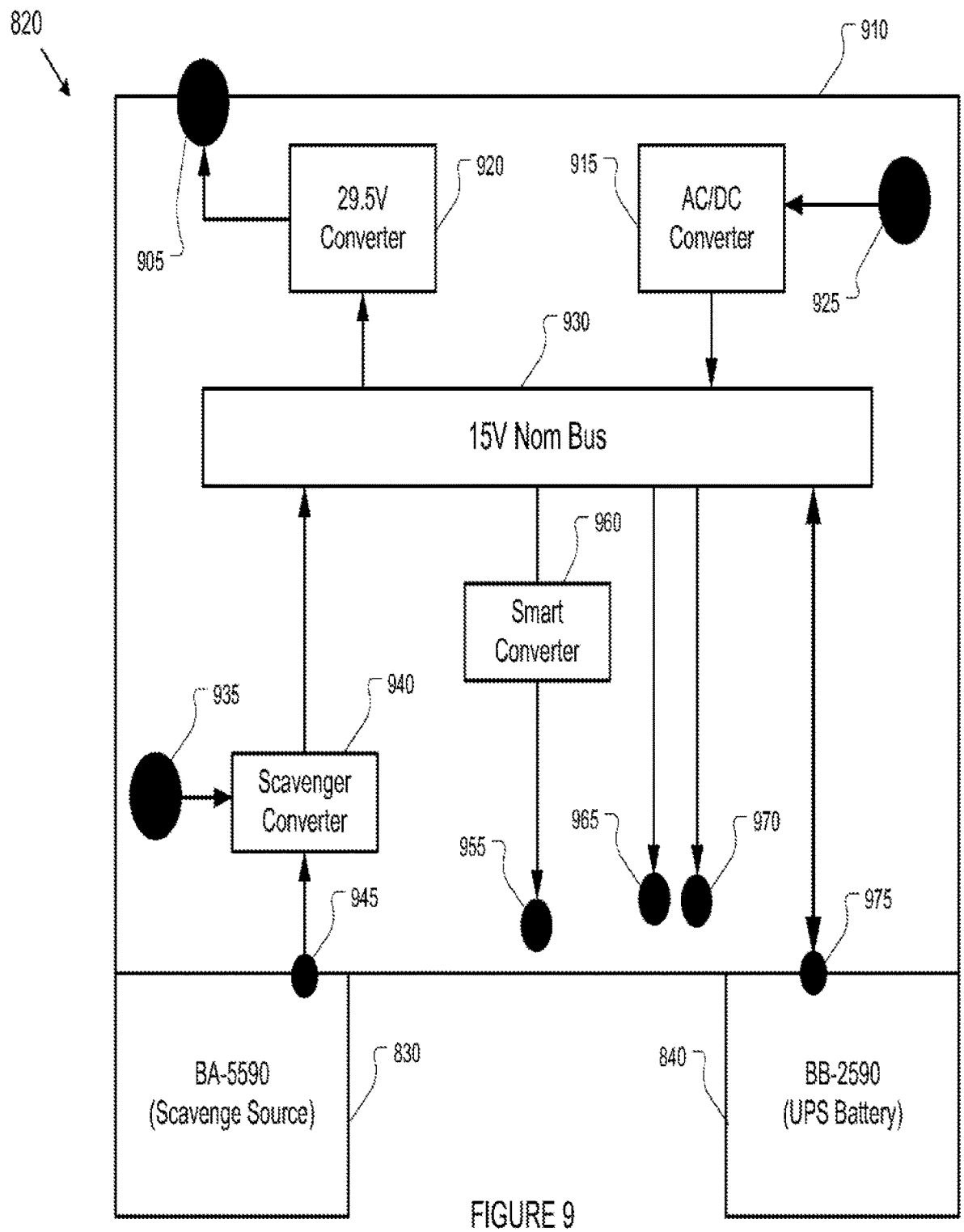
FIG. 9 illustrates a block diagram representing a second example embodiment of a power manager according to the present invention.

Referring now to FIGS. 8 and 9, a fourth example embodiment of a power manager according to the present invention is a power manager shim (820). The power manager shim (820) is disposed between a power load, in this case a radio unit (810), and a rechargeable energy source, in this case a BB-2590 battery that includes two separate 15-volt batteries (830) and (840) housed in a unitary package. The power shim (820) has a cross-section sized to match a cross-section of the radio unit (810) and battery unit housing the batteries (830) and (840) to fit inside a radio unit carrying case so that the power manager shim (820) is substantially integral with the radio unit (810) instead of being carried separately.

The power manager shim (820) includes conductive terminals, not shown, exposed on opposing top and bottom surface thereof. The conductive terminal each correspond with a device port the power manager shim and are substantially similar to device ports described above except that they lack a multi-pin electrical connector. The conductive terminals disposed on the top surface of the power manager shim (820) are in mating contact with corresponding conductive terminals disposed on a bottom surface of the radio (810). The conductive ports disposed on the bottom surface of the power manager shim (820) are in mating contact with corresponding conductive terminals on each of the batteries (830, 840). The contacting conductive terminals electrically interconnect the radio unit (810) and each of the batteries (830, 840) with the power manager shim (820). The power manager shim (820) further includes additional device ports (850) disposed on one or more side surfaces of the power shim (820) to interface with additional power devices and expand the power network formed and controlled by the power shim (820).

Referring to FIG. 9, the power shim (910) includes a 15-volt bus (930) which connects directly to the 15-volt radio battery (840) via a conductive pad device port (975). The second radio battery (830) connects to the 15-volt bus via a conductive pad port (945) which connects directly to the power bus (930). A scavenger port (935) passes through a sidewall of the power shim (820) and through a scavenger power converter (940) to connect and power convert various power and energy supplies to the power bus (930) as they become available.

The power shim further includes a 29.5-volt output power converter (920) and associated 29.5VDC device port (905) that connects to the radio unit (810) via a conductive pad (905). The power shim (820) also includes an internal AC to DC converter (915) and associated AC input port (925) for connecting the power shim to an AC power source. In addition, two 15-volt ports (965) and (970) connect to the 15-volt bus (930) and may be used bi-directionally for power loads, power sources and energy storage devices can operate at 15-volts. The power shim also includes a smart converter (960) that includes a network interface and an associated port (955) for communicating with and powering smart power devices or smart cables.

Operating Sequences

In some embodiments of the power manager (400) described above and shown in FIG. 4, the energy management schema may be implemented as computer programs, such as software or firmware stored on the memory (430) and running on the data processing device (420). In other embodiments, the energy management schema is encoded into a finite state logic array that implements the energy management schema as a set of state transitions.

In some embodiments, the energy management schema is driven by events such as device port connection or disconnection events. Other events, such as timer expiration events, can be implemented to support interval-based processing of the energy management schema. One such implementation is for the power manager to interrogate all attached power devices when one or more of the events occurs, and for the power manager to adjust its power management configuration in response to the interrogation results. Other events may be generated when part of the power managers circuitry detects that the power provided by a power source, the power consumed by a power load, or the voltage or amperage on the power managers' internal bus are not within expected tolerances for a connected power device and/or power manager.

In some embodiments, the power manager reacts to specific events with sets of program steps or a sequence of operations uniquely associated with that event. One such example is a reaction to the loss of power from a power device connected to the power bus, or an over-current or over-voltage event. Such events may initiate a reaction that causes the power manager to isolate the offending device from connection to the power bus or to connect another power or energy source to the power bus to prevent a power loss. The events may cause the power manager to toggle one or more controllable switches; change the state of a FET or other semiconductor device, change the operating mode of a power converter, or taking some other action. These reactions may be straightforward and serve to protect the power manager and/or the other power devices attached to the power manager. These types of reactions are appropriate when quick response time is necessary, such as when the power manager is protecting other power devices from an abrupt change in power conditions from a currently in use power source and may include quickly connecting a secondary power device to the power bus to prevent connected power loads from an interruption in power when a power source is either unexpectedly disconnected, drops in voltage or is otherwise unable to meet the power demands of the power bus. It is noted that the reactions discussed in this section rely on interval-based processing and therefore have time delays associated with the processing interval. In particular, a loss of power, over-current or over-voltage condition is detected upon an interval-based query, responded to by an action taken by the digital processor (420) and then corrected by an action taken on the next interval base query or state update. While the interval-based queries frequencies may match the processor frequency, some interval-based responses may not be fast enough to prevent a device connected to the power bus from becoming damaged by an over-current or voltage or from powering down in response to a voltage drop on the power bus. In cases where interval-based responses are not fast enough, the hot-change-over circuit shown in FIG. 13 can provide a faster reaction time for responding to a voltage or power drop on the power bus.

In other cases, a set of common processing steps are performed. These common steps take longer to perform so they are not appropriate in all usages. The common steps provide the power manager with updated information on each power device attached to the power manager, and typically result in a recalculation of power totals of the allocation interfaces and the power routing strategy. In some cases, the energy management schema causes the power manager to internally reconfigure to implement the newly recalculated power routing strategy. The internal reconfiguration may include connecting or disconnecting device ports from the power bus or adjusting operating modes of a power converter.

In one particular exemplary embodiment, the energy management schema may be configured to select a primary energy source for exclusive connection to the power bus. It is noted here that the term primary energy source should not be confused with the term primary cell used to describe a non-rechargeable battery or non-reversible electrochemical reaction. In particular, the energy management schema may choose the least-charged energy storage device for use as a primary energy source and exclusively connect the primary energy source to the power bus until the charge on the selected primary energy source is completely used up.

Moreover, once the primary energy source is fully depleted, the energy management schema again selects the next least-charged energy storage device for use as a primary energy source and exclusively connects the selected primary energy source to the power bus until the charge on the selected primary energy source is completely used up. This sequence of steps produces the result that each energy source connected to a power manager is fully depleted of remaining charge before switching to another energy source connected to the power manager. Of course, if a higher priority source becomes available, e.g. a power grid, the higher priority source will be selected as the primary source for as long as it is available.

In one embodiment, the network manager (400) may access a coulomb count or another high resolution, high accuracy measure of remaining charge value from connected energy storage devices that can provide an accurate remaining charge value. In another example embodiment, detailed further below, a voltage sensor associated with the power bus may be used to measure power bus voltage and to connect one or more additional power or energy sources to the power when a power bus voltage drops below a desired voltage level. In either case, the power manager of the present invention is configured to discharge a energy storage devices to less than about 5% of the rated capacity as compared to conventional smart battery usage where smart batteries are often discarded or changed when the remaining charge value is in the 20 to 30% range.

Thus, one aspect of the present invention provides an increase in usable battery power of 15-20% per battery, resulting in 30-50% better battery utilization. When beginning these steps, the power manager interrogates each energy source using its data interface to determine its current power attributes, including its remaining charge value, if it can be determined. In alternate embodiments, the power manager may observe the energy being drawn from an energy source connected to the power bus, e.g. by measuring, voltage, current, or energy output, or the like, to determine or estimate a remaining charge value. When it is determined which energy source has the lower remaining charge value the power manager may designate that energy source as the primary energy source for exclusive connection to the power bus. In some exemplary embodiments, the power manager ignores one or more of the energy sources based upon settings of their current power attributes. For example, a battery power source may be ignored if its remaining charge value is below a certain percentage threshold of its maximum value, e.g. below 2-5%. The power manager may use other means for tracking remaining charge value such as tracking total energy drawn, length of time in service, or any other measurable parameter that may predict remaining charge value.

After the power source is selected, the power manager reconfigures the connections between the power bus, the ports, and the power converters in order to operably connect the power source to the power bus. This reconfiguration can occur by opening and closing logical switches that control power flow. In one example embodiment, these logical switches are FETs as described above. Other technologies, such as micro-switches or relays may also be used.

Figure 10A:
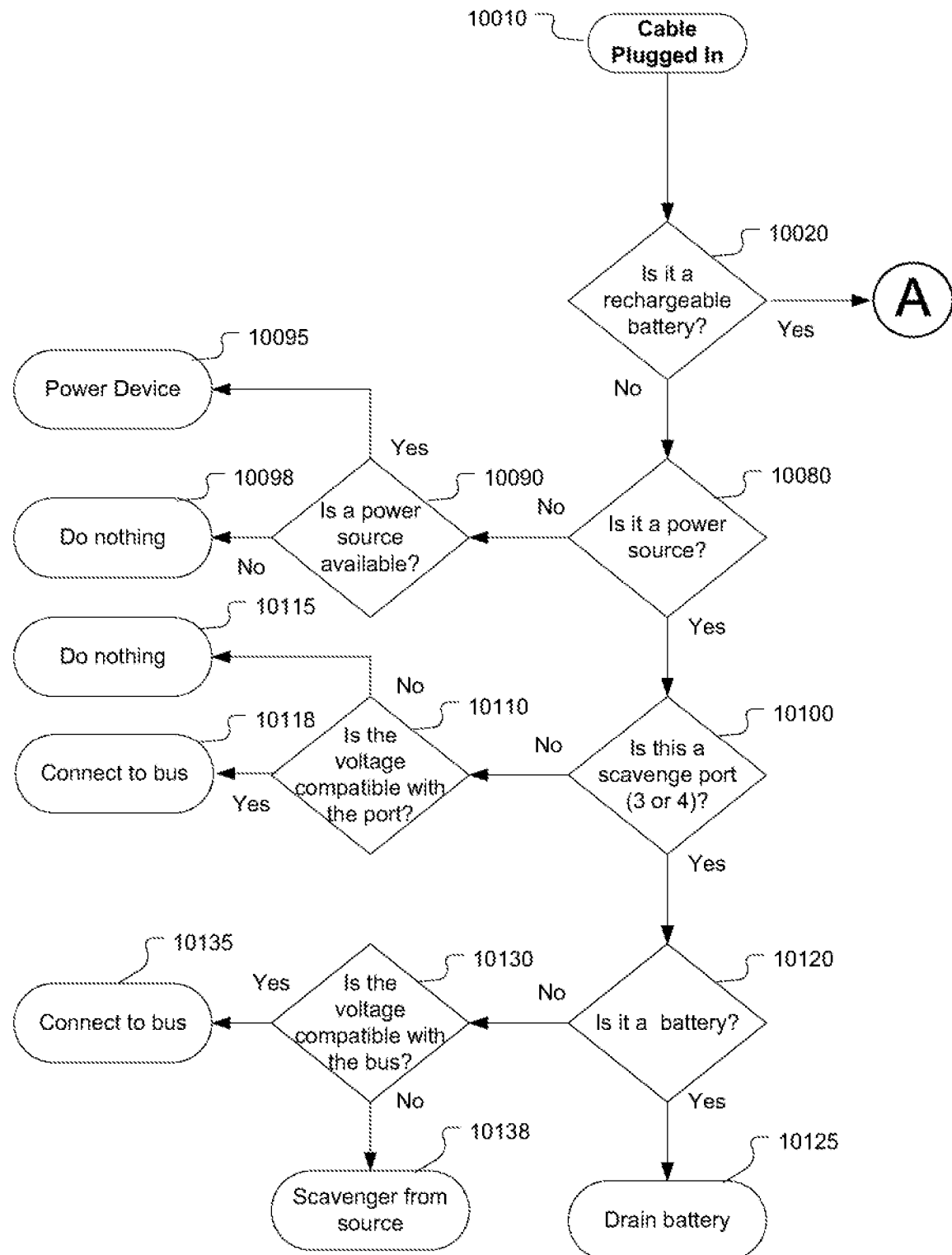
FIG. 10A illustrates a flowchart of an exemplary power management decision process initiated each time a cable is plugged into a device port according to the present invention.
Figure 10B:
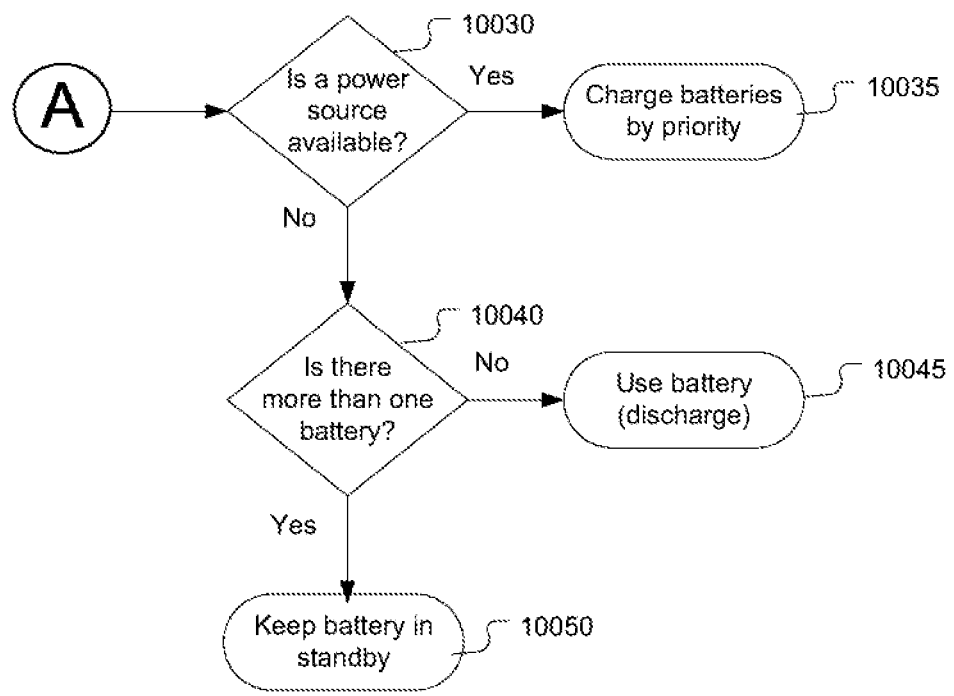
FIG. 10B illustrates a flow chart of an exemplary power manager decision process initiated if a cable plugged into a device port is connected to a power source according to the present invention.

FIGS. 10A and 10B illustrate an exemplary embodiment of a power management decision tree in order to effect aspects of the energy management schema operating on a power manager of the present invention. The power management decision process is started at step (10010), when an event that triggers this process occurs. As shown in the flowchart, this event is when a cable is plugged into a device port or a new power device connection with a device port is somehow recognized by the power manager. Other events that may trigger step (10010) may include the expiration of a timer or processor interval, a notification of an exception detected on a device port or power bus, or any other processing step that requires the power manager to recalculate its use and allocation of power. Plugging a cable into the power manager identifies the port in question, and the energy management schema automatically scans information stored on the connected device or the associated cable to determine if the device is compatible with the selected device port and how the device can be connected to the bus, (steps not shown). Once the connected device information is determined and associated with the device port, it can be stored in the power manager memory (step not shown) and the device interrogation step does not have to be repeated unless the status of the device port changes or there are other reasons to continue to interrogate the connected power device. During the interrogation step, the power manager generally determines the device type, its communication preferences, average and peak operating voltages, currents and power ranges and a device power or source priority.

A first evaluation of the connected device is made at step (10020), in which the power manager makes the determination as to whether the newly connected device is a rechargeable battery or not. This decision is made, in part, based upon the information provided to the power manager during the device attribute interrogation process steps. If the newly connected device is a rechargeable battery, processing by the power manager continues at step (10030), FIG. 10B, where the power manager determines if a power source suitable for recharging the rechargeable battery, (e.g. a generator of some form) is operably connected to the power manager.

If a power source is available, the energy management schema designates the rechargeable battery as ready for recharging according its source priority or according to a recharging priority and, if required, reconfigures the power manager to connect the corresponding device port to the power grid, usually over a power converter, to recharge the newly connected battery (steps not shown). If there are a plurality of rechargeable batteries connected to the power manager, the power manager recharges the rechargeable batteries in priority order which may include a charging priority established by the energy management schema. In one example embodiment, the charging priority is set to designate the rechargeable battery with the highest remaining charge value as the highest charging priority (step 10035).

If a power source suitable for recharging batteries is not available, (step 10030), the power manager checks to see if there are a plurality of rechargeable batteries operably connected to device ports (step 10040). If not, the power manager designates the newly connected rechargeable battery as an energy source and connects it to the power bus for discharge. If yes, other rechargeable batteries are operably connected to device ports, the energy management schema may keep the battery on stand by (10050) by not connecting the corresponding device port to the power bus (step 10050). Alternately, the energy management schema may sort the plurality of rechargeable batteries by a source priority and connect the highest source priority to the power bus while disconnecting lower source priority source from the power bus (steps not shown). In one example embodiment, the source priority for rechargeable batteries is set to designate the rechargeable battery having the lowest remaining charge value as the highest source priority for connection to the power bus. Thus batteries having the lowest remaining charge value are fully-discharged first while batteries having higher remaining charge values are in reserve (step 10050).

Continuing from step (10020) in FIG. 10A, when the newly connected device is not a rechargeable battery, the power manager then determines if the newly connected device is a power source (step 10080). If no, (e.g. it is a load), then the energy management schema checks to determine if sufficient power is available to power the load (step 10090). If sufficient power is available, the device is connected to the power bus to provide power to the load (step 10095). If not, the device is not connected to the power bus and the load remains unpowered (step 10098).

If the newly plugged in device is a power or energy source (e.g. it's a generator-based source or non-rechargeable battery), the power manager determines if the port used includes a power converter or is a scavenge-capable port (step 10100). In some exemplary implementations, only some of the ports are scavenge-capable; in other implementations, all ports are scavenge-capable. Moreover, not all power or energy sources require power conversion for connection to the power bus. If the port is not scavenge-capable, the power manager checks the operating voltages provided by the power source (step 10110), and if the voltages provided are compatible with the required voltages on the internal power bus, the power manager may connect the power source to the internal power bus, depending on the source priority (step 10118). If the voltage provided by the power source is not compatible with the required voltages on the internal bus, the source is not connected to the power bus (step 10115); however, the power manager may display an error condition by lighting a red warning light or displaying an error warning on a display device.

If the port is scavenge capable, the power manager checks to determine if the source is a battery (step 10120). If it is, the power manager may reconfigure its circuitry to connect the battery to the internal bus (step 10125) or simply hold the battery in reserve by not connecting the battery to the power bus. If the power source is not a battery, the power manager checks the voltage provided by the power source to determine if it is compatible with the internal bus (step 10130), and if so, connects the power source to the internal bus (step 10135). If not, the power manager connects the power source to the power bus over a scavenge power converter associated with the device port (step 10138).

The above example implementation of a new device connection to a power manager illustrates the types of processing carried out by the energy management schema for a new connection. More generally, the energy management schema carries out similar process steps for device port at a refresh rate. In this mode the energy management schema periodically checks the connection status of every device port, e.g. once per second, to determine what if any conditions have changed and to reevaluate the power allocation interfaces, power and source priority status and may reconfigure its circuitry to connect or disconnect various device ports. Moreover, if another power manager is connected to a device port, the energy management schema may allocate the connected power manager to the appropriate power allocation interface and connect the corresponding device port to the power bus if conditions warrant exchanging power with a connected network manager.

External Enclosure

Figure 11:
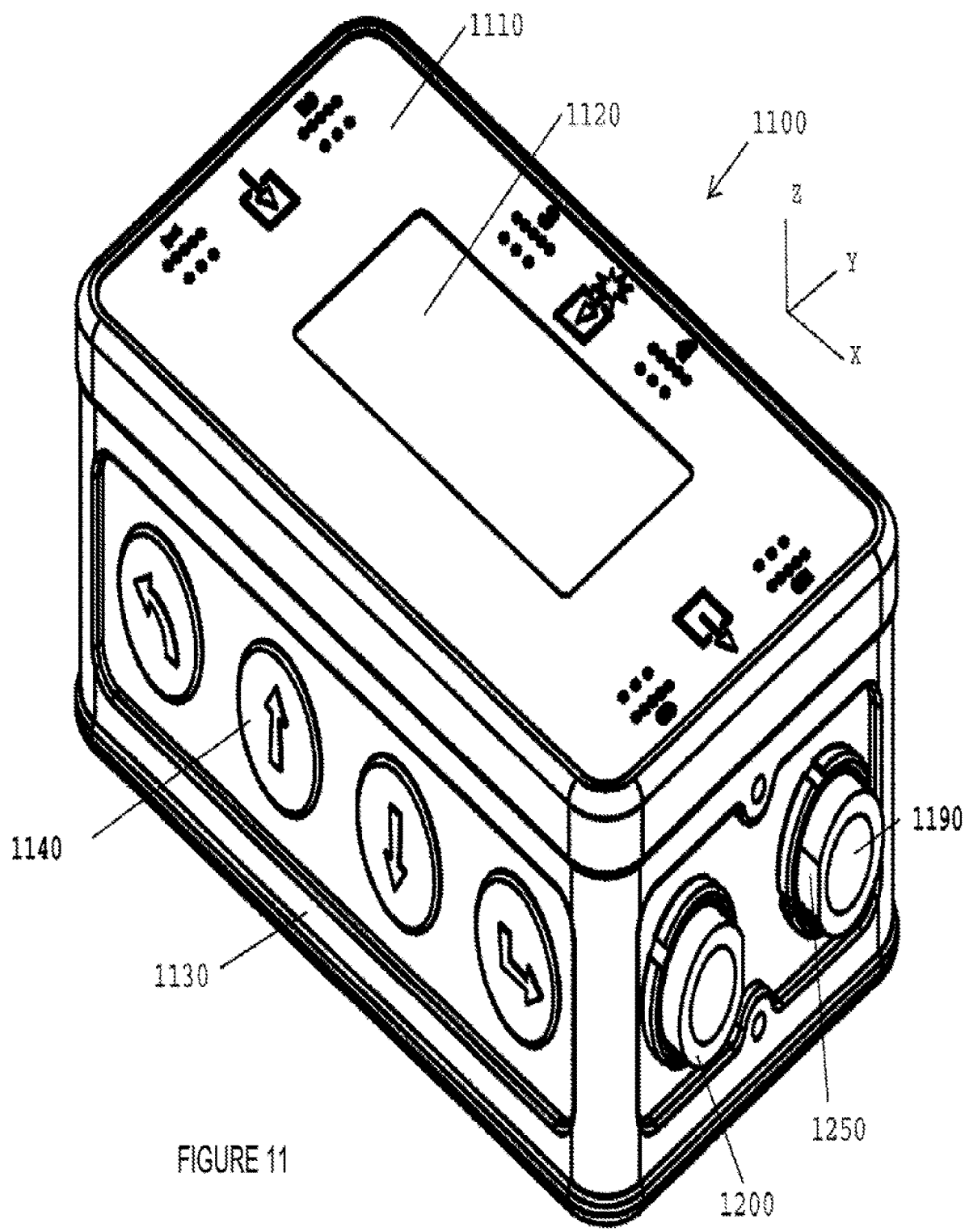
FIG. 11 illustrates an isometric external view of an example power manager enclosure according to the present invention.

Referring now to FIGS. 11-12, a power manager enclosure (1100) according to one aspect of the present invention is shown in isometric view in FIG. 11 and in top view in FIG. 12. As shown in FIG. 11, the enclosure has a longitudinal length extending along an x-axis, a transverse width extending along a y-axis and a thickness extending along a z-axis of the coordinate axes shown in FIG. 11. Generally the enclosure (1100) houses the power manager (400) shown in FIG. 4 in a substantially sealed and mechanically and electrically shock-protected package. A top face of the enclosure (1110) includes an display device (1120) such as a liquid crystal display (LED) for displaying menus, error messages and other text and graphic symbols as may be required. In other embodiments, a display screen is provided. A front side face (1130) includes a user interface key pad (1140) with four buttons or key pads that generally interact with the display device (1120) to provide a user interface. The key pads allow a user to navigate through a menu displayed on the display screen and may provide other functionality such as on/off and error reset. In other embodiments, a user interface may comprise a single button keypad for simply turning the device on and off and/or resetting the device to clear an error condition. In a preferred embodiment, the external dimensions of the power manager (1100) are 3.5×10.6×6.1 cm, (1.4×4.2×2.4 inches) wherein the longitudinal dimension 10.6 cm is along the x-axis, the transverse width dimension 6.1 cm is along the y-axis and the thickness dimension 3.5 cm is along the z-axis.

As shown in the top view of FIG. 12, the device includes six device ports (1150, 1160, 1170, 1180, 1190, 1200) disposed with two on each end face (1210) and two on a back face (1220). In addition, the top face may includes port number 1-6 printed or thereon or otherwise indicated and may also include a plurality of light emitting diodes (LED's) or other indicator lights associated with each port 1-6. In particular, a first set of 5 indicator lights (1230) may be used to display a remaining charge value of a connected energy storage device. In this embodiment, all five lights lit indicates that the battery connected to the port is 80 to 100% charged and one light lit indicates that the battery connected to the port is less than 20% charged. A second set of three LED's or other indicator lights (1240), e.g. colored red, yellow, and green, may also be associated with each device port to indicate three status levels of the device ports such as green for connected to power bus, yellow for communicating with the power manager but not connected to the power bus or red for no device connected, wrong device type connected or various other error conditions.

As best viewed in FIG. 11, port connectors (1190) and (1200) may include a flat (1250) or other orienting feature disposed on the port connector to properly orient cable connectors connected to port connectors. According to one aspect of the present invention, adjacent port connectors, e.g. (1190) and (1200), are installed with the orienting features (1250) opposed in order to oppositely orient adjacent cable connectors connected to adjacent port connectors. The orienting features (1250) of adjacent port connectors are opposed to ensure that right angle cable connectors can be installed in adjacent ports without interfering with each other.

Referring to FIG. 12, the power manager (1100) is formed with port connectors on three sides. Two port connectors (1150, 1160, 1190, and 1200) are disposed on each of the end faces (1210) and each end face (1210) has a dimension equal to the transverse width dimension of the power manager along the y-axis. Two more port connectors (1170, 1180) are disposed on the back face (1220) and the back face (1220) has a dimension equal to the longitudinal length dimension of the power manager along the x-axis. The front face (1130), top face (1110) and bottom face, not shown, do not include any port connectors. Generally, port connectors are only disposed along one longitudinal face (1220, 1130) of the power manager in order to reduce the transverse width dimension along the y-axis. This reduces the transverse width of the power manager along the y-axis, approximately by half compared to a power manager that has port connectors disposed on both longitudinal faces (1220, 1130). In the present embodiment, disposing port connectors on one longitudinal face reduces the transverse width dimension by 11 to 12 cm thereby providing a more compact package for man-portable applications.

Hot-Change-Over Circuit

Figure 13:
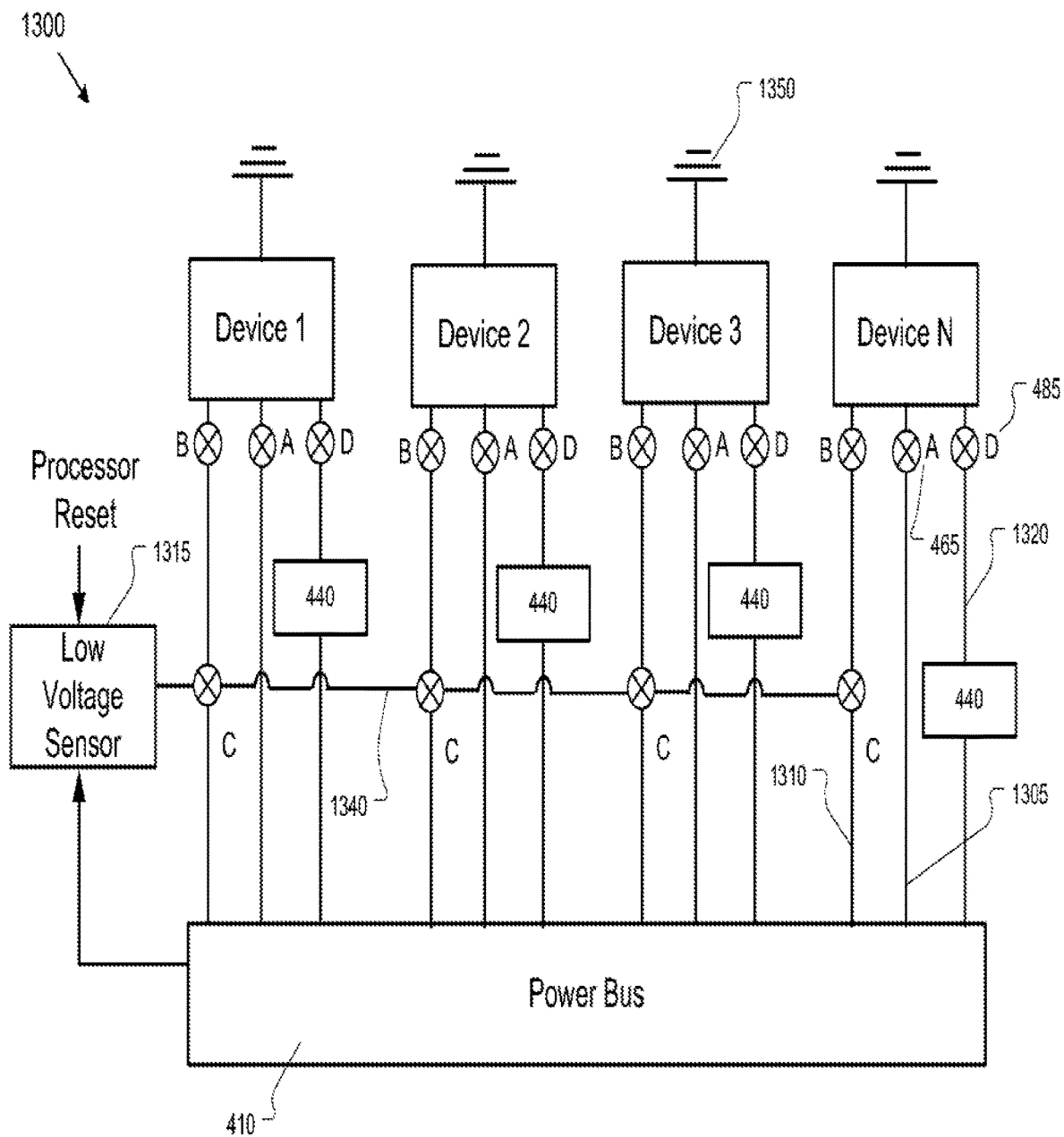
FIG. 13 illustrates an exemplary hot-change-over circuit for use with a power manager according to the present invention.

Referring now to FIGS. 4 and 13 an alternate embodiment of the power manager (400) according to the present invention is shown with a first embodiment of a hot-change-over connection scheme (1300) shown in FIG. 13. The first embodiment hot-change-over connection (1300) includes a third power channel (1310) extending from each device port to the power bus (410) and a low voltage sensor (1315) for measuring voltage on the power bus (1315). Each device port is operably connected with a power device (1-N), which in the present illustrative example is a power or energy source. Each source is grounded by a ground terminal (1350) and includes a power terminal that can be connected to the power bus over one of three different power channels or conductive paths (1305, 1310, 1320).

The first conductive path (1305) corresponds with the first power channel or conductive path (525) described above and shown in FIG. 4. A source (1-N) is directly connected to the power bus over the first power channel (1305) by closing a controllable switch or FET (A) to complete the conductive path (1305). The switch (A) corresponds with FET (455) in FIG. 4. The second conductive path (1320) corresponds with the second power channel or conductive path described above and shown in FIG. 4. A source (1-N) is connected to the power bus over the second power channel (1320) by closing a controllable switch (D) to complete the conductive path (1320). The second conductive path also includes a power converter (440) for making power conversions when the source is connected over the second conductive path (1320). The device (D) corresponds with FET (485) in FIG. 4. The third conductive path (1310) includes two controllable switches, preferably FETs (B) and (C) and a source (1-N) is connected to the power bus over the third conductive path (1310) by closing both of the switches (B) and (C). While all of the switching devices (A, B, C, D) may comprise FETs, other switching elements such as various switchable semiconductor devices, micro switches, relay switches, and other electrical components suitable for controlled switching are usable.

Each of the switches (A, B, C, D) is in communication with the digital data processor (420) shown in FIG. 4 and described above. In an initial state, e.g. when there are no power devices connected to device ports, all the switches (A, B, C, D) are open such that all three power channels associated with each device port are disconnected from the power bus (410). When a power device is connected to the device port, the energy management schema operating on the power manager determines whether the device is a power or energy source or a power load and decides if and how to connect the device to the power bus.

In the illustrative example of FIG. 13, each of the power devices (1-N) is a source and each source can be connected to the power bus with power conversion. As each source is connected with the device port, the energy management schema initially decides whether to connect each of the sources (1-N) to the power bus over the first power channel (1305), if power conversion is not required, or over the second power channel (1320), if power conversion is required or desirable. According to one aspect of the present invention, the energy management schema may select a primary source, e.g. device (N), to connect the power bus and designate the remaining sources, e.g. (1-3), as non-primary sources. In particular, when all of the devices (1-N) are energy storage devices, the energy management schema designates the energy storage device that has the lowest remaining charge level as the primary source and connects the primary energy source e.g. (N) to the power bus (410) by closing one of the switches (A) or (D). The remaining non-primary sources (1-3) are not connected to the power bus (410) and the primary energy source is used exclusively to meet all of the power demands of the power manager network until the primary source (N) is fully-discharged, disconnected from the device port or replaced or supplemented by a higher priority power source such a generated power source.

Referring to the third conductive path (1310), if a device connected to the device port is determined to be a power or energy source that can be connected to the power bus without power conversion, the switch (B) is closed. Otherwise, if the device is determined to be a power load, the switch (B) remains open. Accordingly, in the present example, the switch (B) is closed for each of the sources (1-N) shown in FIG. 13 and the third conductive path extends from the device port to the opened switch (C) but not all the way to the power bus (410). As further shown in FIG. 13, each switch (C) is directly connected to the low voltage sensor (1315) by a conductive element (1340). While primary source (N) is connected to the power bus (410) over the first and second power channels (1305) and (1320), none of the non-primary sources (1-3) is connected to the power bus (410).

According to the present invention, the low voltage sensor (1315) produces a low voltage signal in response to a drop in voltage at the power bus (410). Alternately, the low voltage sensor may comprise various sensors used in various locations to measure any parameter that might indicate that an undesirable drop in voltage, current or power at the power bus has occurred. Using the low voltage sensor example, a low voltage threshold is preset, e.g. 11.9 volts for a 14.9 volt power bus, and the low voltage sensor (1305) continuously monitors the voltage of the power bus (410). If the power bus voltage drops below the low voltage threshold, the low voltage signal is generated. The low voltage signal may comprise an abrupt change in the amplitude of a continuous signal being output by the low voltage sensor (1315). The low voltage sensor (1315) is in communication with the digital data processor (420), described above, and the low voltage signal is transmitted to the digital data processor (420) to inform the energy management schema that an undesirable power bus voltage drop has occurred. However, the low voltage signal also passes over the conductor (1340) to each of the switches (C) and each switch (C) is configured to close in response to the low voltage signal reaching the switch (C). Accordingly, an occurrence of the low voltage signal closes all the switches (C) thereby connected every source connected to a device port to the power bus (410) over the third conductive channels (1310). Moreover, if any of the devices (1-3) happens to be a power load that is not connected to the power bus (410), or a power source that can not be connected to the power bus without power conversion, closing the switch (C) in response to a low voltage signal will not connect the power load or non-compatible source to the power bus because the switch (B) is always left open if the device connected to the device port is a power load or non-compatible source. However, in other embodiments of the present invention, the third power channel (1310) may include a power converter disposed between the switches (B) and (C) to power convert additional power sources for connection to the power bus (410) in response to the low voltage signal.

Upon receiving the low voltage signal, the digital data processor (420) initiates a reset or other sequence of energy management schema events. These events query each device port, evaluate network status, recalculate the power and load allocation interfaces, connect and disconnect appropriate device ports to the power bus according to source and power priority. In addition, after conditions on the network have been stabilized the energy management schema opens all of the switches (C) and may reset the low voltage sensor (1315) to again enable the hot-change-over circuit capability. The arrangement of the hot-change-over circuit (1300) prevents any power loads and specifically mission critical power loads connected to the power bus from experiencing a loss of power when a power source delivering power to the power bus fails, is disconnected, becomes charge depleted or otherwise causes a voltage drop at the power bus. The hot-change-over circuit prevents prolonged power drops by immediately connected every available power or energy source to the power bus in response to the low voltage signal by closing all of the switches (C). Due to the arrangement of the hot-change-over circuit (1300) the switches (C) may be closed before the low voltage signal reaches the digital data processor (420). The response time by the hot-change-over circuit (1300) is preferably faster than typical processor interrupt and reset sequences to specifically prevent connected power loads from sensing a voltage drop on the power bus and shutting down, resetting or otherwise interrupting useful operations. Data processing device interrupt and reset sequences may be preformed at the rate of between 1 and 100 times per second with cycle durations ranging from 10 msec to 1 sec. According to the present invention, the switches (C) are preferably closed between 1 and 10 msec after the low voltage signal is generated and in a preferred embodiment the switches (C) are closed less than 1 msec after the low voltage signal occurs.

If the primary power supply is suddenly interrupted, e.g. if a primary battery becomes fully-discharged or a primary power source is otherwise disconnected or unavailable, the bus voltage drops enough to trigger the low voltage sensor (1315). In response to the low voltage signal, each switch (C) is immediately closed and latched closed such that at least one secondary source is connected to bus (410) substantially immediately. This represents a substantial improvement in performance over traditional CPU-based switching mechanisms and permits the draining of "dumb" power storage devices without risk of loss of bus power.

Figure 15:
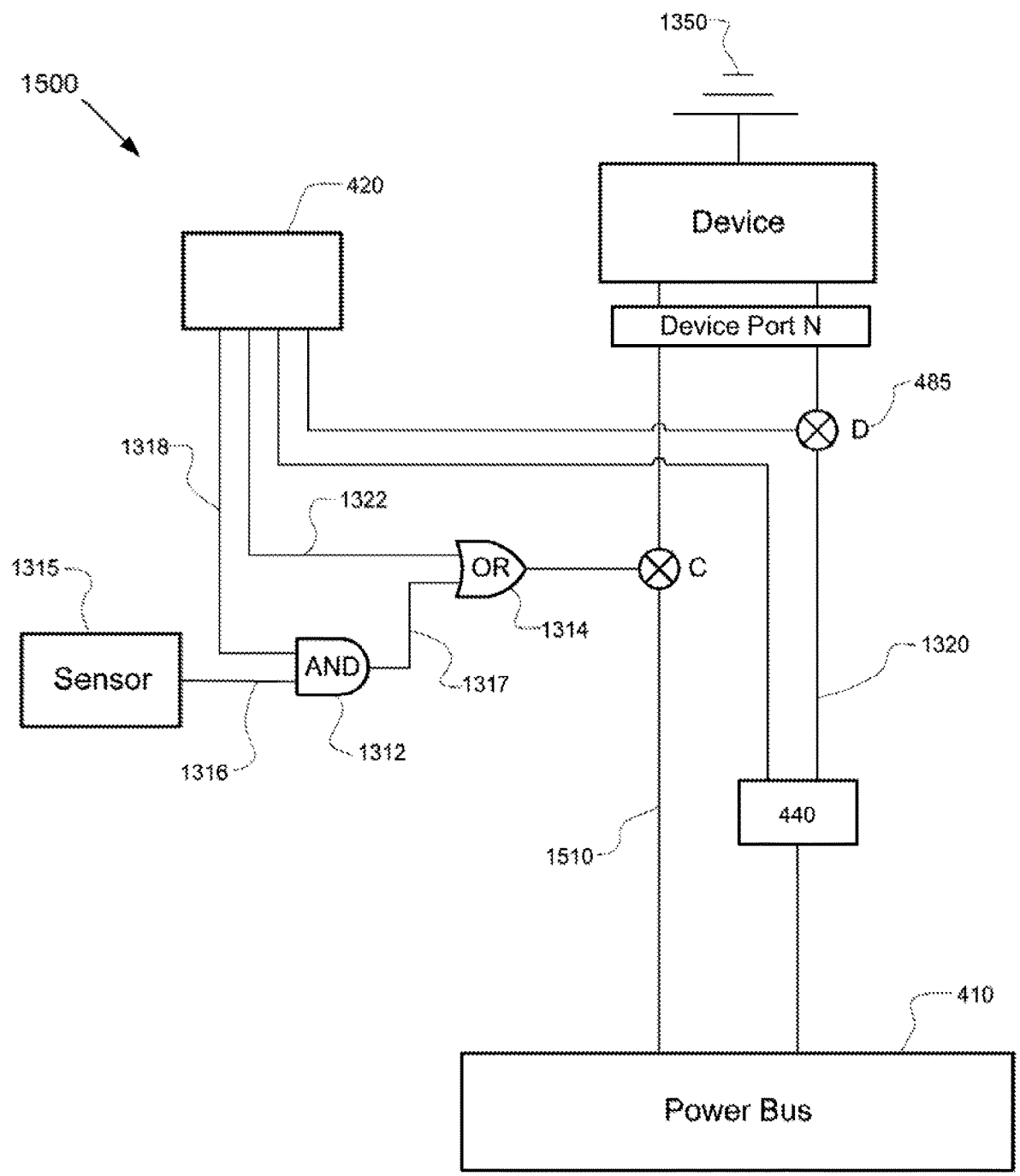
FIG. 15 illustrates a second exemplary hot-change-over circuit for use with a power manager according to the present invention.

A second embodiment of a hot-change-over circuit (1500) is shown schematically in FIG. 15 for a single device port (N). Preferably the hot-change-over circuit (1500) is used at each device port (1-N) that is suitable for connecting with a power or energy source, or the hot-change-over circuit (1500) may used at every device port of a power manager.

The change over circuit (1500) comprises two conductive paths or power channels (1510) and (1320) extending between the power bus (410) and the device port (N) with a ground terminal (1350) associated with the device port (N). The power channel (1320) includes a power converter (440) and a switching device (D), each described above, disposed between the power bus (410) and the device port (N). Yje power channel (1320) is used to connect the device port (N) to the power bus when a power conversation is needed or preferred. The power converter (440) and switching device (D) are each in communication with the power manager data processing device (420) and controlled thereby as described above. The power channel (1320) may be shared by two device ports such is shown in FIG. 4 where the power converter (440) may shared between device ports (1) and (2).

The power channel (1510) includes a single switching device (C) disposed between the power bus (410) and the device port (N), which is preferably a semiconductor switching device such as a FET. Logic elements (1312) and (1314) are disposed between the data processing device (420), the switch (C), and the low voltage sensor (1315). The logic elements allow the switch (C) to be closed by the data processing device (420) or to be closed in response to a low voltage signal emitted by the low voltage sensor (1315) thereby connecting the device port (N) to the power bus (420) over the power channel (1510). In the present example the OR gate (1314) is disposed between the data processing device (420) and the switch (C) and the AND gate (1312) and the OR gate (1314) are disposed between the low voltage sensor (1315) and the switch (C).

Initially, each of the switches (C) and (D) is open such that neither of the power channels (1510) and (1320) are connected to the power bus (410). The data processing device (420) communicates an input control signal (1322) to the OR gate (1314) which emits an output signal to open or close the switch (C). If a power or energy source attached to the device port (N) is designated as a primary source by the energy management schema, the data processor (420) connects the primary source to the power bus over one of the power channels (1510) and (1320) and the primary source remains connected to the power bus (410) until the primary source either becomes depleted, is otherwise disrupted, or is changed to a non-primary source by the energy management schema.

If a power or energy source attached to the device port (N) is designated as a non-primary source, the data processing device (420) communicates an input control signal (1318) to the AND gate (1312) to set the AND gate (1312) at a first state. If needed, the data processor (420) communicates an input control signal (1322) to the OR gate (1314), which emits an output signal to open the switch (C) thereby disconnecting the power channel (1510) from the power bus. Alternately, the data processing device (420) communicates an input control signal to open the switch (D) thereby disconnecting the power channel (1320) from the power bus (410). Thereafter any low voltage signal (1316) emitted by the low voltage sensor (1315) is input to the AND gate (1312) and the AND gate responds by outputting a signal (1317) to the OR gate (1314) which responds by emitting an output signal to close the switch (C) thereby connecting the non-primary source connected to the device port (N) to the power bus (410) over the power channel (1510).

As described above, the hot-change-over circuit (1500) acts independently of the data processing device (420) by communicating the low voltage signal (1316) to the AND gate (1312). According to the present invention, the combined response time to trigger the AND gate, trigger the OR gate, and close switch (C) is less than 10 msec and preferably less than 1 msec. After a low voltage signal (1316) has occurred, the digital processing device (410) may reset the AND gate (1312), the OR gate (1314), the switch (C) and the switch (D) according to conditions of the power network as determined by the energy management schema. In further embodiments of the hot-change-over circuit (1500) the switch (D) can be configured with AND/OR gates and connected to the low voltage sensor (1315) like the switch (C) such that either of the switches (C) or (D) can be set for hot changeover.

While the hot-change-over circuit (1300) prevents a loss in power to connected power loads, it also provides another important benefit in that it allows a user to continue to use battery power sources until they are completely drained of usable power. This is an important feature of the power manager of the present invention because a user can fully utilize every battery source without the fear of a power down or performance interruption of a mission critical device being powered by the power manager. Moreover, the power manager of the present invention may be used with batteries that do not display or otherwise communicate remaining charge level values. In this case, a battery with an unknown remaining charge level can be selected at the primary energy source and used until it is fully-discharged without fear of a power down or interruption of a mission critical device. Moreover a user may be unaware that a hot-change-over has occurred, however the power manager may display an error signal or other indication that an energy source connected to a port is depleted and not longer usable without recharging or replacement.

The improved operating mode afforded by the hot-change-over circuit of the power manager of the present invention may increase available power by 20% or more. In the case where a non-rechargeable battery with no charge level indicator is connected to the power manager of the present invention, a user may obtain 30% to 50% more power usage simply by continuing to use the battery until it is fully-discharged without the fear of a power down or performance interruption of a mission critical device. In the case where a non-rechargeable battery that has a charge level indicator is connected to the power manager of the present invention, a user may obtain up to 20% more power usage simply by continuing to use the battery until it is fully-discharged and without the fear of a power down or performance interruption of a mission critical device. In the case of a rechargeable battery connected to the power manager of the present invention, the rechargeable battery does not need to be equipped with a complex and costly coulomb counting circuit because the battery can be used until it is fully-discharged without the a power down or performance interruption of a mission critical device.

Figure 14:
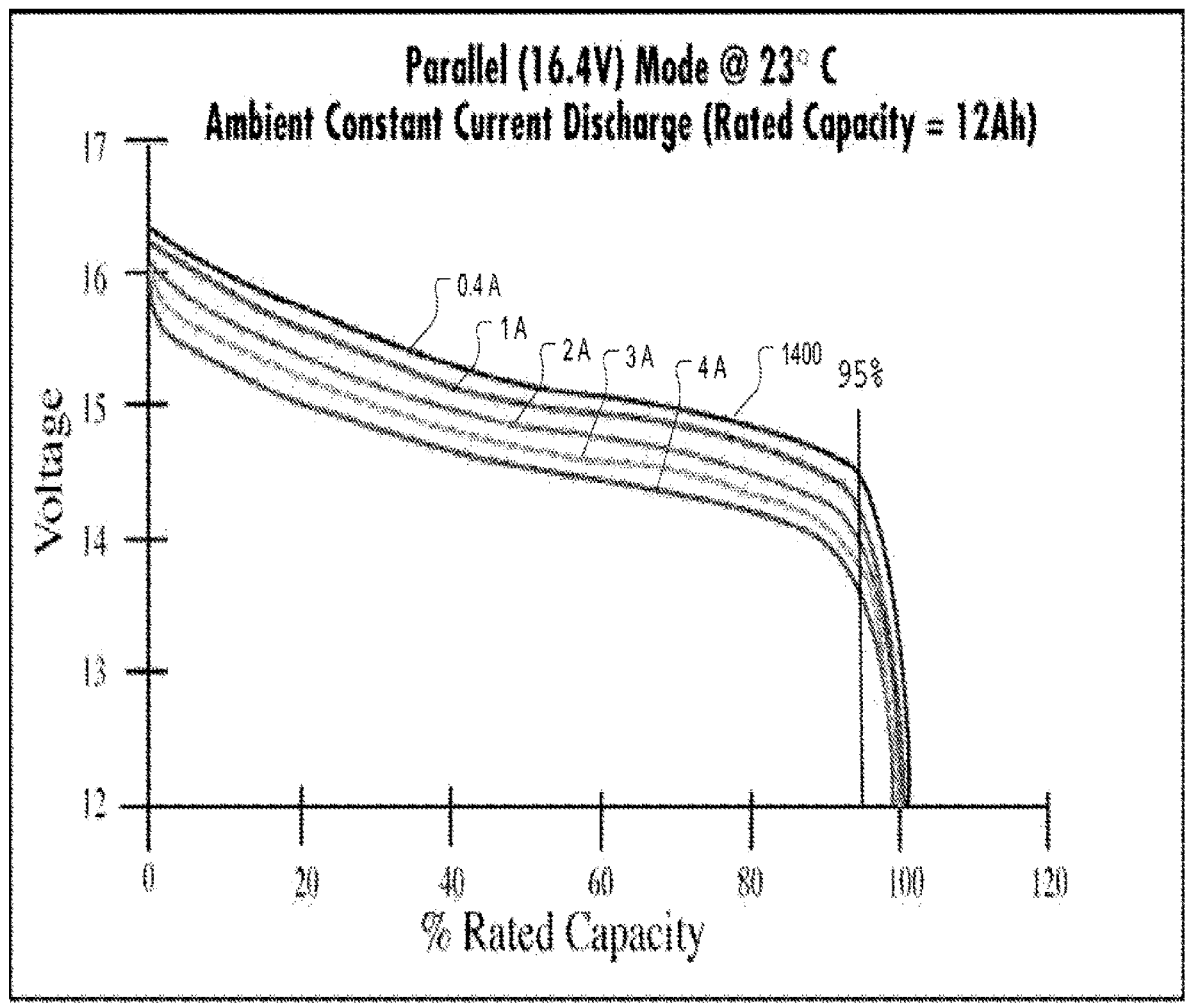
FIG. 14 illustrates exemplary voltage vs. percent rated charge capacity for an exemplary battery usable with a power manager configured according to the present invention.

Referring now to FIG. 14, a set of curves (1400) plot battery voltage on the left axis vs. percentage of rated charge capacity or remaining charge level on the bottom axis for five different values of constant current discharge. As can be seen from the curves (1400), the voltage ranges from approximately 16 volts when the battery is fully charged to a terminal voltage of 12 volts when the battery is fully-discharged. Based on the curves (1400) a power manager having a hot-change-over circuit (1300) configured with the low voltage sensor (1315) set at about 14-volts could effectively utilize approximately 90% to 95% of available charge capacity. This is a significant increase in battery charge capacity usage as compared to conventional battery usage in many battery power devices.

As further shown in FIG. 14, the curves (1400) relate to a 12 amp-hour battery. This means that the fully charged battery is usable for 12 hour when drawing a constant current of 1 ampere (defined as one coulomb of charge per second). While the example battery may be used for a longer duration when drawing less current or a shorter duration when drawing more current, a 1 ampere current draw is used for the following example. In the case where the battery associated with the curves (1400) is used to deliver a constant current of 1 amp to a power manager, the hot-change-over circuit (1300) may provide an additional 2.4 hours of battery usage as compared to discarding the battery as soon as an LED charge level indicator shows 20% or less charge capacity remaining.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. as a portable DC power manager), those skilled in the art will recognize that its usefulness is not limited thereto and that the present invention can be beneficially utilized in any number of environments and implementations where it is desirable to manage power distribution to portable power devices, to network power devices, to distribute power according to power priority settings, to scavenge power from a variety of power sources, to change power sources without powering down connected power loads and to more fully utilize battery energy sources. Accordingly, the claims set forth below should be construed in view of the full breadth and spirit of the invention as disclosed herein.

The invention claimed is:

1. A power management system, comprising:
a DC power bus;
a power manager shim enclosure comprising a first wall, a second wall, opposed to the first wall, and one or more sidewalls extending between the first wall and the second wall;
wherein the first wall includes a first device port configured as a first conductive pad connected to the DC power bus over a unidirectional DC to DC output converter;
wherein the second wall includes a second device port configured as a second conductive pad connected directly to the DC power bus;
a first external DC power device comprising a first external conductive pad terminal disposed in mating contact with the first conductive pad;
a second external DC power device comprising a second external conductive pad terminal disposed in mating contact with the second conductive pad;
wherein the power manager shim draws power from the second external DC power device to the DC power bus and distributes power from the DC power bus to the first external DC power device over the unidirectional DC to DC output converter.

2. The system of claim 1, wherein the second external DC power device comprises a battery unit housing one or more rechargeable batteries therein; wherein: the second conductive pad comprises a plurality of second conductive pads either directly connected to the DC power bus or connected to the DC power bus over a one way DC to DC input power converter; wherein: each rechargeable battery incudes a second external conductive pad terminal disposed in mating contact with one of the plurality of second conductive pads; wherein: the power manager shim draws power from one or more of the one or more rechargeable batteries to the DC power bus and distributes power from the DC power bus to the first external DC power device.

3. The system of claim 1, wherein the first external DC power device is a radio unit.

4. The system of claim 1, wherein a cross-section of the first wall and the second wall of the power manager shim define a cross-section of the power manager shim enclosure:

wherein: the power manager shim enclosure is sized to match a cross-section of the first external DC power device.

5. A power manager shim configured to be disposed between a DC power load and a DC power or energy source, the power manager shim comprising:
a top wall formed with a top power load surface;
at least one top device port associated with the top power load surface configured to electrically couple with the DC power load;
a bottom wall opposing the top wall formed with a bottom power or energy source surface;
at least one bottom device port associated with the bottom power or energy source surface and configured to electrically couple with the DC power or energy source;
a DC power bus directly connected to the bottom device port;
a DC to DC output converter connected between the DC power bus and the at least one top device port;
control electronics configured to control operation of the DC to DC output converter, wherein the control electronics includes a memory and a processor and a sidewall comprising one or more sidewall surfaces extending between the top wall and the bottom wall; and at least one sidewall device port disposed on one of the one or more sidewall surfaces.

6. The system of claim 1, further comprising one or more sidewall device ports disposed on one or more of the one or more sidewalls: wherein: the one or more sidewall device ports are directly connected to the DC power bus, connected to the DC power bus over a unidirectional DC to DC input converter, or connected to the DC power bus over a unidirectional DC to DC output converter.

7. A power manager comprising:
a DC power bus;
a first device port connected to the DC power bus over a unidirectional DC to DC output power converter;
a second device port directly connected to the DC power bus without a power converter; a third device port connected to the DC power bus over a unidirectional DC to DC input power converter, over a unidirectional DC to DC output power converter, or directly connected to the DC power bus without a power conversion:
a data processing device and associated memory device electrically interfaced with each of DC to DC power converters,
wherein the power manager includes:
a first wall configured to electrically interface with a first external DC power load over the first device port;
a second wall configured to electrically interface with a first external DC power or energy source over the second device port; and at least one sidewall extending between the first wall and the second wall;
wherein the first device port comprises a first conductive pad formed on the first wall for electrically interfacing with a first external conductive pad corresponding the first DC power load by mating contact between the first conductive pad and the first external conductive pad;
wherein the second device port comprises
a second conductive pad formed on the second wall for electrical interfacing with a second external conductive pad corresponding with the first external DC power or energy source by mating contact between the second conductive pad and the second external conductive pad, wherein the third device port extends from the at least one sidewall.

8. The power manager of claim 7 wherein the first wall is disposed opposing the second wall and the at least one sidewall extends between the first wall and the second wall, wherein: the first wall and the second wall are configured with a cross-section sized to match a cross section of a surface of the first external power load, a surface of the first external DC power or energy source, or a surface of both of the first external power load and the first external DC power or energy source.

9. The power manager of claim 7 further comprising: an AC input port formed on the at least one sidewall for connecting the power shim to an AC power source and an AC to DC input power converter connected between the AC input port and the DC power bus.

10. The power manager of claim 7 further comprising a third conductive pad formed on the second wall for electrically interfacing with a second external conductive pad corresponding a second DC power or energy source by mating contact there between.

11. The system of claim 5, further comprising a sidewall device port configured as an AC input port connected with an external AC power source wherein the AC device port is connected to the DC power bus over an AC to DC input converter enclosed within the power manager shim.

12. A power manager shim as recited in claim 5, wherein a cross section of the power manager shim, as defined b longitudinal and transverse dimensions of the top wall and the bottom wall, is sized to match a cross-section of the DC power load.

13. A power manager shim as recited in claim 5, wherein the power manager shim is substantially integral with the DC power load.

14. A power manager shim as recited in claim 5, wherein: the at least one sidewall device port is a plurality of sidewall device ports and the power load is a plurality of power loads, wherein each power load can be connected to the DC bus by connection with the at least one top device port or by connection with one of the plurality of sidewall device ports;
wherein the at least one bottom conductive terminal device port is a plurality of bottom device ports and the DC power or energy source is a plurality of DC power or energy sources, wherein each DC power or energy source can be connected to the DC power bus by connection with one of the plurality of device ports or with one of the plurality of sidewall device ports; and
wherein the control electronics are configured to select from the plurality of DC power or energy sources a primary DC power or energy source for powering the DC power bus; and, select from the plurality DC power or energy sources for powering to the DC power bus, a secondary DC energy source for powering the DC power bus; as well as configured to configure a hot-change-over circuit associated with the device port corresponding with the primary DC power or energy source and the device port corresponding with the DC secondary power or energy source
to while sensing a power amplitude at the DC power bus, connect, by the hot-change-over circuit, the secondary power source to the DC power bus in response to the power amplitude at the DC power bus falling below an acceptable threshold.

15. A power manager shim as recited in claim 14, wherein the control electronics are further configured to poll each of the plurality of device ports to characterize each external DC power load and each external DC power or energy source connected thereto.

16. A power manager shim as recited in claim 5, further comprising a unidirectional DC to DC input converter disposed between the DC power bus and at least one bottom device port wherein the control electronics is further configured to control operation of the unidirectional DC to DC input power converter.

17. A power manager shim as recited in claim 5, further comprising a second unidirectional DC to DC input converter disposed between the DC power bus and the at least one sidewall device ports, wherein the control electronics is further configured to control operation of the second unidirectional DC to DC input power converter.

18. A power manager shim as recited in claim 5, further comprising a second unidirectional DC to DC output converter disposed between the DC power bus and the at least one sidewall device ports, wherein the control electronics is further configured to control operation of the second unidirectional DC to DC output power converter.

19. A power manager shim as recited in claim 5 wherein the at least one top device port is a conductive pad device port.

20. A power manager shim as recited in claim 5 wherein the at least one bottom device port is a conductive pad device port.

* * * * *